United States Patent
Manvelian

(10) Patent No.: US 11,027,460 B2
(45) Date of Patent: Jun. 8, 2021

(54) METHODS FOR MANUFACTURING ITEMS UTILIZING A PLANAR SUPPORT MEMBER

(71) Applicant: John Manvelian, Glendale, CA (US)

(72) Inventor: John Manvelian, Glendale, CA (US)

( * ) Notice: Subject to any disclaimer, the term of this patent is extended or adjusted under 35 U.S.C. 154(b) by 236 days.

(21) Appl. No.: 15/907,213

(22) Filed: Feb. 27, 2018

(65) Prior Publication Data

US 2019/0263027 A1 Aug. 29, 2019

(51) Int. Cl.
*B29C 39/10* (2006.01)
*B29C 39/26* (2006.01)
*B29C 33/38* (2006.01)
*B29L 31/00* (2006.01)

(52) U.S. Cl.
CPC .......... *B29C 39/10* (2013.01); *B29C 33/3842* (2013.01); *B29C 39/26* (2013.01); *B29L 2031/722* (2013.01)

(58) Field of Classification Search
CPC ... B29C 39/10; B29C 33/3842; B29C 39/021; B29C 33/3885; B29C 70/60; B29L 2031/722
See application file for complete search history.

(56) References Cited

U.S. PATENT DOCUMENTS

| | | | |
|---|---|---|---|
| 2,511,552 A | 6/1950 | Stuempges | |
| 3,382,134 A | 5/1968 | Powell | |
| 3,492,391 A | 1/1970 | Atten | |
| 3,619,456 A | 11/1971 | Taylor, Jr. | |
| 3,848,046 A | 11/1974 | Machet | |

(Continued)

FOREIGN PATENT DOCUMENTS

| | | | |
|---|---|---|---|
| FR | 2058876 A5 | 5/1971 | |
| GB | 2550838 A | 12/2017 | |
| JP | WO03018281 | * 3/2006 | ............. B29C 33/38 |

OTHER PUBLICATIONS

"Cast Your Treasure in Plastic Resin", Wayback Machine search Dec. 5, 2016, FamilyEducation.com, https://web.archive.org/web/20161205044132/https://www.familyeducation.com/fun/handicrafts/cast-your-treasure-plastic-resin (Year: 2016).*

(Continued)

*Primary Examiner* — Jacob T Minskey
*Assistant Examiner* — Adrien J Bernard
(74) *Attorney, Agent, or Firm* — Loza & Loza, LLP; Michael Fedrick

(57) ABSTRACT

Methods for manufacturing an item that include obtaining a component support assembly having at least a first component on a top surface of a planar support member, and placing a frame onto the planar support member's top surface or around the planar support member such that the frame surrounds the first component. The frame has at least one side member, and an inner surface of the side member defines a frame cavity. The methods may also include depositing a second component material into the frame cavity and onto the component support assembly, and allowing the second component material to harden to form a second component that is secured to the first component and the planar support member's top surface. The methods may include removing the frame from the unfinished item, and removing the planar support member from the first and second components to reveal a bottom surface of the item.

17 Claims, 59 Drawing Sheets

(56) References Cited

U.S. PATENT DOCUMENTS

| | | |
|---|---|---|
| 3,994,763 A | 11/1976 | Sheath et al. |
| 4,067,946 A | 1/1978 | Rickert |
| 4,180,930 A | 1/1980 | DiMatteo |
| 4,312,688 A | 1/1982 | Brodis et al. |
| 4,347,270 A | 8/1982 | Hart |
| 4,405,664 A | 9/1983 | Talbert |
| 4,414,317 A | 11/1983 | Culp et al. |
| 4,767,647 A * | 8/1988 | Bree .................. B05D 1/30 40/1.5 |
| 4,927,686 A | 5/1990 | Colea |
| 5,041,181 A | 8/1991 | Brackett et al. |
| 5,209,956 A | 5/1993 | Poll |
| 5,217,639 A | 6/1993 | Mottola |
| 5,275,675 A | 1/1994 | Keith |
| 5,367,801 A | 11/1994 | Ahn |
| 5,419,940 A | 5/1995 | Wood et al. |
| 5,427,724 A | 6/1995 | Zimmerman |
| 5,605,765 A | 2/1997 | Rudick |
| 5,869,437 A | 2/1999 | Wolfersberger |
| D413,692 S | 9/1999 | Freeman |
| D416,107 S | 11/1999 | Freeman |
| 5,989,666 A | 11/1999 | Hadden |
| D418,941 S | 1/2000 | Freeman |
| 6,136,764 A | 10/2000 | Bitton |
| 6,147,040 A | 11/2000 | Van Der Hagen |
| 6,168,737 B1 * | 1/2001 | Poco .................. B29C 33/3857 264/129 |
| 6,383,429 B1 | 5/2002 | Noto |
| 7,645,480 B2 | 1/2010 | Stackelberg et al. |
| 7,785,098 B1 * | 8/2010 | Appleby ............... B29C 33/302 264/319 |
| 8,431,059 B2 | 4/2013 | Menow et al. |
| 2005/0134035 A1 | 6/2005 | Chavez |
| 2007/0026201 A1 | 2/2007 | Botrie et al. |
| 2008/0063866 A1 * | 3/2008 | Allen .................... A61B 5/685 428/389 |
| 2010/0201027 A1 | 8/2010 | Menow et al. |
| 2010/0276829 A1 * | 11/2010 | Yang .................... B22F 1/0059 264/101 |
| 2018/0153244 A1 * | 6/2018 | Kirshon ............ B29D 99/0064 |

OTHER PUBLICATIONS

Jaycon Systems, "The Complete Guide to DIY Molding & Resin Casting", Mar. 14, 2017, Medium.com. https://medium.com/jaycon-systems/the-complete-guide-to-diy-molding-resin-casting-4921301873ad (Year: 2017).*

International Patent Application No. PCT/US2018/020049, International Search Report and Written Opinion (dated Oct. 23, 2018).

* cited by examiner

METHODS FOR MANUFACTURING ITEMS UTILIZING A PLANAR SUPPORT MEMBER

BACKGROUND

Field

Various features relate to methods of manufacturing items, and in particular to manufacturing items using a planar support member.

Background

Since at least the $7^{th}$ century, stained glass panels have adorned buildings and walls as windows, decorative pieces, and the like. The stained (i.e., colored) glass is typically crafted into stained glass windows and panels by arranging small pieces of the colored glass into patterns or pictures and holding them together using strips of lead or other metal and supported by a rigid frame. Stained glass, however, has many disadvantages. For example, stained glass panels and windows are substantially decorative, thin, and fragile, and generally cannot be used to bear significant loads. Moreover, stained glass windows are limited in their material (e.g., glass), and difficult to produce (e.g., need skilled artisans) and clean. Furthermore, they are expensive to manufacture and also cannot be reshaped into different utilitarian objects such as plates, bowls, etc.

Compared to stained glass production, three-dimensional (3D) printing is very new. 3D printing deposits layers of material using computer control to create three-dimensional objects. While 3D printing provides distinct advantages in forming three-dimensional items, it too has its share of limitations. For example, 3D processes generally result in the production of items that lack smoothness, particularly for glass items. Moreover, 3D printing is somewhat limited in the materials that may be used, and also the size of the item that can be created.

Existing methods used to manufacture decorative panels composed of various objects are also generally crude and often fail to produce items having a full-bodied, aesthetically pleasing three-dimensional (3D) effect. For example, one technique for manufacturing decorative panels includes placing two glass sheets at opposing sides of a relatively thin decorative object, placing relatively thin two-sided tape around the peripheral edges between the two opposing glass sheets, and inserting a curable resin between the glass sheets. To pour the resin, the manufacturer perforates the tape, and pours the curable resin from top to bottom, as the glass sheets are held in an upright, vertical position. This vertical position helps the liquid resin follow the pull of gravity, and flow easily throughout the cavity between the two glass sheets. At the same time, the vertical position helps any air bubbles between the two sheets float toward the top of the pour. Problematically, this method requires two different materials (e.g., glass sheets and resin) to make up the bulk of the decorative panel which encases the embedded object. Forming the bulk with two different materials in such a fashion distorts light shining through the bulk since the interface between the materials may bend light due to differences in the refractive index of the materials. Also, this method requires the manufacturer to procure a different embeddable object for each separate panel produced and therefore lacks scalability.

It is an object of the present disclosure to describe methods of manufacturing different types of items composed of various components using a planar support member. It is another object of the present disclosure to describe methods of manufacturing that produce items having a full-bodied, 3D look and feel. Unlike stained glass manufacturing processes, the methods described herein produce utilitarian and robust items relatively easily and cost-effectively. Unlike 3D printing processes, the methods described herein produce items that have smooth surfaces using a variety of different materials not limited to those that can be used in 3D printing. Moreover, the methods of manufacturing described herein are scalable and may be used to efficiently and cost-effectively create multiple copies of such 3D looking items.

SUMMARY

According to one aspect of the present disclosure, manufacturing methods are described that produce, among other things, decorative panels and other items having designs that are not limited to only the surface of the panels and items but instead permeate through the entire thickness of the panels and items. This results in decorative panels and other items whose designs have a 3D look and feel. The panels and other items that may be produced using these manufacturing methods are not only aesthetically beautiful but may also be utilitarian and have specific functionality.

One feature provides a method for manufacturing an item. The method comprises obtaining a component support assembly that includes at least a first component on a top surface of a planar support member, placing a frame onto the top surface of the planar support member and/or around the planar support member such that the frame surrounds the first component, the frame having at least one side member, an inner surface of the side member defining a frame cavity, depositing a second component material into the frame cavity and onto the component support assembly, allowing the second component material to harden to form a second component that is secured to the first component and at least a portion of the top surface of the planar support member, wherein the first component, the second component, and the planar support member together form an unfinished item, removing the frame from the unfinished item, and removing the planar support member from the first component and the second component to reveal a bottom surface of the item, the bottom surface of the item having exposed surfaces of the first component and the second component. According to one aspect of the disclosure, obtaining the component support assembly includes producing the first component in a three dimensional (3D) form based on a two dimensional (2D) pattern, and securing a bottom surface of the first component to the top surface of the planar support member. According to another aspect, producing the first component in 3D form based on the 2D pattern includes carving and/or cutting a block of material so that the first component includes planar top and bottom surfaces and further includes a cross section that remains substantially constant throughout a thickness of the first component.

According to one aspect, removing the planar support member includes at least one of cutting, sanding, sawing, and/or etching the planar support member away from the first component and/or the second component. According to another aspect, the method further comprises, prior to depositing the second component material onto the component support assembly, applying a coating material to surfaces of the first component, and removing a top surface layer of the unfinished item to remove a portion of the coating material that coats a top surface of the first component to reveal side surfaces of the first component having the coating material. According to another aspect, the method further comprises, prior to depositing the second component material onto the component support assembly, applying a resistive material to the top surface of the planar support member, the resistive material configured to resist adhesion to the second component material. According to yet another aspect, obtaining the component support assembly includes obtaining a component template, making a mold using the component template, and using the mold to produce the component support assembly including the at least one first component on the top surface of the planar support member.

According to one aspect, making the mold using the component template includes placing the component template within the frame cavity, depositing a mold making material into the frame cavity and over the component template, allowing the mold making material to harden, and removing the mold resulting from the hardened mold making material, the mold having one or more cavities substantially shaped like the component template. According to another aspect, using the mold to produce the component support assembly including the at least one first component on the top surface of the planar support member includes placing the mold into the frame cavity, depositing a first component material into the frame cavity and into one or more cavities on a front side surface of the mold that are substantially shaped like the component template, the first component material overflowing out from the one or more cavities of the mold to cover at least a portion of the front side surface of the mold, allowing the first component material to harden to form the component support assembly, wherein the first component material hardened within the one or more cavities forms the first component and the first component material hardened on the front side surface of the mold forms the planar support member, and extracting the component support assembly from the mold.

According to one aspect, using the mold to produce the component support assembly including the at least one first component on the top surface of the planar support member includes placing the mold into the frame cavity, depositing a first component material into the frame cavity and into one or more cavities on a front side surface of the mold that are substantially shaped like the component template, allowing the first component material to harden to form the first component, depositing a binding material onto the first component and at least a portion of the front side surface of the mold, allowing the binding material to harden to form the planar support member, the first component secured to the planar support member to form the component support assembly, and extracting the component support assembly from the mold. According to another aspect, the second component material is a pourable liquid, and depositing the second component material onto the component support assembly includes pouring the second component material onto the component support assembly. According to yet another aspect, the second component material deposited onto the component support assembly includes a plurality of solid pieces, and allowing the second component material to harden to form the second component that is secured to the first component and at least a portion of the top surface of the planar support member includes heating the plurality of solid pieces of second component material until the plurality of solid pieces of second component material melt into a liquid and then allowing the liquid second component material to cool thereby hardening and binding to the first component and at least the portion of the top surface of the planar support member.

According to one aspect, the second component material deposited does not exceed a height of a top surface of the first component so that the top surface of the first component has an embossed appearance after the second component material hardens to form the second component. According to another aspect, the second component material deposited exceeds a height of a top surface of the first component so that the first component's top surface is embedded under a top surface the second component. According to yet another aspect, the method further comprises removing the top surface of the second component to expose the top surface of the first component.

According to one aspect, the first component and the planar support member are made of the same material. According to another aspect, a perimeter edge of the planar support member extends beyond one or more perimeter edges of the first component. According to yet another aspect, the first component and the planar support member are made of different materials.

Another feature provides a method that comprises obtaining a component support assembly that includes at least a first component coupled to a top surface of a planar support member, the top surface of the planar support member having a perimeter edge that surrounds and extends beyond the first component, positioning a frame relative to the component support assembly so that the frame surrounds the first component, the frame having at least one side member, and an inner surface of the side member defines a frame cavity, depositing a second component material into the frame cavity and onto the component support assembly, allowing the second component material to harden to form a second component that is secured to the first component and at least a portion of the top surface of the planar support member, and removing the planar support member from the first component and the second component to expose bottom surfaces of the first component and the second component.

Another feature provides a method of manufacturing an item, where the method comprises obtaining a component support assembly that includes at least a first component on a top surface of a planar support member, the first component having side surfaces that define a perimeter of the item, the first component including at least one second component material receiving cavity within an interior portion of the first component, depositing a second component material into the second component material receiving cavity and onto the planar support member's top surface exposed at the second component material receiving cavity, allowing the second component material to harden to form a second component that is secured to the first component and at least a portion of the top surface of the planar support member, and removing the planar support member from the first component and the second component to expose a bottom surface of the item that includes the first component and the second component.

DETAILED DESCRIPTION

In the following description, specific details are given to provide a thorough understanding of the various embodiments of the disclosure. However, it will be understood by one of ordinary skill in the art that the embodiments may be practiced without these specific details. The word "exemplary" is used herein to mean "serving as an example, instance, or illustration." Any implementation or embodiment described herein as "exemplary" is not necessarily to be construed as preferred or advantageous over other embodiments of the disclosure. Likewise, the term "embodiments" or "aspects" does not require that all embodiments or aspects of the disclosure include the discussed feature, advantage or process step. The terms "embed" and "embedded" as used herein mean to fix tightly or firmly into a surrounding mass. Notably, these terms still allow some portions or surfaces of the embedded component to be exposed in that such portions or surfaces are not enveloped or covered by the surrounding mass. For example, a first component may be embedded within a second component yet still have a bottom surface and/or a top surface that is exposed and not covered by the second component.

Figure 2:
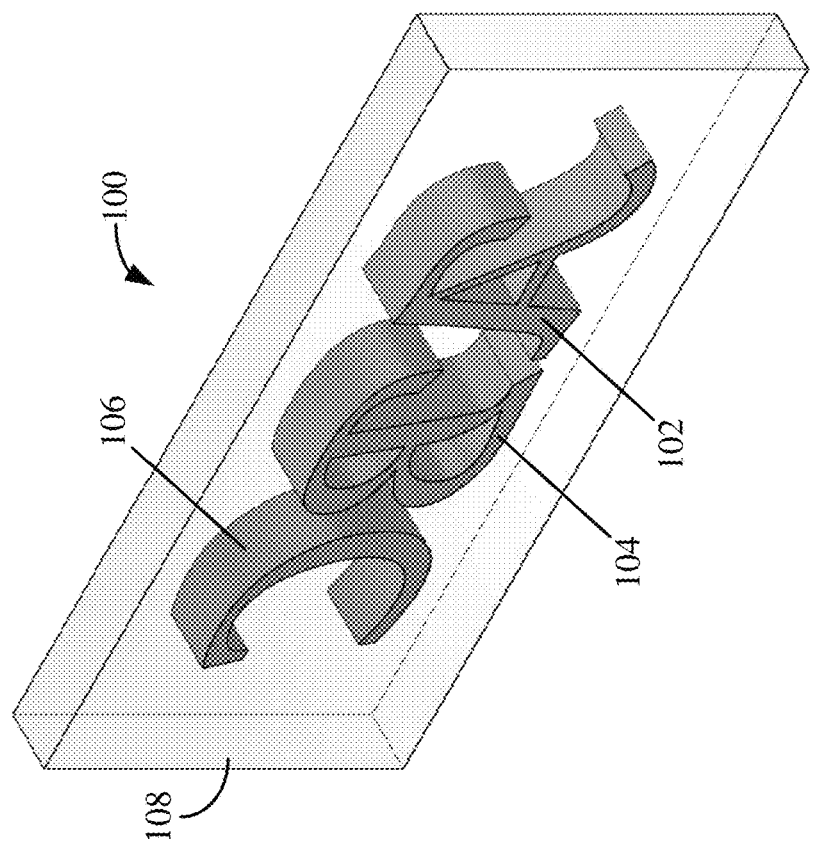
FIG. 2 illustrates a rear-perspective view of the first exemplary item.
Figure 1:
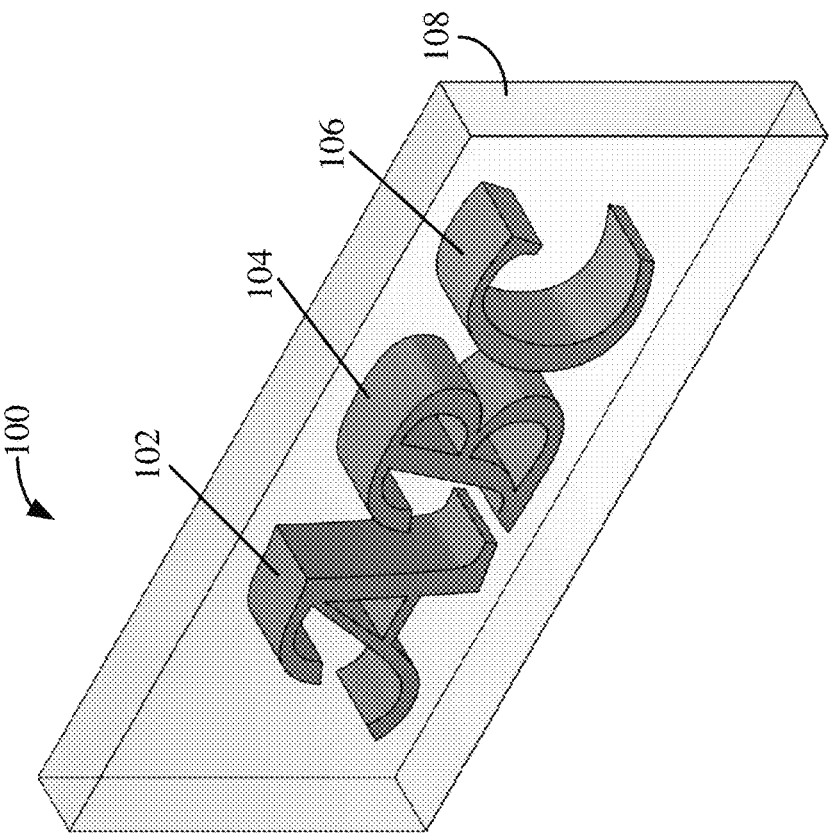
FIG. 1 illustrate a front-perspective view of a first exemplary item.

FIGS. 1 and 2 illustrate a non-limiting, non-exclusive example of a fully completed article of manufacture 100 (e.g., item) produced using one or more of the processes and methods described herein. Specifically, FIGS. 1 and 2 illustrate a front-perspective view and a rear-perspective view of the item 100, respectively. In the example shown, the item 100 is a decorative panel and includes various components 102, 104, 106, 108. As described in greater detail below, these components 102, 104, 106, 108 may be made from different materials and their positional arrangement relative to one another during the manufacturing process results through the introduction and later removal of a planar support member. In the specific example shown in FIGS. 1 and 2, a few of the components 102, 104, 106 are letters that are made of opaque plastic (e.g., acrylic) or glass while another component 108 made of transparent plastic or glass surrounds the lettering components 102, 104, 106. In the example shown, the letters 102, 104, 106 are embedded within the surrounding component 108.

The example shown in FIGS. 1 and 2 is merely one possible instance of an item out of a myriad of possibilities. For example, in other aspects character components 102, 104, 106 may be transparent while the surrounding component 108 may be opaque. As another example, the components 102, 104, 106, 108 may be made of other materials other than plastic or glass, such as, but not limited to, metal, wood, stone, epoxy resin, polyester resin, chocolate, jelly, soap, and/or wax.

Figure 4:
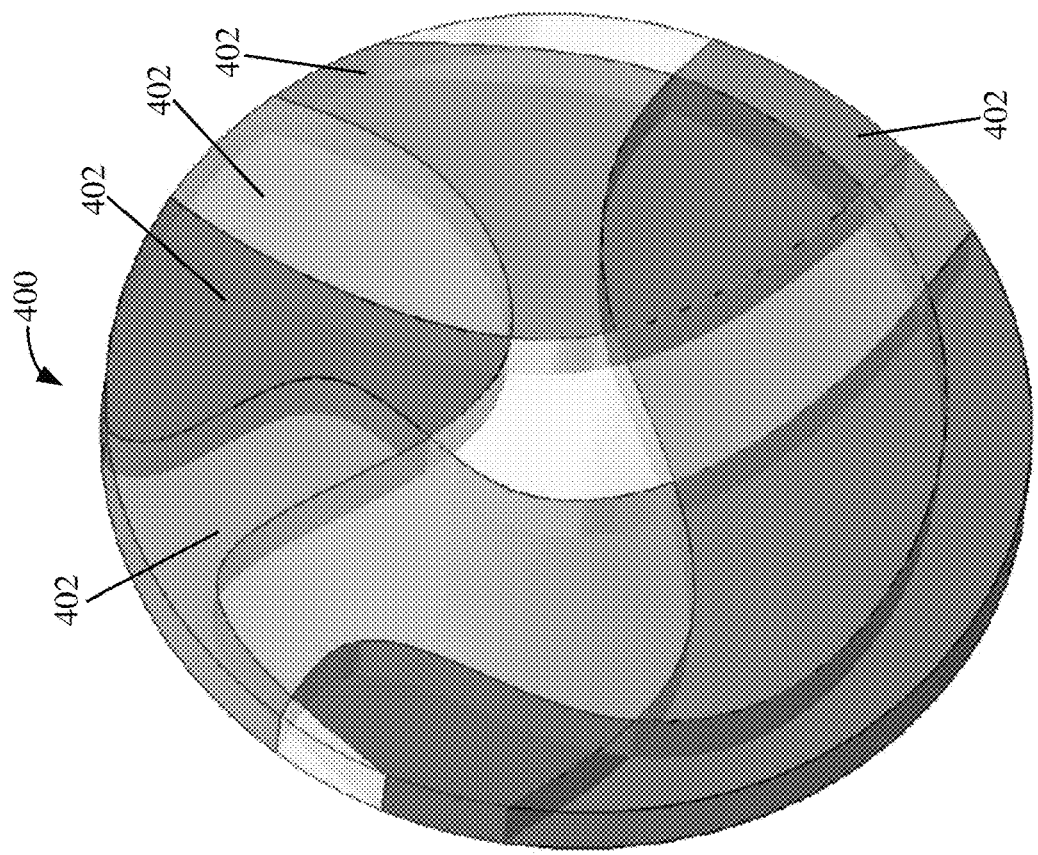
FIG. 4 illustrates a front-perspective view of a third exemplary item.
Figure 3:
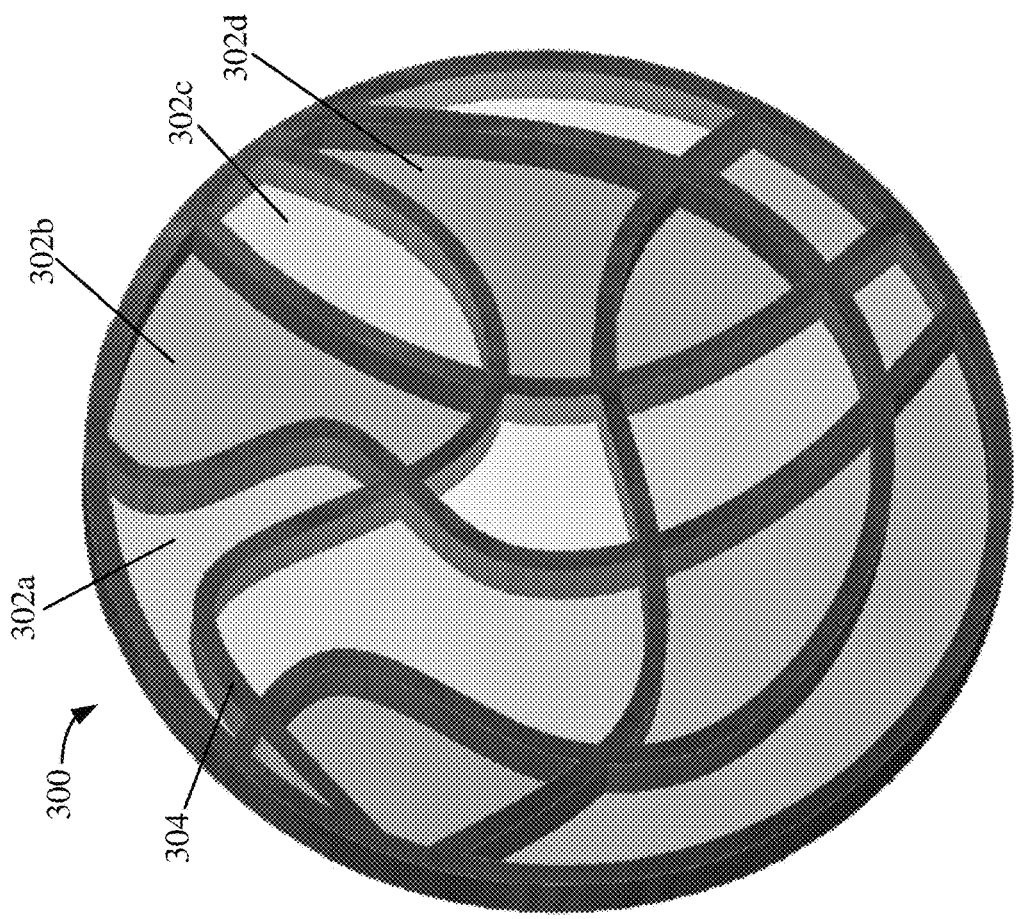
FIG. 3 illustrates a front-perspective view of a second exemplary item.

FIGS. 3 and 4 illustrate other non-limiting, non-exclusive examples of fully completed items 300, 400 that are made according to one or more of the methods and processes described herein. In the examples shown, the articles of manufacture 300, 400 are decorative panels that are also made of plastic or glass. Referring to FIG. 3, the item 300 includes a plurality of components 302a, 302b, 302c, 302d, 304. Like the item shown in FIGS. 1 and 2, the item 300 of FIG. 3 has several components 302a, 302b, 302c, 302d that are embedded within a surrounding component 304.

The item 400 shown in FIG. 4 also includes many components 402 (e.g., 15 components). However, unlike the items 100, 300 of FIGS. 1-3, none of the components 402 of the item 400 in FIG. 4 are not embedded within any one other single component. The process used to manufacture the item 400 shown in FIG. 4 still utilizes the same principles described herein that are used to manufacture the other items 100, 300 described above. As mentioned above, the components making up the items (e.g., components 302a, 302b, 302c, 302d, 304, 402) may be plastic, glass, metal, wood, stone, epoxy resin, polyester resin, chocolate, jelly, soap, wax, etc.

The decorative panels 100, 300, 400 shown in FIGS. 1-4 are merely exemplary. As will be described in greater detail below, the methods and processes described herein may be used to manufacture a plethora of different items besides decorative panels including, but not limited to, windows, doors, table tops, tiles and flooring, dinnerware (e.g., plates, bowls, etc.), countertops, soap, chocolate, candy (e.g., hard candy, gummy candy, etc.), plaques, trophies, signs, logos, decorative art and pictures, etc. The manufactured items may also include a wide variety of components that may be transparent, translucent, and/or opaque in varying degrees to help give the final product a unique, aesthetically pleasing 3D design.

Figure 5:
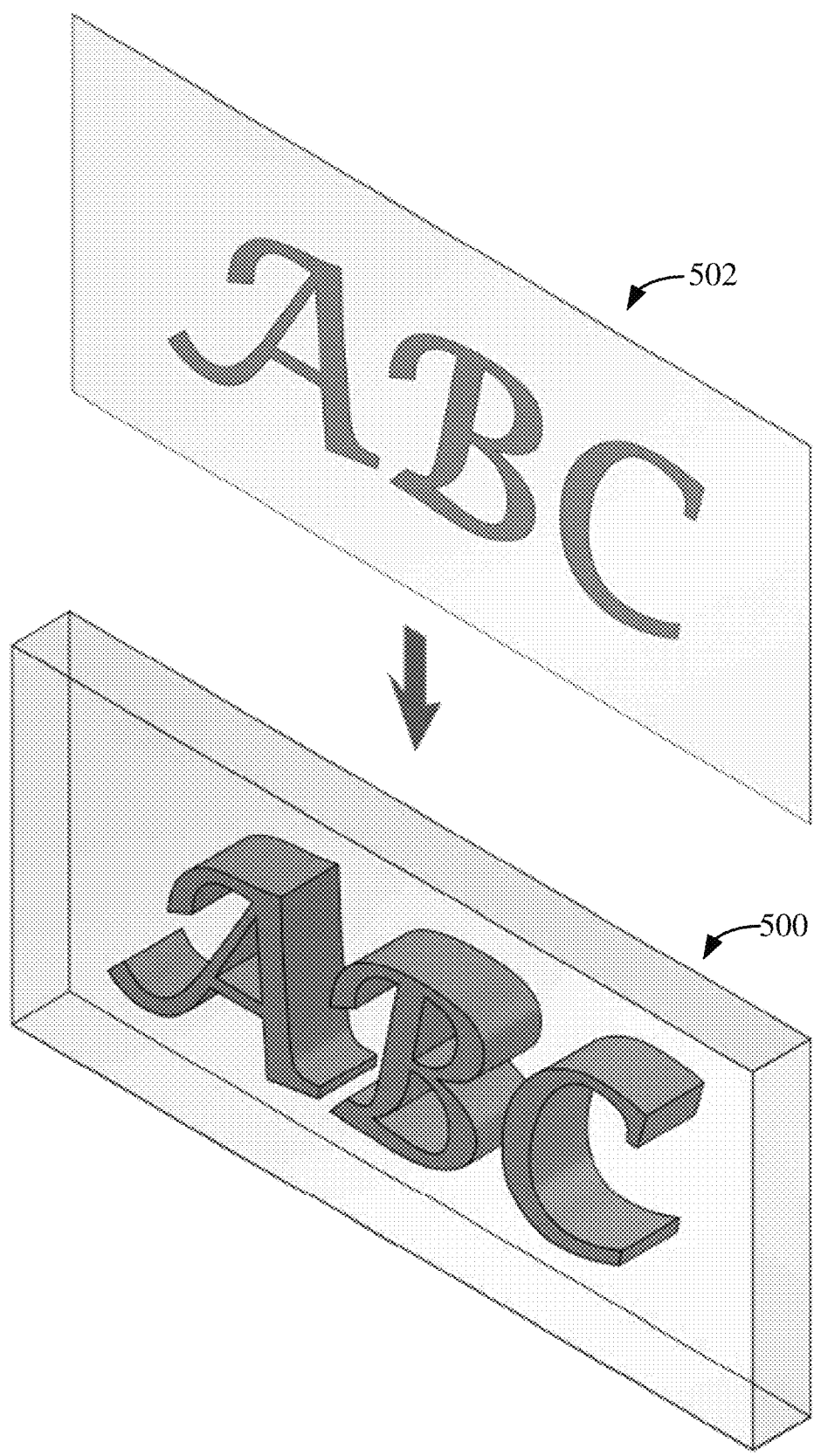
FIG. 5 illustrates that items manufactured according to methods described in the disclosure may be based on two dimensional (2D) patterns.

FIG. 5 illustrates the general process of how a desired, finished item 500 manufactured according to the processes and methods described herein may be based on an originally selected two dimensional (2D) pattern 502. For example, portions of the 2D pattern 502 may be used to form 3D components that are used during the construction of the item 500. The pattern 502 may be selected by a customer and submitted to the manufacturer by various means. The pattern 502 may be decorative and/or functional and may include characters, symbols, numbers, or abstract shapes, among other things. According to one aspect, the 2D pattern 502 may be used to cut a flat, planar solid sheet or block of material (e.g. plastic (e.g., acrylic), wood, stone, etc.) having a predetermined thickness to form one or more 3D components that have side surfaces which may be substantially orthogonal to the 3D components' top and bottom planar surfaces. The flat, planar solid sheet of material may be cut using simple or advanced cutting tools such as, but not limited to, band saws, computer numerical control (CNC) routers, laser cutting machines, water jet cutting machines, and CNC plasma cutting machines. In other cases the 2D pattern 502 may be used as template to create the 3D components using a 3D printer or an extrusion process. In some aspects, the 2D pattern has features (e.g., letters, numbers, characters, symbols, shapes, designs, etc.) that are large enough so that 3D components can be made based off of the features of the 2D pattern using the aforementioned cutting tools or 3D printers.

Figure 6:
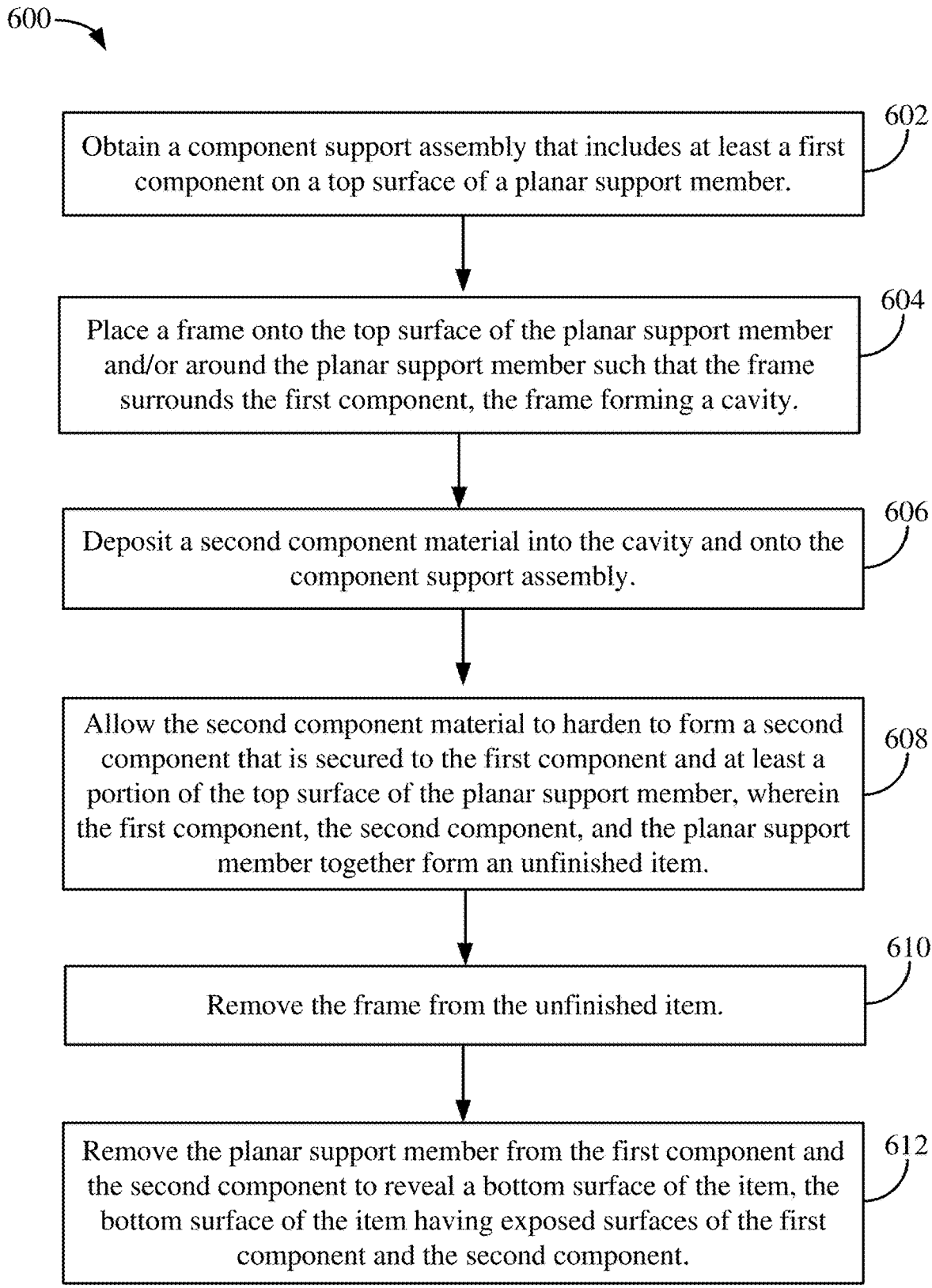
FIG. 6 illustrates a process flow diagram of a generalized method of manufacturing an item.

FIG. 6 illustrates a process flow diagram 600 of a generalized method of manufacturing an item according to one aspect of the present disclosure. First, a component support assembly may be obtained 602 that includes at least a first component on a top surface of a planar support member. Next, a frame is placed 604 onto the top surface of the planar support member and/or around the planar support member such that the frame surrounds the first component and forms a cavity. Then, a second component material may be deposited 606 into the cavity and onto the component support assembly. Next, the second component material may be allowed 608 to harden to form a second component that is secured to the first component and at least a portion of the top surface of the planar support member. The first component, the second component, and the planar support member together form an unfinished item. Then, the frame is removed 610 from the unfinished item. Next, the planar support member is removed 612 from the first component and the second component to reveal a bottom surface of the item, the bottom surface of the item having exposed surfaces of the first component and the second component. The finished item may be based on a 2D pattern that was first selected or obtained. In addition to the specific steps 602, 604, 606, 608, 610, 612 recited in the generalized method above, in some aspects the manufacturing method may utilize one or more molds as is described in some aspects below. Additionally, other optional steps may be implemented that result in items having certain features such as layered outlining surrounding components or an embossed appearance.

FIGS. 7-18 illustrate steps used in a method of manufacturing an item having various components according to one aspect. The method shown in FIGS. 7-18 is based on the generalized method shown in FIG. 6. For reasons of clarity and simplicity, the steps shown in FIGS. 7-18 specifically form a decorative panel that includes lettering. However, the same steps shown and described may be used to manufacture many other items containing different types of components. Some non-exclusive examples of manufacturable items include, but are not limited to, windows, doors, table tops, tiles and flooring, dinnerware, countertops, soap, chocolate, candy, plaques, trophies, signs, logos, decorative art and pictures. Some non-exclusive examples of components within the item include, but are not limited to, three-dimensional block letters, numbers, characters, and decorative designs.

In particular aspects, the components of the item may be letters, numbers, characters, and decorative designs having substantially constant cross-sections that do not vary substantially throughout the thickness of the component. The constant cross-sections may be substantially orthogonal to the flat top and bottom surfaces of the components. In some cases, however, the constant cross-sections may not be orthogonal to the top and bottom surfaces, which may be at angles relative to the cross-sections. In some aspects, the components may be letters, numbers, characters, and decorative designs that have cross-sections that decrease in size from one end of their thickness (e.g., starting at the bottom) to the other (e.g., ending at the top). Moreover, in some aspects, the components may have side surfaces that are smooth, straight, textured, concave, convex, engraved, embossed, or perforated. The components' side surfaces may in some case include holes. Textured component side surfaces may promote adhesion to other components and prevent disconnection. Whether the components have a constant cross-sections or increasing/decreasing cross-sections, the components may have flat top and bottom surfaces. The components may be composed of many different types materials including, but not limited to, plastic (e.g., epoxy or polyester resins and other types of plastic), glass, metal, wood, stone, chocolate, jelly, soap, wax, etc.

Figure 7:
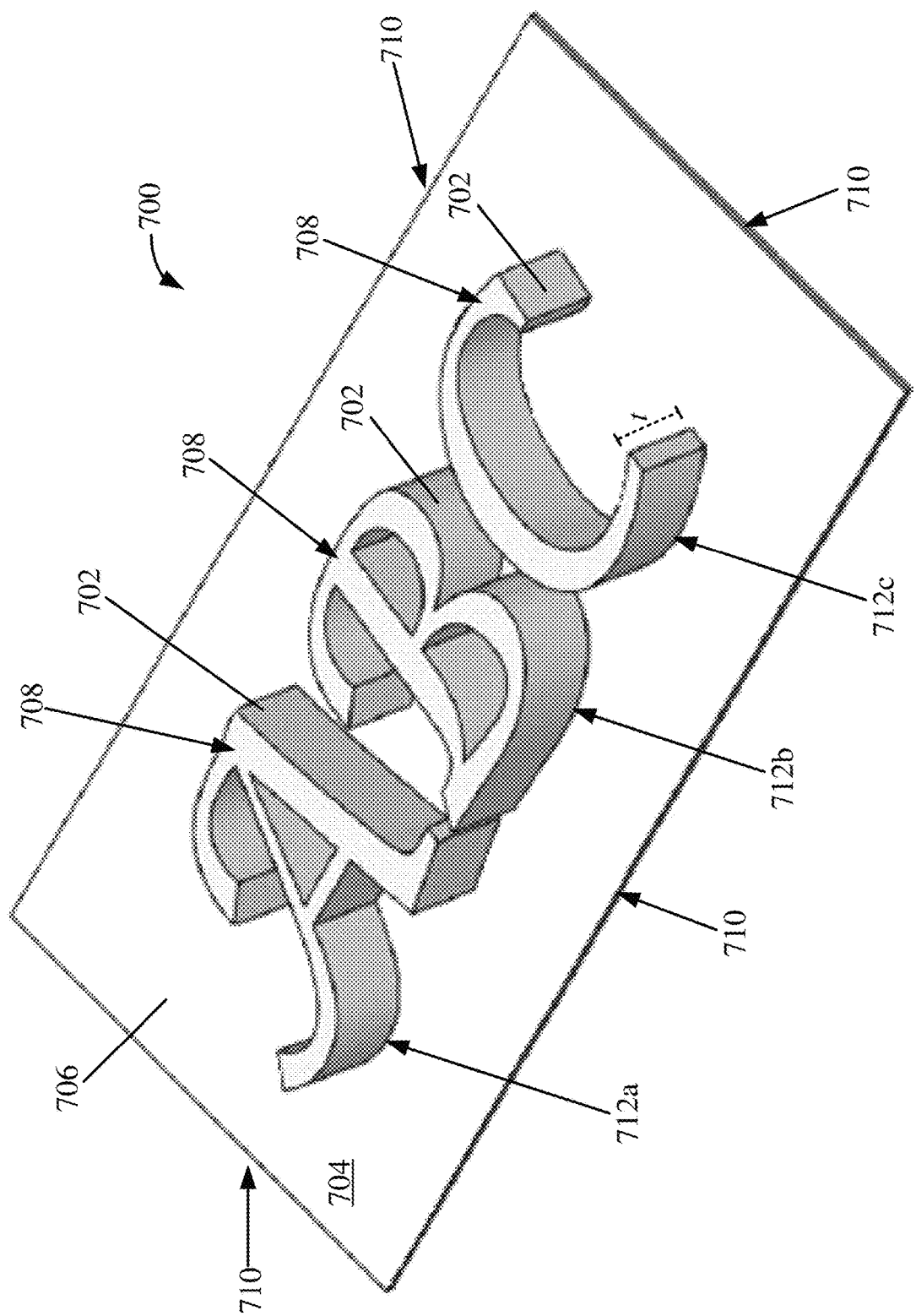
FIG. 7 illustrates a component support assembly that may be used during manufacturing of the item.

FIG. 7 illustrates a component support assembly 700 that may be used during manufacturing of the item according to one aspect. The component support assembly 700 includes one or more first components 702 positioned on a top surface 704 of a planar support member 706. In the illustrated example, the components 702 are secured to the top surface 704 by a securing means, such as but not limited to, various adhesive, such as tape or glue, modeling compound, putty, fasteners, etc. The components 702 may be obtained based on a 2D pattern as described above. The components 702 may also have flat, planar top surfaces 708 and also flat, planar bottom surfaces (opposite the top surface 708) allowing them to make good contact with the top surface 704 of the planar support member 706. The planar support member 706 may be designed so that it is rigid and capable of supporting the components 702 positioned thereon without warping, bending, or breaking. The planar support member 706 may also be designed so that it is relatively thin to allow for easier removal later (described in greater detail below). Some non-limiting, non-exclusive examples that the planar support member 706 may be made of include, but are not limited to, plastic, wood, metal, glass, and/or rigid foams (e.g., polyurethane foam). In the example shown, the planar support member 706 has a perimeter edge 710 that extends beyond the perimeter edges 712a, 712b, 712c of the first components 702.

Figure 8:
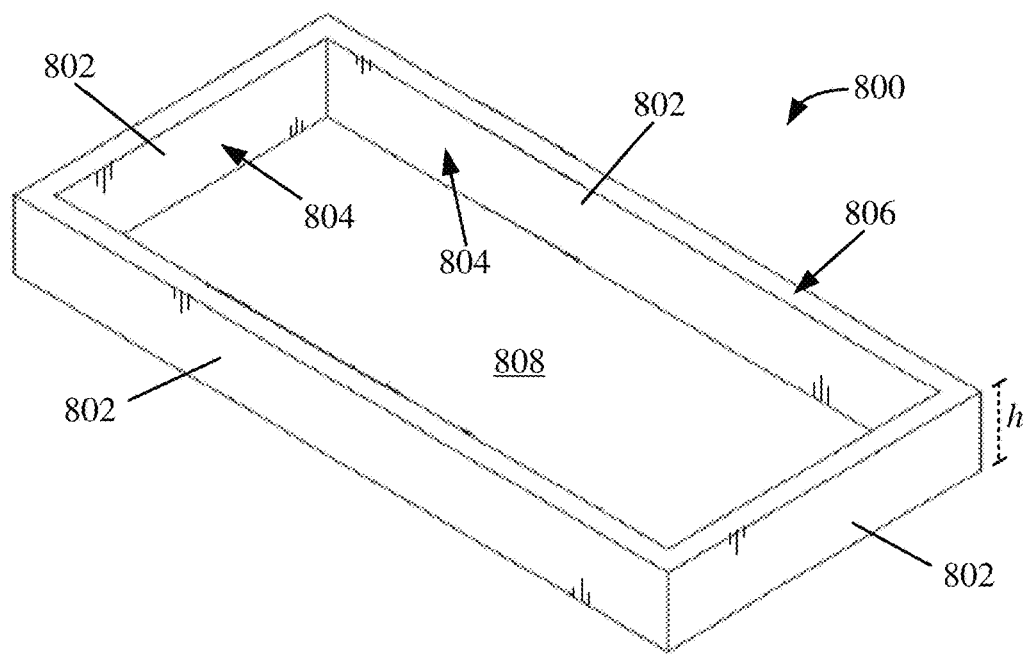
FIG. 8 illustrates a top perspective view of a frame that may be used during a manufacturing process of an item.
Figure 9:
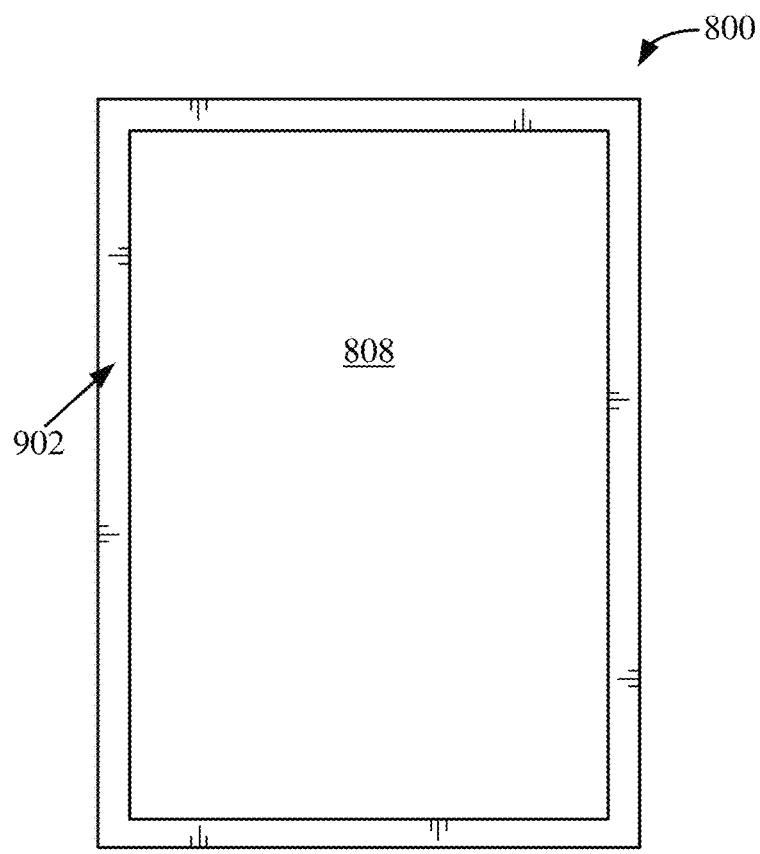
FIG. 9 illustrates a bottom view of the frame shown in FIG. 8.

FIGS. 8 and 9 illustrate an exemplary frame 800 according to one aspect. Specifically, FIG. 8 illustrates a top perspective view of the frame 800, and FIG. 9 illustrates a bottom view of the frame 800. Referring to FIGS. 8 and 9, the frame 800 may be, for example, rectangular and have a plurality of side members 802 each having an inner side surface 804. The frame 800 may also have a top perimeter surface 806 and a bottom perimeter surface 902. The bottom perimeter surface 902 may be flat. The frame 800 may have an open interior region 808, which as described below, allows the frame 800 to fit over and surround components used in the manufacturing of the item. The frame 800 illustrated in FIGS. 8 and 9 and elsewhere herein is merely exemplary. Frames having different shapes (circular, oval, asymmetrical, etc.) and any number of side member(s) 802 may also be used.

Figure 10:
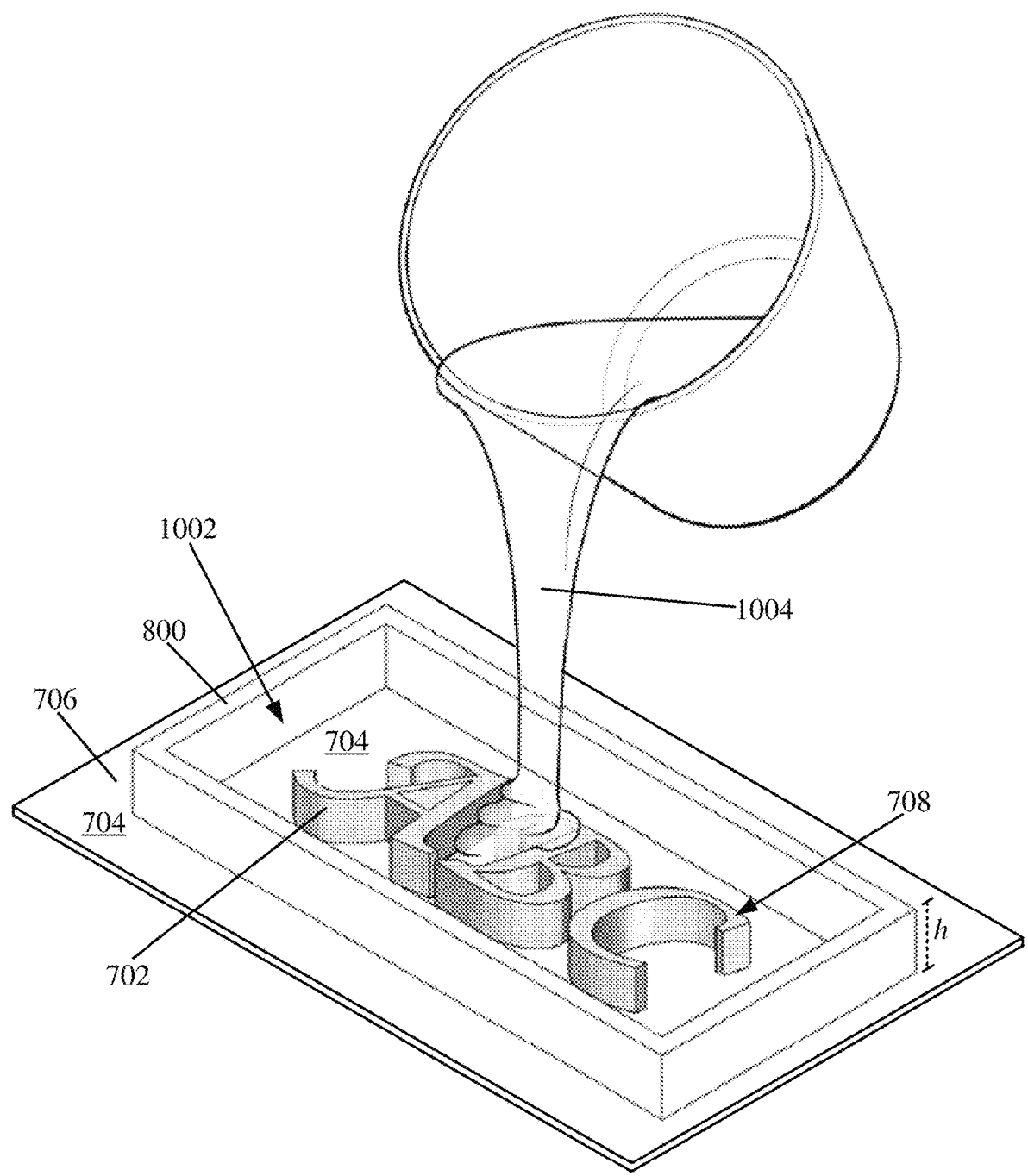
FIG. 10 illustrates that the frame may be placed onto a top surface of a planar support member such that the frame surrounds one or more first components of the item, and a second component material is deposited onto the first components.
Figure 11:
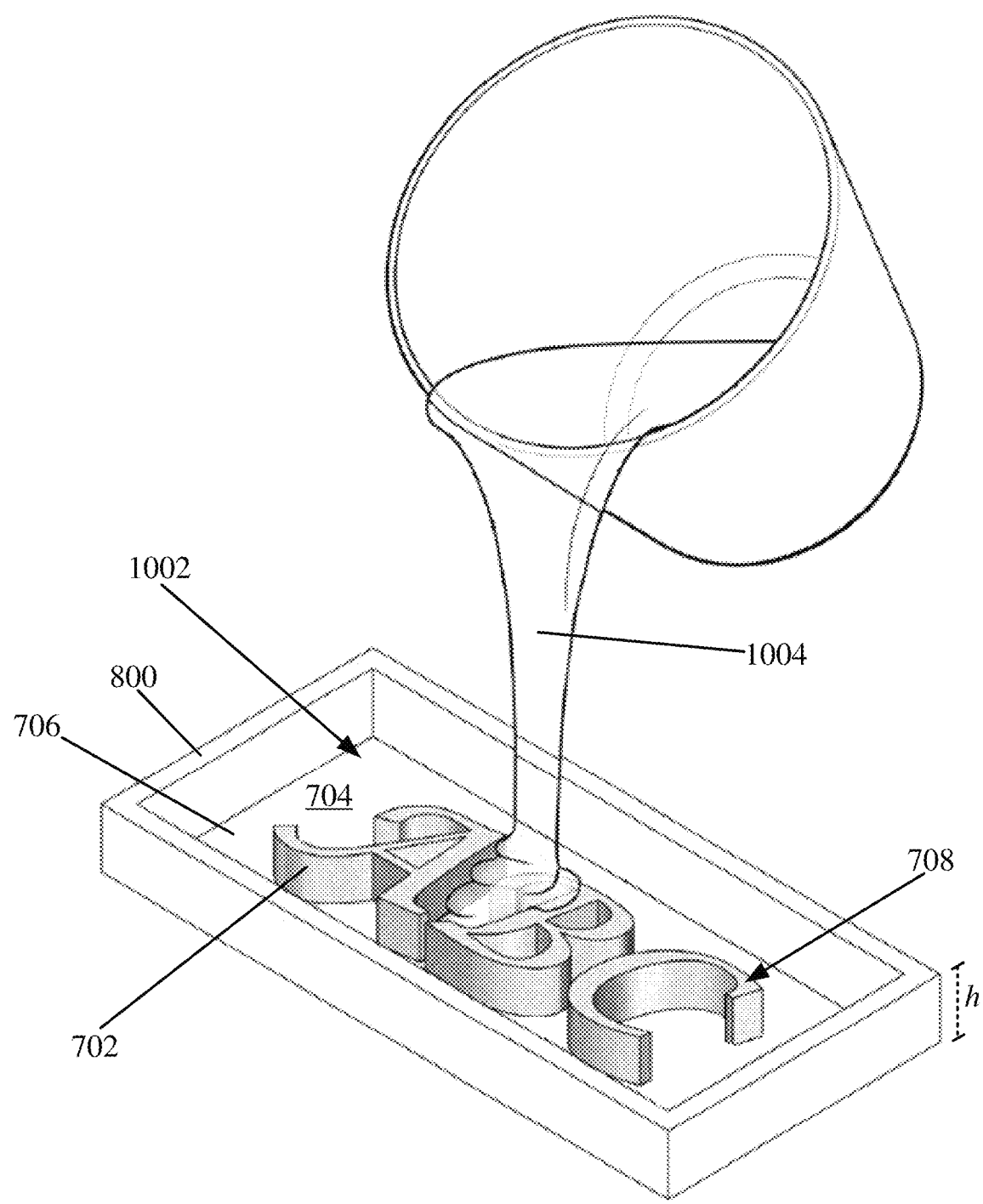
FIG. 11 illustrates how alternatively the frame may be placed around the planar support member such that the frame surrounds one or more first components of the item, and a second component material is deposited onto the first components.

FIG. 10 illustrates how the frame 800 may be placed onto the top surface 704 of the planar support member 706 such that the frame 800 surrounds the first components 702 according to one aspect. FIG. 11 illustrates how alternatively the frame 800 may be placed around the planar support member 706 (i.e., the component support assembly 700, including its planar support member 706, is placed within the frame 800) such that the frame 800 again surrounds the first components 702 according to another aspect. In either case, the frame 800 completely surrounds the first components 702.

Referring to FIGS. 8, 9, 10, and 11, the frame 800 has a height h between its bottom perimeter surface 902 and top perimeter surface 806 that may be greater (i.e., taller) than the thickest portion of the first components 702. In the example shown, the first components 702 all have substantially equal thickness t (see FIG. 7) and so the height h of the frame 800 may be greater than the thickness t of the first components 702. With the frame 800 positioned around the first components 702, inner side surfaces 804 of the frame 800 (e.g., frame cavity inner side surfaces) and the planar support member's top surface 704 (e.g., frame cavity bottom surface) together form a frame cavity 1002 (e.g., trough). The frame's inner side surfaces 804 may be orthogonal to the planar support member's top surface 704.

Figure 12:
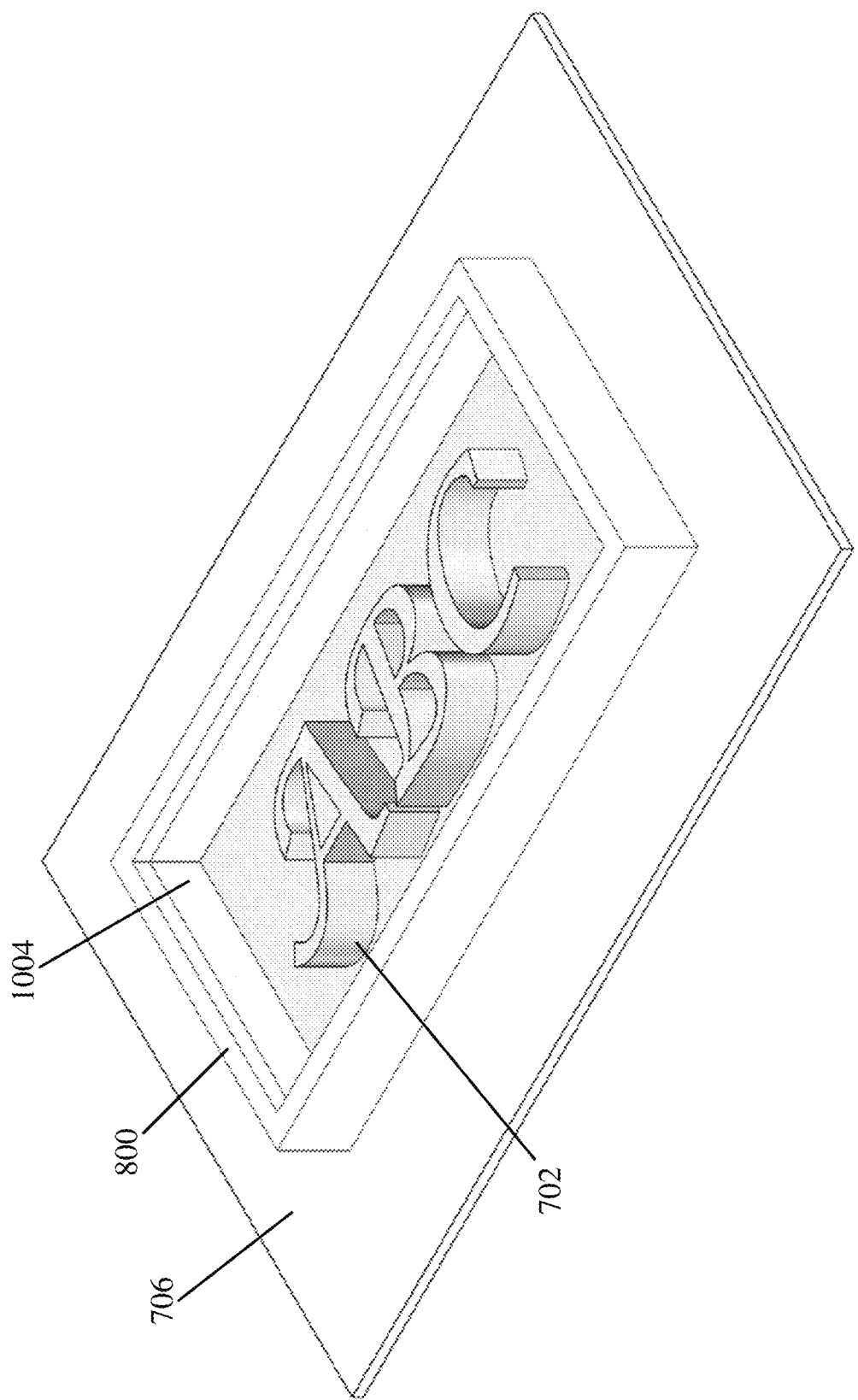
FIG. 12 illustrates that the second component material may harden and bind to the first components.

Next, a second component material 1004 for making a second component (e.g., component 108 shown in FIGS. 1 and 2) of the item is deposited into the frame's cavity 1002. The second component material 1004 may be deposited so that it covers the component support assembly 700 including the planar support member 706 and the first components 702. In one aspect, the second component material 1004 may be deposited to a level high enough so that it covers the top surface 708 of the first components 702. That is, in some aspects the second component material 1004 deposited may have a resulting height/thickness that is equal to or greater than the height of the first components' top surfaces 708. For example, FIG. 12 illustrates a case where the second component material 1004 has been deposited so that it completely covers the first components 702 underneath. In other aspects, the second component material 1004 deposited may have a resulting height/thickness that is less than the height of the first components' top surfaces 708. (See, for example, FIG. 33.) Once the second component material 1004 has been deposited into the frame's cavity 1002, the second component material 1004 is allowed to harden and bind to the first components 702 and at least a portion of the planar support member's top surface 704.

Referring to FIGS. 10 and 11, the second component material 1004 deposited may be, according to one non-limiting, non-exclusive example, a liquid material that is poured into the frame's cavity 1002. Such pourable materials may be either cold process materials or hot process materials. A cold process material is one which is substantially liquid and pourable at room temperature and does not necessarily need to be heated to a specific temperature higher than room temperature in order for it to be liquid and pourable. Cold process materials can be poured directly into, among other things, the frame's cavity 1002 without pre-heating, and later harden, for instance, due to an activator that is mixed into the reagent prior to pouring. Examples of such cold process materials include, but are not limited to, acrylic, polyester resin, and epoxy resin. Hot process materials, by contrast, need to be pre-heated up to a specific temperature above room temperature in order for them to achieve a liquid state. Examples of hot process materials include, but are not limited to, glass, metal, chocolate, and transparent or translucent soap. Thus, the second component material 1004 poured into the frame's cavity 1002 may be, for example, molten glass, epoxy resin, polyester resin, molten metal, acrylic, chocolate, jelly, soap, wax, or any other pourable, liquid material that can later harden sufficiently to keep a substantially rigid shape.

In another aspect, the second component material 1004 is not a pourable liquid. Instead, the second component material 1004 may be made up of many small pieces (e.g., chips) of a solid material, such as glass, metal, plastic (e.g., acrylic), or some other solid. The chips or pieces may be deposited into the frame's cavity 1002, and then the frame 800 containing the chips may be subjected to high heat (e.g., in a kiln) to melt the small solid pieces. Upon melting, the resulting liquid (e.g., molten metal, molten glass, liquid plastic) material flows around and coats the first components 702.

Figure 13:
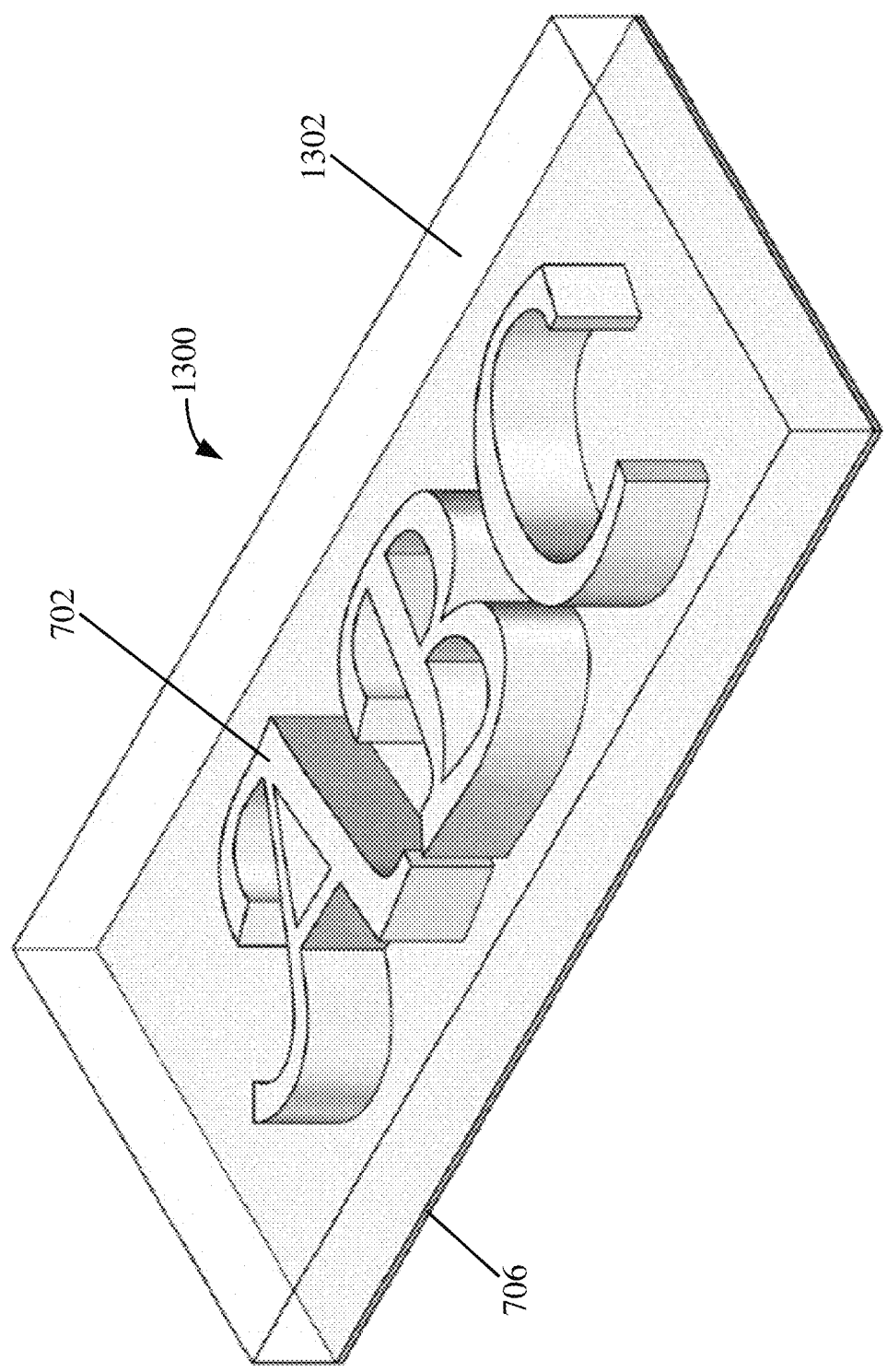
FIG. 13 illustrates the unfinished item is removed from the frame.

Referring to FIGS. 12 and 13, the second component material 1004 hardens to form the second component 1302. In the process the second component 1302 binds to the first components 702 and the planar support member 706 to form an unfinished item 1300. The unfinished item 1300 may be removed from the frame 800. For example, the unfinished item 1300 may be lifted up and out of the frame's cavity 1002 or alternatively the frame 800 may be deconstructed and removed leaving the unfinished item 1300 behind. In the example shown, the first components 702 are embedded within the surrounding second component 1302. In other cases, however, the second component 1302 may not envelope or surround one or more of the first components 702 (e.g., see FIG. 4). In the example illustrated in FIG. 13, the second component material 1004 used in the manufacturing process results in a substantially transparent or translucent second component 1302 while the first components 702 are substantially opaque.

The unfinished item 1300 shown in FIG. 13 assumes that the frame 800 was secured around the planar support member 706 (e.g., see FIG. 11), which is why the planar support member 706 has substantially the same width and length dimensions as the second component 1302. However, in other aspects the unfinished item 1300 may have a planar support member 706 still attached that has width and/or length dimensions that are wider and/or longer than the second component 1302 if the frame 800 was placed onto the top surface 704 of the planar support member 706 (e.g., see FIG. 10).

Figure 14:
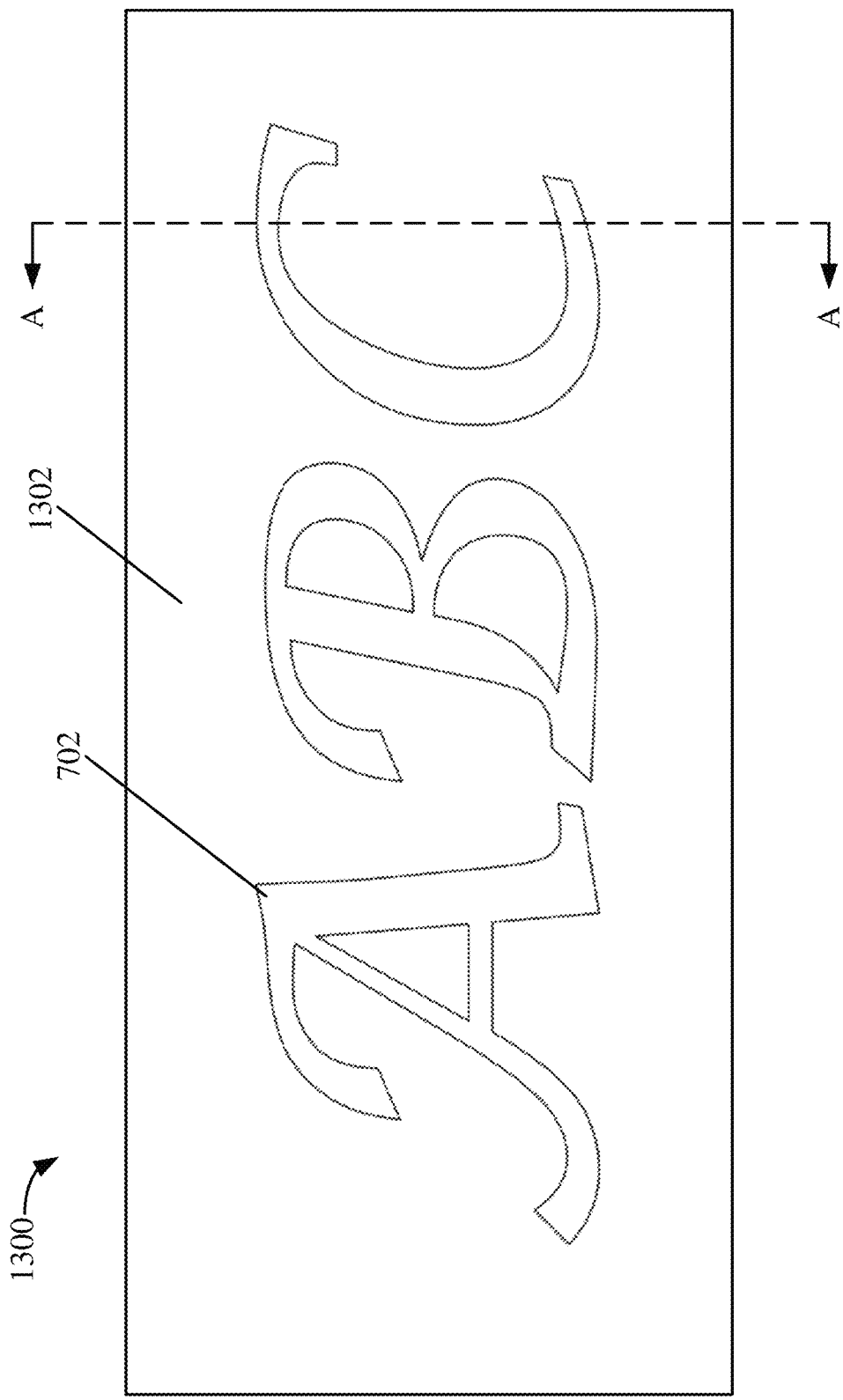
FIG. 14 illustrates a top view of the unfinished item illustrated in FIG. 13.

FIG. 14 illustrates a top view of the unfinished item 1300 illustrated in FIG. 13.

Figure 15:
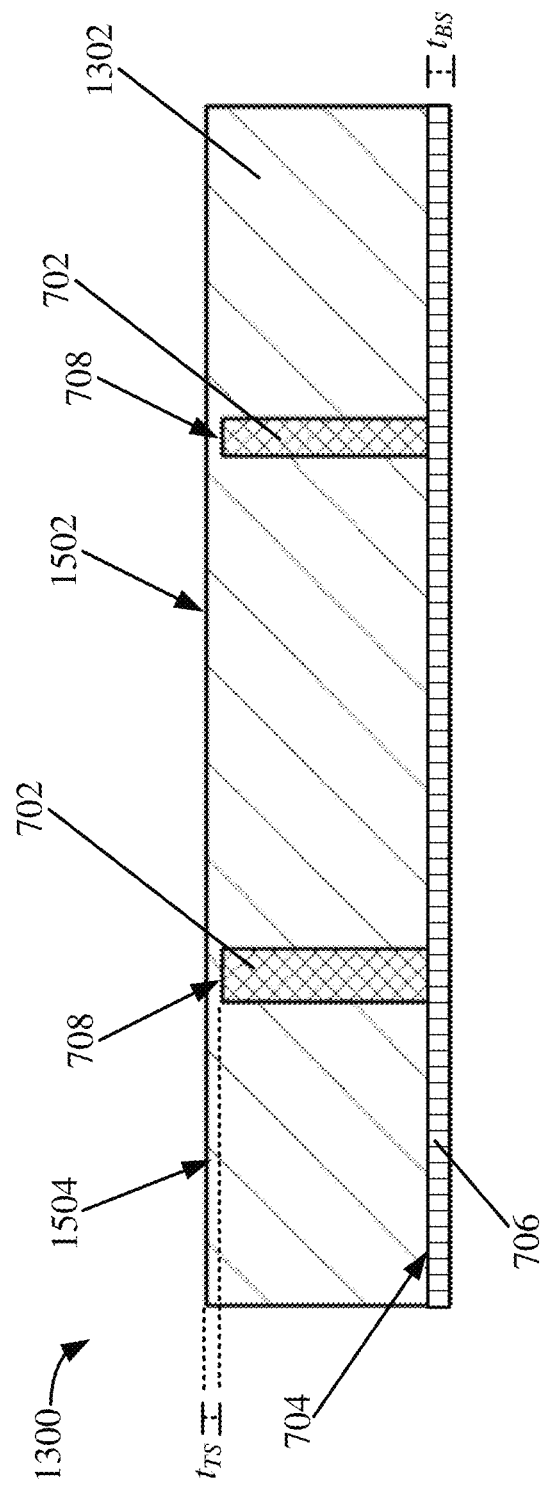
FIG. 15 illustrates a cross-sectional view of the unfinished item taken along the line A-A shown in FIG. 14.

FIG. 15 illustrates a cross-sectional view of the unfinished item 1300 taken along the line A-A shown in FIG. 14. As shown in FIG. 15, the planar support member 706 resides at the bottom surface of the unfinished item 1300 and has a thickness $t_{BS}$. The thickness $t_{BS}$ should be thick enough to securely hold and support the attached first components 702 and the second component 1302, yet may be thin enough to allow for easy removal of the planar support member 706 in subsequent steps. Referring to FIG. 15, the unfinished item's second component 1302 also includes a top surface 1502. Slightly below the second component's top surface 1502 is the top surface 708 of the first components 702. The material between these two surfaces is the top surface layer 1504 and has a thickness $t_{TS}$ (i.e., top surface thickness). The value of the top surface thickness $t_{TS}$ depends on the amount of the second component material 1004 that was poured over and covered the component support assembly 700 (see step shown in FIGS. 10 and 11). In designs where the top surface layer 1504 is to be removed, the value $t_{TS}$ may be minimized to allow for easy removal of this top surface layer 1504. In other designs, however, the value of the top surface thickness $t_{TS}$ may not be minimized and may instead be set to a specific value because the design requires that the first components 702 be embedded underneath the second component's top surface 1502.

Figure 16:
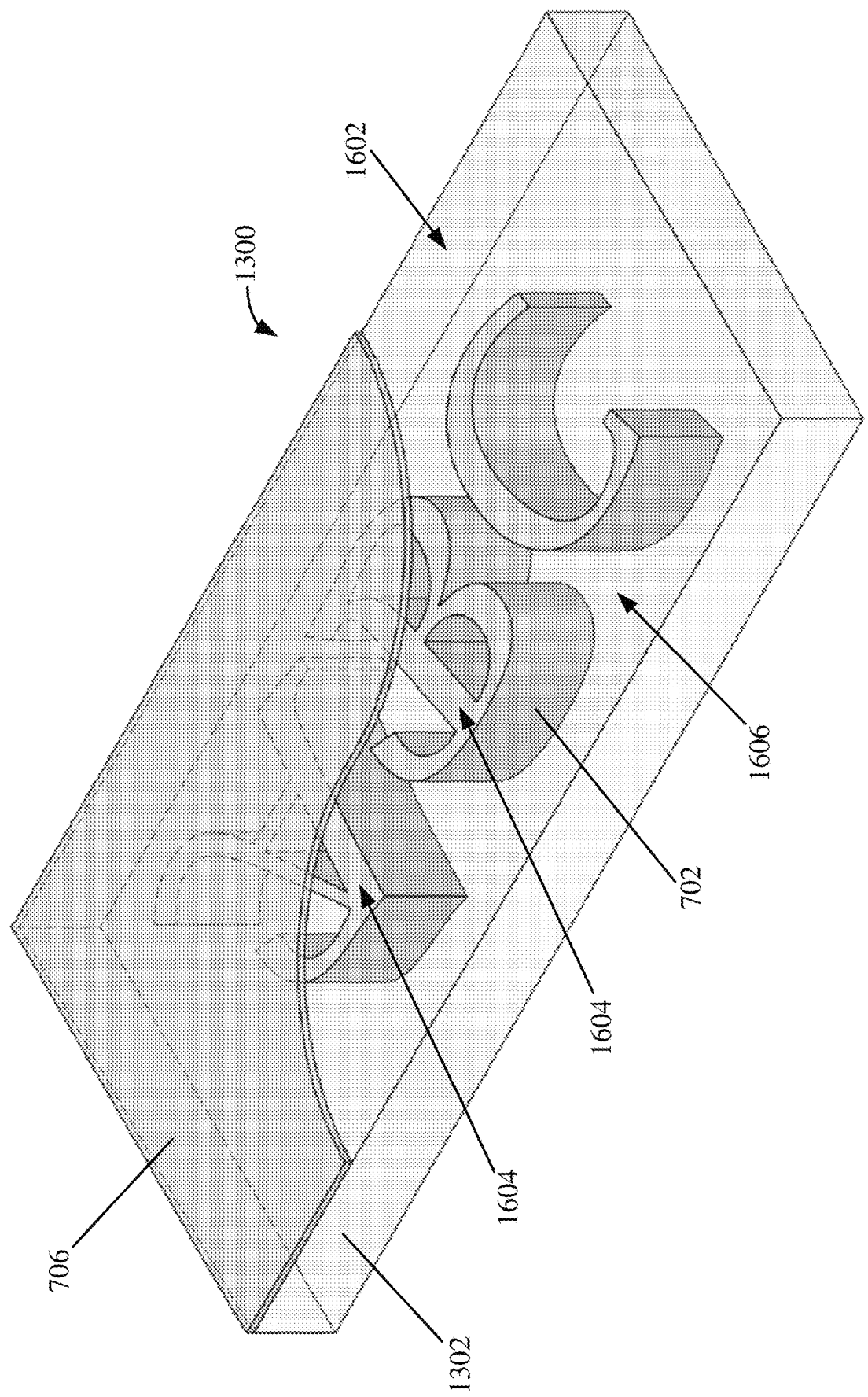
FIG. 16 illustrates a bottom view of the unfinished item with a portion of the planar support member removed exposing a bottom surface of the item.

FIG. 16 illustrates a bottom view of the unfinished item 1300 shown in FIG. 13 with a portion of the planar support member 706 removed exposing/revealing a bottom surface 1602 of the item. Specifically, in the example shown, the item's bottom surface 1602 exposes bottom surfaces 1604, 1606 of the first components 702 and second component 1302. According to one aspect, the planar support member 706 is removed as part of the manufacturing process. The planar support member 706 may be removed by various means including sanding, cutting, sawing, etching, etc. For example, a computer numerical control (CNC) router may be used to route away the planar support member 706. As another example, the planar support member 706 may simply be cut away from the first and second components 702, 704 with an industrial cutting machine. Using a relatively thin, yet rigid planar support member 706 allows for easier removal of the planar support member 706. In some aspects, the planar support member 706 may be dissolved away using a chemical bath that reacts with the planar support member 706. Referring to FIG. 15, the top surface layer 1504 may be similarly removed using various means including sanding, cutting, stripping, CNC routing, etc.

Referring to FIGS. 7, 10, 15, and 16, according to one aspect, the area of the top surface 704 of the planar support member 706 not already occupied by the first components 702 may be covered with a thin resistive material, such as plastic film (e.g., plastic wrap), aluminum foil, or the like, or coated/sprayed with a material that prevents or retards adhesion of the planar support member's top surface 704 with the second component material 1004. This optional step may be performed so that the planar support member 706 may be more easily removed and separated from the hardened second component 1302.

Figure 17:
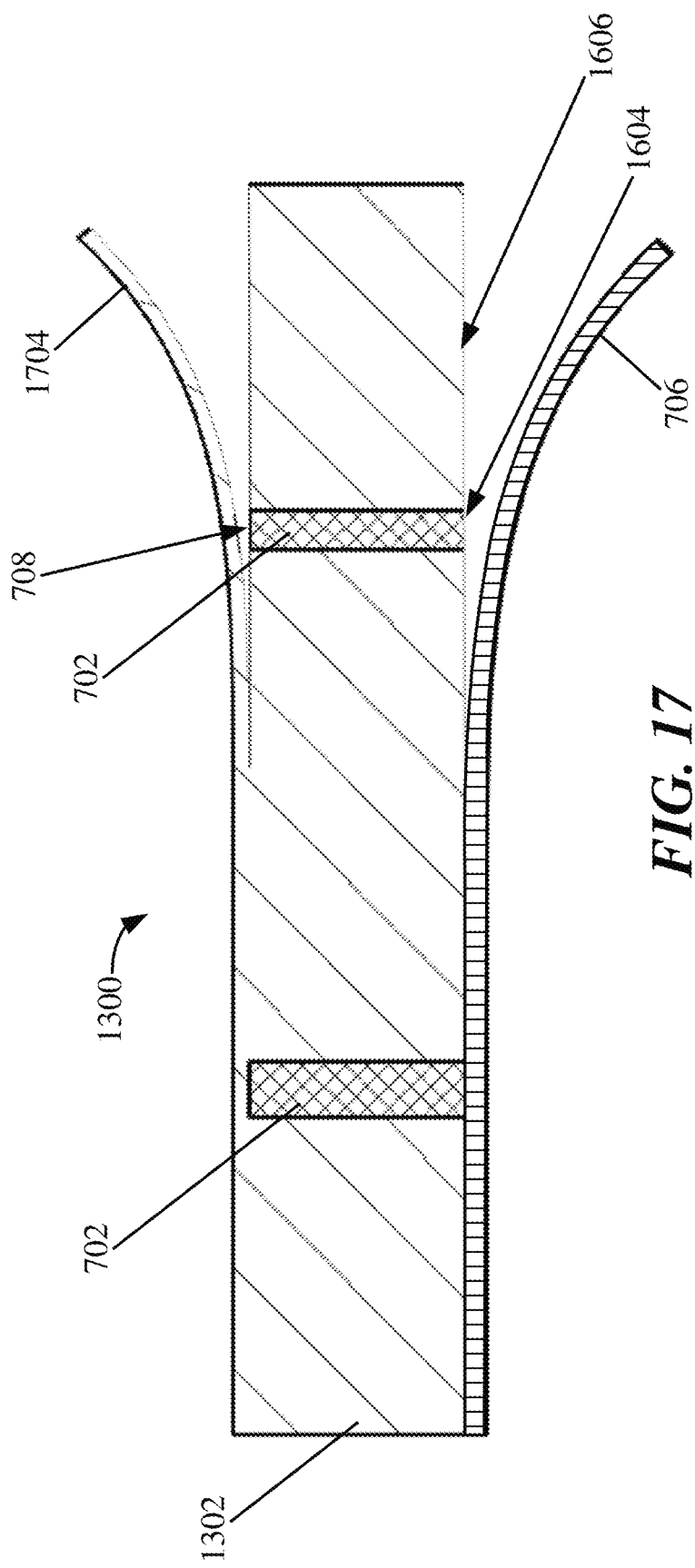
FIG. 17 illustrates a cross-sectional view of the unfinished item undergoing planar support member and top surface layer removal.

FIG. 17 illustrates a cross-sectional view of the unfinished item 1300 undergoing planar support member 706 and top surface layer 1504 removal. As mentioned above, removal of the planar support member 706 exposes the bottom surface 1604 of the first components 702 and the bottom surface 1606 of the second component 1302. Similarly, removal of the top surface layer 1504 exposes the top surface 708 of the first components 702.

Figure 18:
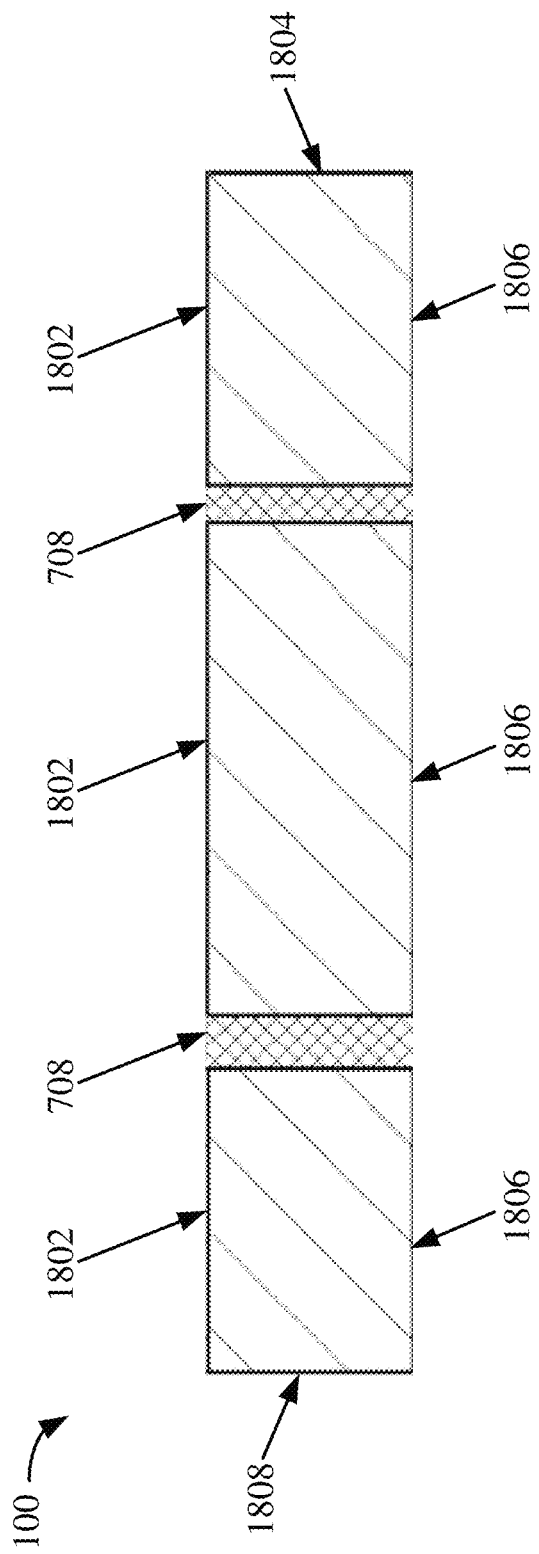
FIG. 18 illustrates a cross-sectional view of the finished item with the planar support member and top surface layer completely removed.

FIG. 18 illustrates a cross-sectional view of the finished item 100 with the planar support member 706 and top surface layer 1504 completely removed. After the planar support member 706 and/or the top surface layer 1504 is removed, one or more surfaces 1802, 1804, 1806, 1808 of the item may be finely sanded, cleaned, polished, and buffed to produce the finished item 100, such as the decorative panel 100 shown in FIGS. 1 and 2. The finished item 100 may also undergo protective sealant treatment where it is, for example, coated with clear polyurethane or urethane, then polished and buffed, to give it scratch resistant properties and sheen. The coating may also protect it from damage associated with long term ultraviolet radiation exposure.

Thus, the planar support member 706 helps keep the first components 702 secure and in position (e.g., relative to each other and the second component 1302) throughout the manufacturing process. Once the second component 1302 has hardened the planar support member 706 may be removed to reveal the finished item 100.

FIGS. 19-32 illustrate steps used in a method of manufacturing an item having various components according to one aspect. The method shown in FIGS. 19-32 is based on the generalized method shown in FIG. 6 and described above but also incorporates use of a mold during the manufacturing process. Note that in other aspects a mold may not be necessary to practice the inventive concepts disclosed herein. For reasons of clarity and simplicity, the steps shown in FIGS. 19-32 specifically form a decorative panel that includes lettering. However, the same steps shown and described may be used to manufacture many other items containing different types of components. Some non-exclusive examples of manufacturable items include, but are not limited to, windows, doors, table tops, tiles and flooring, dinnerware, countertops, soap, chocolate, candy, plaques, trophies, signs, logos, decorative art and pictures. Some non-exclusive examples of components within the item include, but are not limited to, three-dimensional block letters, numbers, characters, and decorative designs.

Figure 19A:
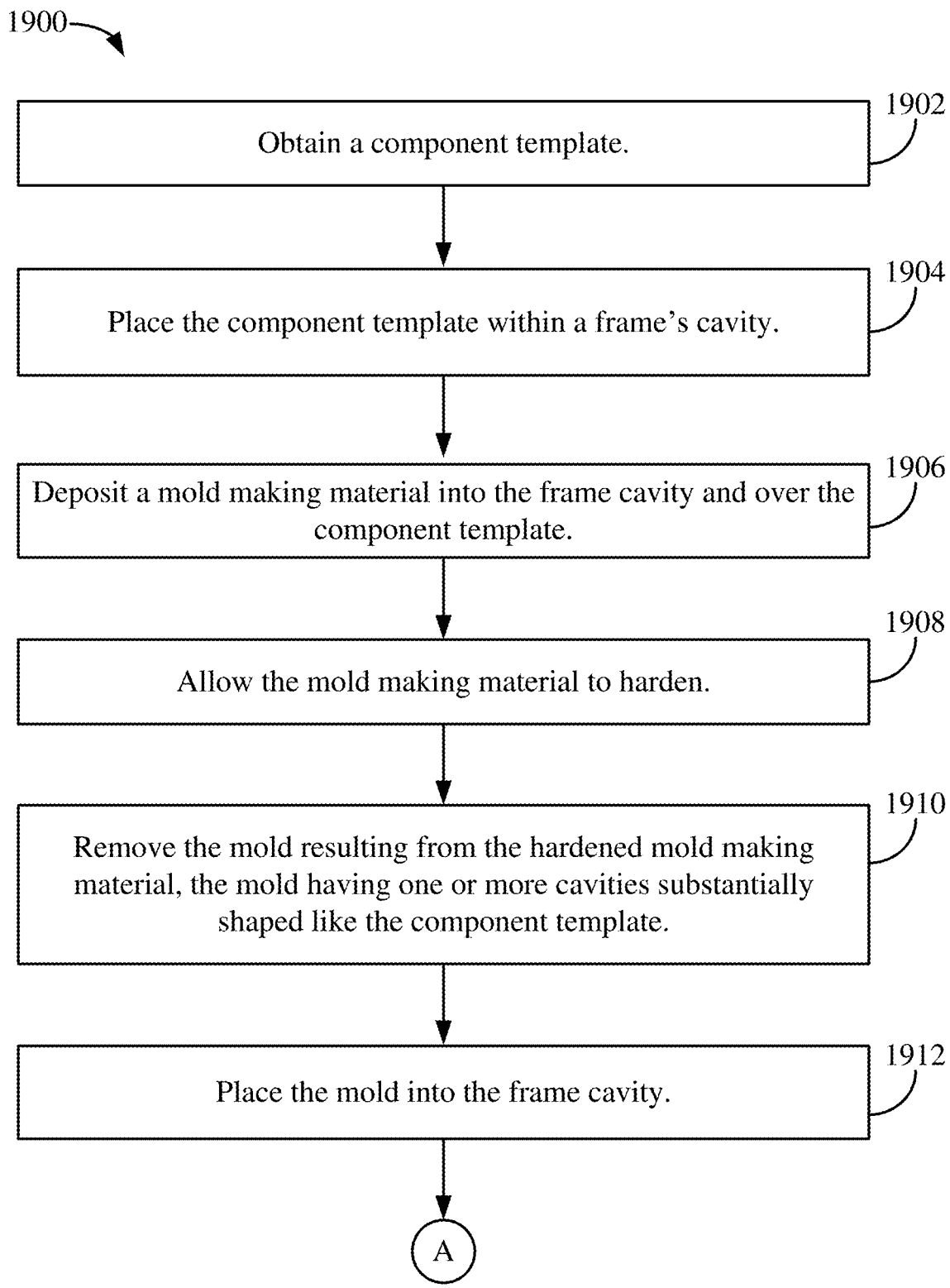
FIG. 19, comprised of FIGS. 19A and 19B, illustrates a process flow diagram of how a component support assembly having at least one first component and a planar support member may be obtained.
Figure 19B:
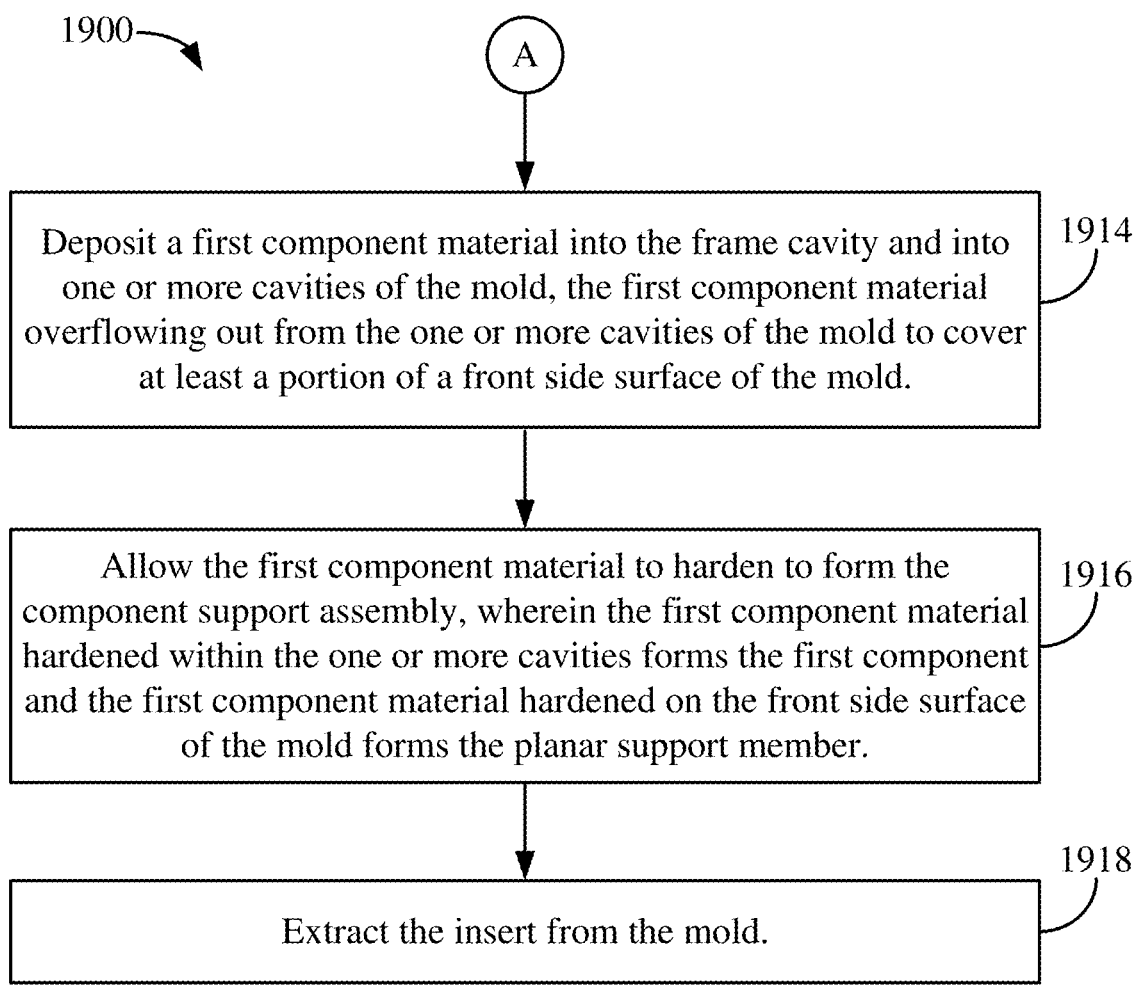

FIG. 19, comprised of FIGS. 19A and 19B, illustrates a process flow diagram 1900 of how a component support assembly having at least one first component and a planar support member may be obtained according to one aspect of the present disclosure. Referring to FIG. 19A, a component support assembly having at least one first component and a planar support member may be obtained by first obtaining 1902 a component template. Next, the component template may be placed 1904 within a frame's cavity. Then, a mold making material may be deposited 1906 into the frame cavity and over the component template. Next, the mold making material may be allowed 1908 to harden. Then, the mold resulting from the hardened mold making material may be removed 1910, the mold may have one or more cavities substantially shaped like the component template. Next, the mold is placed 1912 into the frame cavity.

Referring to FIG. 19B, a first component material may then be deposited 1914 into the frame's cavity and into one or more cavities of the mold, the first component material overflowing out from the one or more cavities of the mold to cover at least a portion of the front side surface of the mold. Next, the first component material may be allowed 1916 to harden to form the component support assembly, wherein the first component material hardened within one or more of the cavities forms the first component and the first component material hardened on the front side surface of the mold forms the planar support member. Finally, the component support assembly may be extracted 1918 or removed from the mold.

Figure 20:
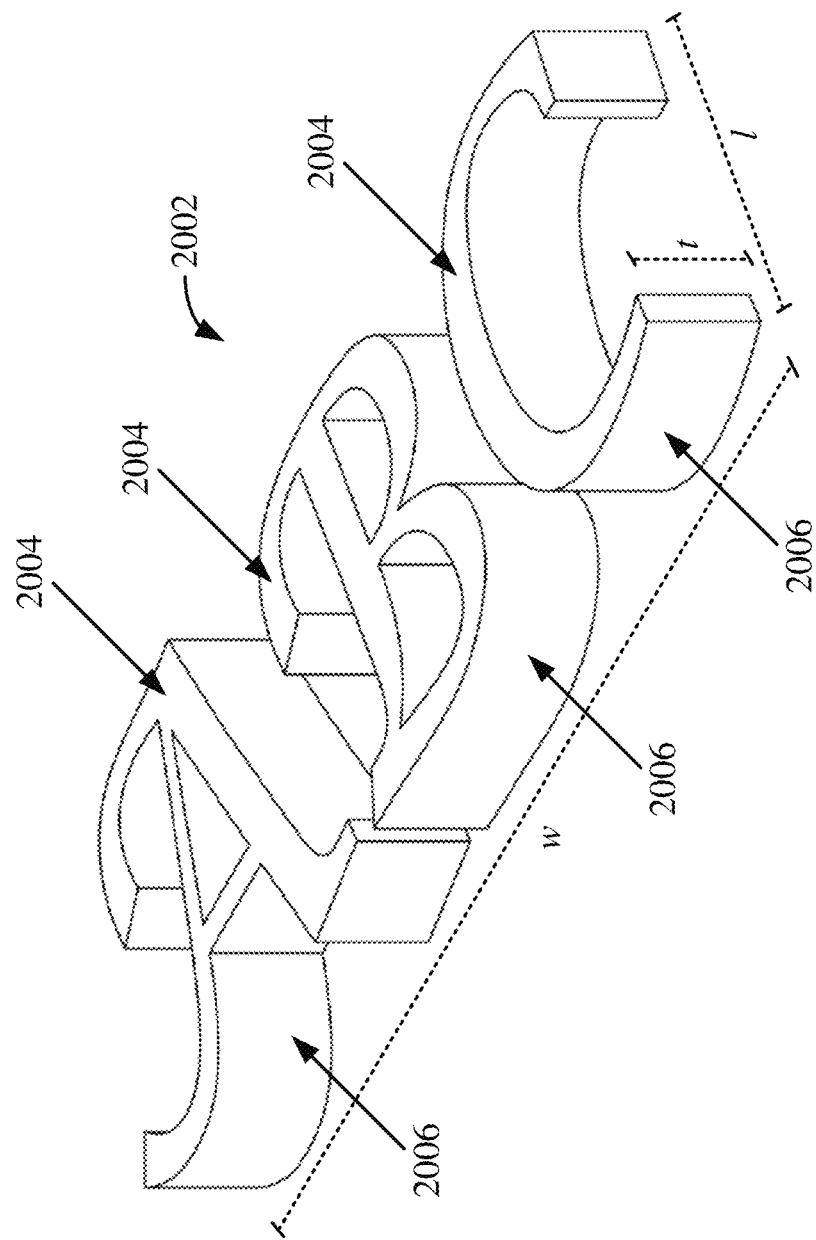
FIG. 20 illustrates a front-perspective view of a component template.
Figure 21:
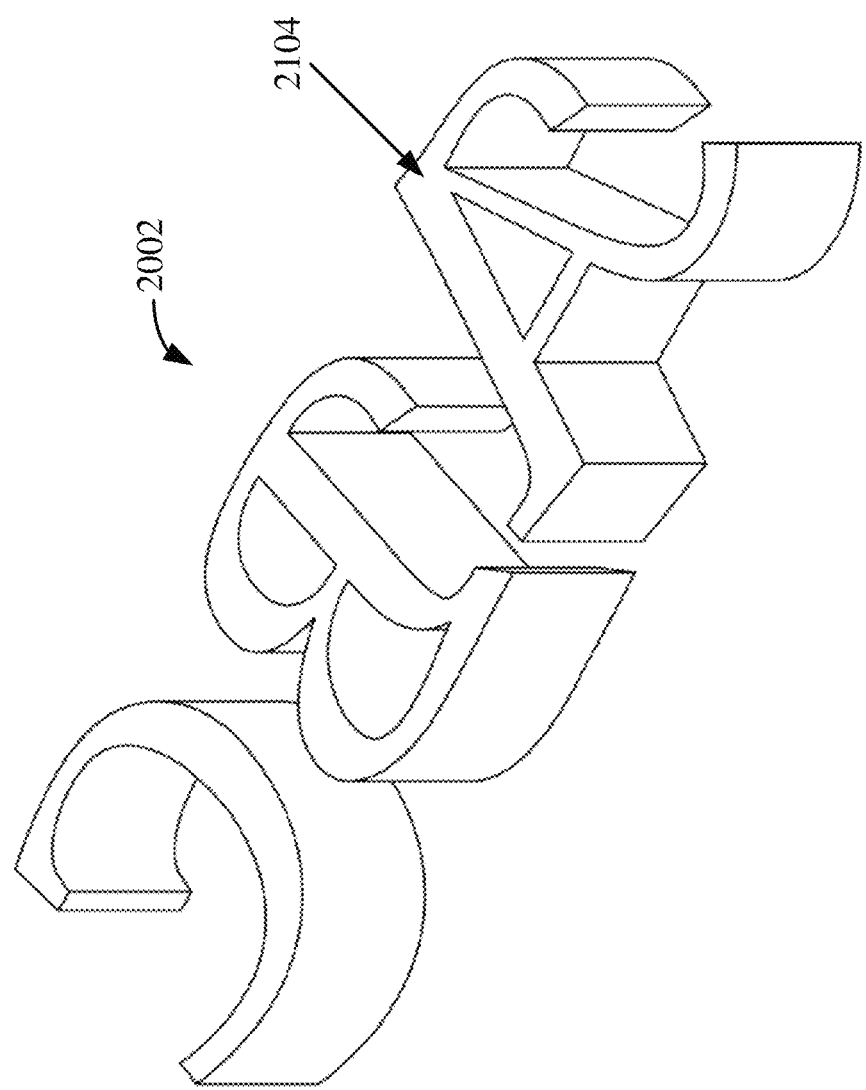
FIG. 21 illustrates a rear-perspective view of the component template shown in FIG. 20.

FIGS. 20 and 21 illustrate an component template 2002 according to one aspect. Specifically, FIGS. 20 and 21 illustrate a front-perspective view and a rear-perspective view of the component template 2002, respectively. In the example shown, the component template 2002 may be made based on the 2D shape 500 shown in FIG. 5 using, for example, a cutting process (e.g., using CNC routers, band saws, etc.) or an extrusion process.

Referring to FIGS. 20 and 21, the component template 2002 is used to create the actual first component(s) used in the finished item. The component template 2002 may have an overall shape and dimensions (e.g., thickness t, width w, and length l) that are representative of the actual first component's shape and size that the manufacturer desires to be included within the finished item. The thickness t may be substantial in that it may be on the same order of the length l and/or width w of the component template 2002. According to one aspect, the thickness t may be, for example, 0.01 to 5.0 times the size of the length l and/or the width w. In the example shown, the component template 2002 is lettering, and is made of a substantially rigid material such as wood, metal, plastic, ceramic, or plaster.

According to one aspect, the component template 2002 may have a substantially flat top surface (e.g., first surface) 2004 and a substantially flat bottom surface (e.g., second surface) 2104 that is opposite to the top surface 2004. The component template 2002 may also have a constant cross-section that does not vary substantially throughout the thickness t of the component template 2002 as shown in FIGS. 20 and 21. Moreover, the component template 2002 may have side surfaces 2006 that are substantially orthogonal to the top and bottom surfaces 2004, 2104 of the component template 2002. In some aspects, however, the component template 2002 (and the components resulting from the template 2002) may have a cross-section that decreases or increases in size (e.g., width and length) from the bottom surface 2104 to the top surface 2004. An extrusion process may not be used to create the component template in such a case. However, other methods, such as cutting processes (e.g., CNC routers) or 3D printing, may be used to create such non-constant cross-sectional component templates.

Figure 22:
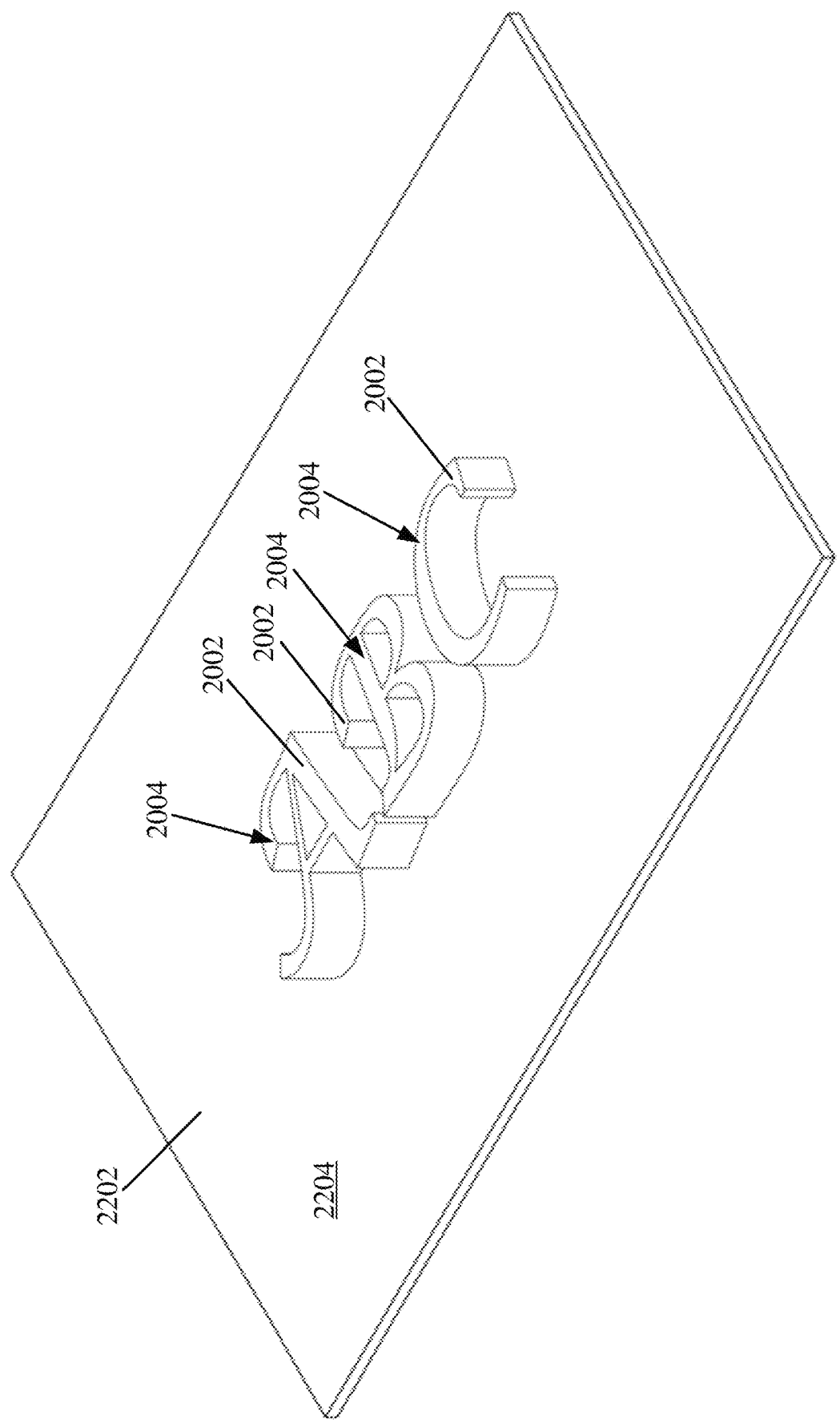
FIG. 22 illustrates the component template secured to a top surface of a template support member.

Referring to FIG. 22, the component template 2002 is secured to a template support member 2202. If the component template 2002 comprises multiple components (like the example shown) then each component is secured to the template support member 2202 at the desired distances from one another to replicate features of the 2D design 500 (see FIG. 5) selected. In the illustrated example, the bottom surface 2104 (see FIG. 21) of the component template 2002 is secured to a top surface 2204 (e.g., "first surface") of the template support member 2202 so that the top surface 2004 of the component template 2002 is right-side up as shown. In other aspects, the top surface 2004 of the component template 2002 may be secured to the top surface 2204 of the template support member 2202 so that the bottom surface 2104 of the component template 2002 is right-side up. The template support member 2202 may be a rigid sheet made of glass, wood, metal, plastic, etc. In some aspects, the template support member 2202 may be somewhat flexible and made of, for example, cardboard, paper, etc. The component template 2002 may be secured to the template support member 2202 using various securing means such as, but not limited to, adhesive tape, adhesive glue, putty, modeling compound, and/or fasteners.

Figure 23:
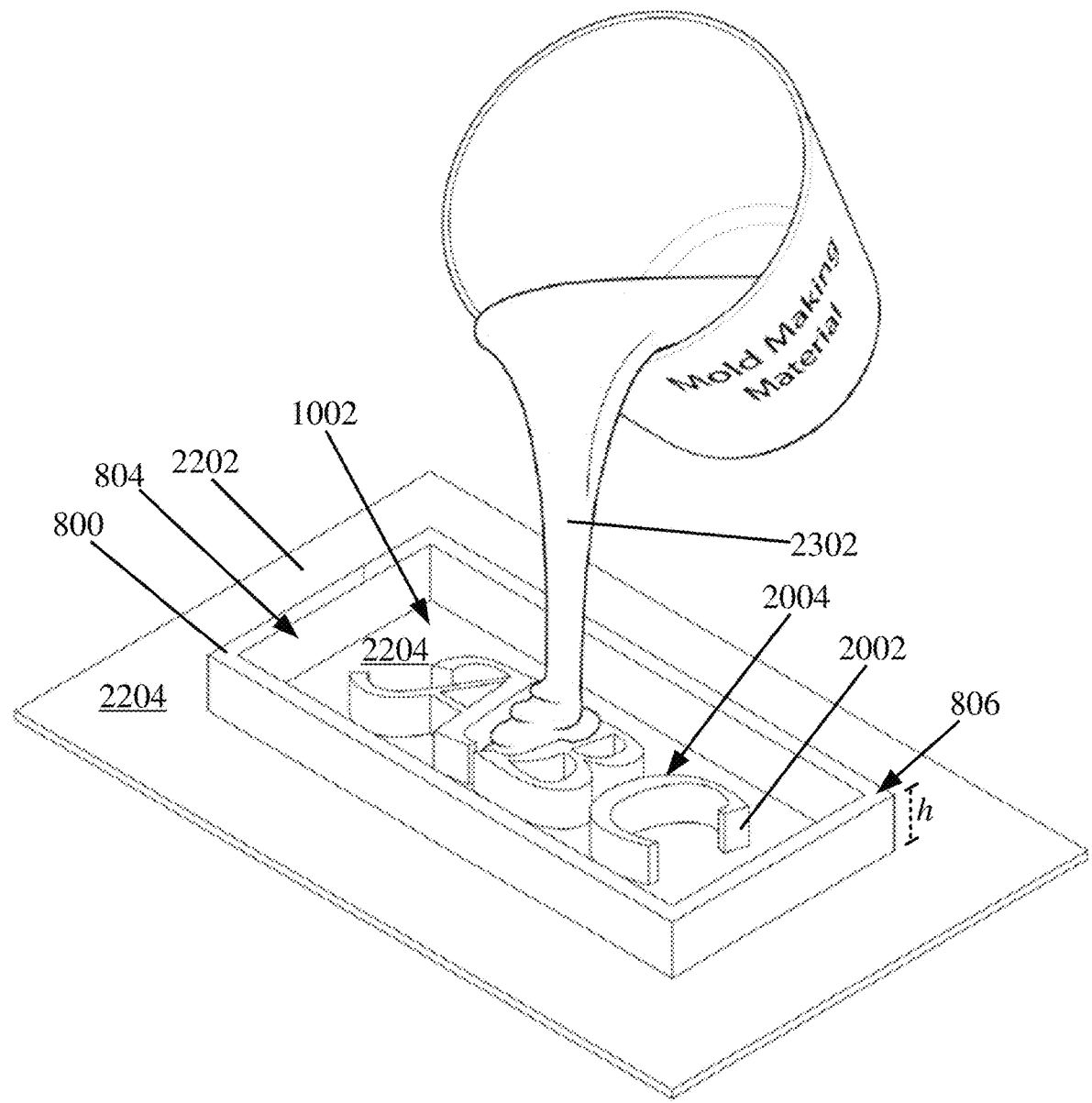
FIG. 23 illustrates that a frame may be secured onto the template support member and around the component template, and mold making material is poured onto the component template and a stop surface of the template support member.

Referring to FIG. 23, the frame 800 may be secured onto the template support member 2202 and around the component template 2002. The frame's 800 bottom perimeter surface 902 may be secured onto the top surface 2204 of the template support member 2202 using various securing means such as, but not limited to, adhesive tape, adhesive glue, putty, modeling compound, plaster, and/or fasteners. The frame 800 has a height h between its bottom perimeter surface 902 and top perimeter surface 806 that may be greater (i.e., taller) than the thickest portion of the component template 2002. In the example shown, the characters that make up the component template 2002 all have a substantially equal thickness t (see FIG. 20) and so the height h of the frame 800 may be greater than the thickness t of the component template 2002. With the frame 800 positioned around the component template 2002, inner side surfaces 804 of the frame 800 (e.g., frame cavity inner side surfaces) and the template support member's top surface 2204 (e.g., frame cavity bottom surface) together form the frame cavity 1002 that may be filled with a first mold making material 2302. The frame's inner side surfaces 804 may be orthogonal to the template support member's top surface 2204.

Next, the first mold making material 2302 may be poured into the cavity 1002 covering the component template 2002. The mold making material 2302 may be continuously poured until the component template 2002 and its top surface 2004 is fully covered. That is, the mold making material 2302 may be poured until its depth is greater than the thickest portion of the component template 2002 (e.g., greater than the thickness t of the component template 2002) but less than or equal to the height h of the frame 800. According to one aspect, the mold making material 2302 is poured just enough so that the top surface 2004 of the component template 2002 is covered. The mold making material 2302 may be comprised of silicone rubber, polyurethane rubber, plastic, polymers, plaster, ceramic, silica sand, metal, or any other fluid substance that can later cure or harden to form a solid mold.

Figure 24:
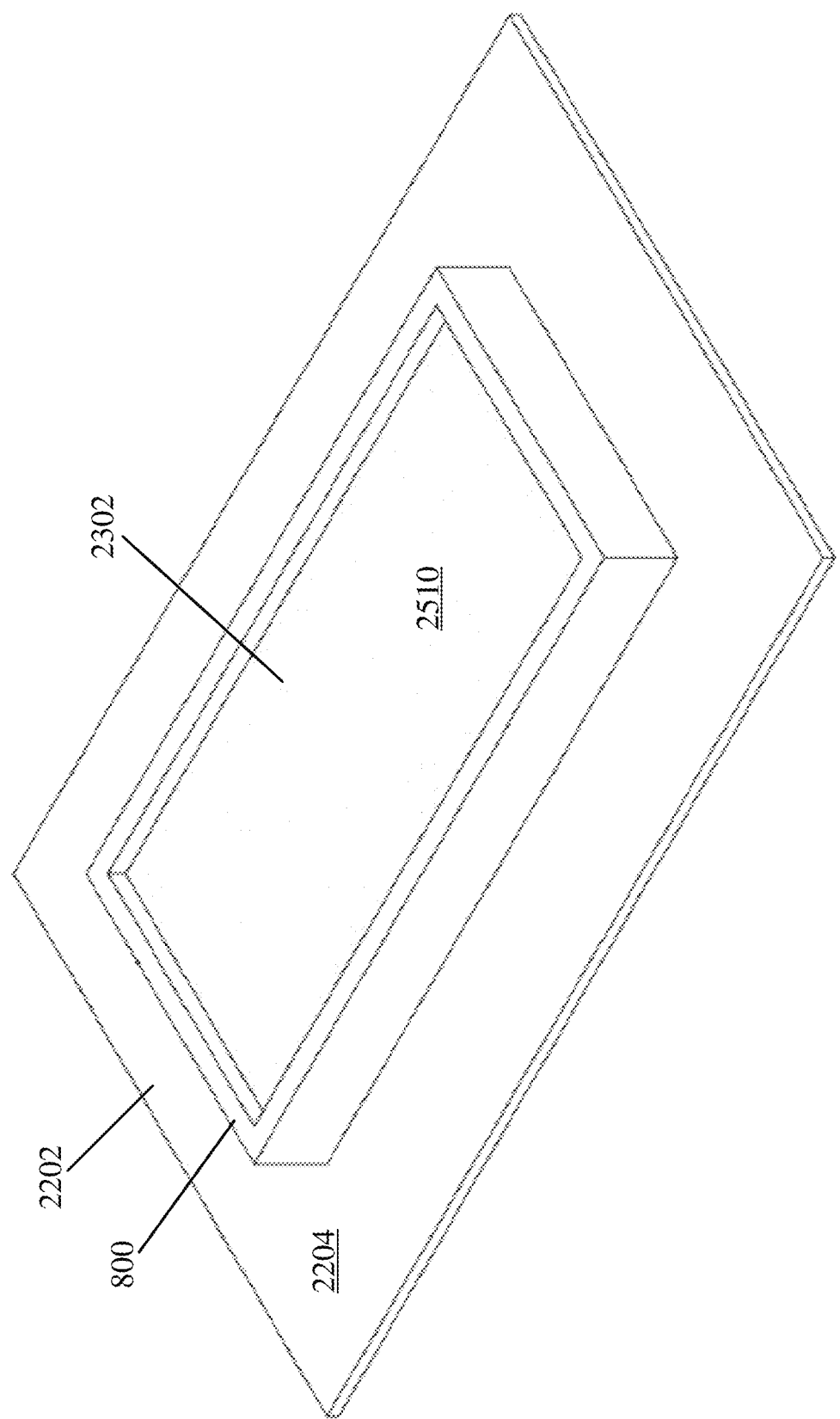
FIG. 24 illustrates that mold making material may be poured over the component template so that it fully covers the component template underneath.

FIG. 24 illustrates the process at a stage where the mold making material 2302 has been poured over the component template 2002 so that it fully covers the component template 2002 underneath. The mold making material 2302 is then allowed to cure and/or harden, which depending on the mold making material used, may need, among other things, passage of time, temperature changes, pressure changes, and/or electromagnetic radiation such as exposure to ultraviolet light to cure or harden.

Figure 25:
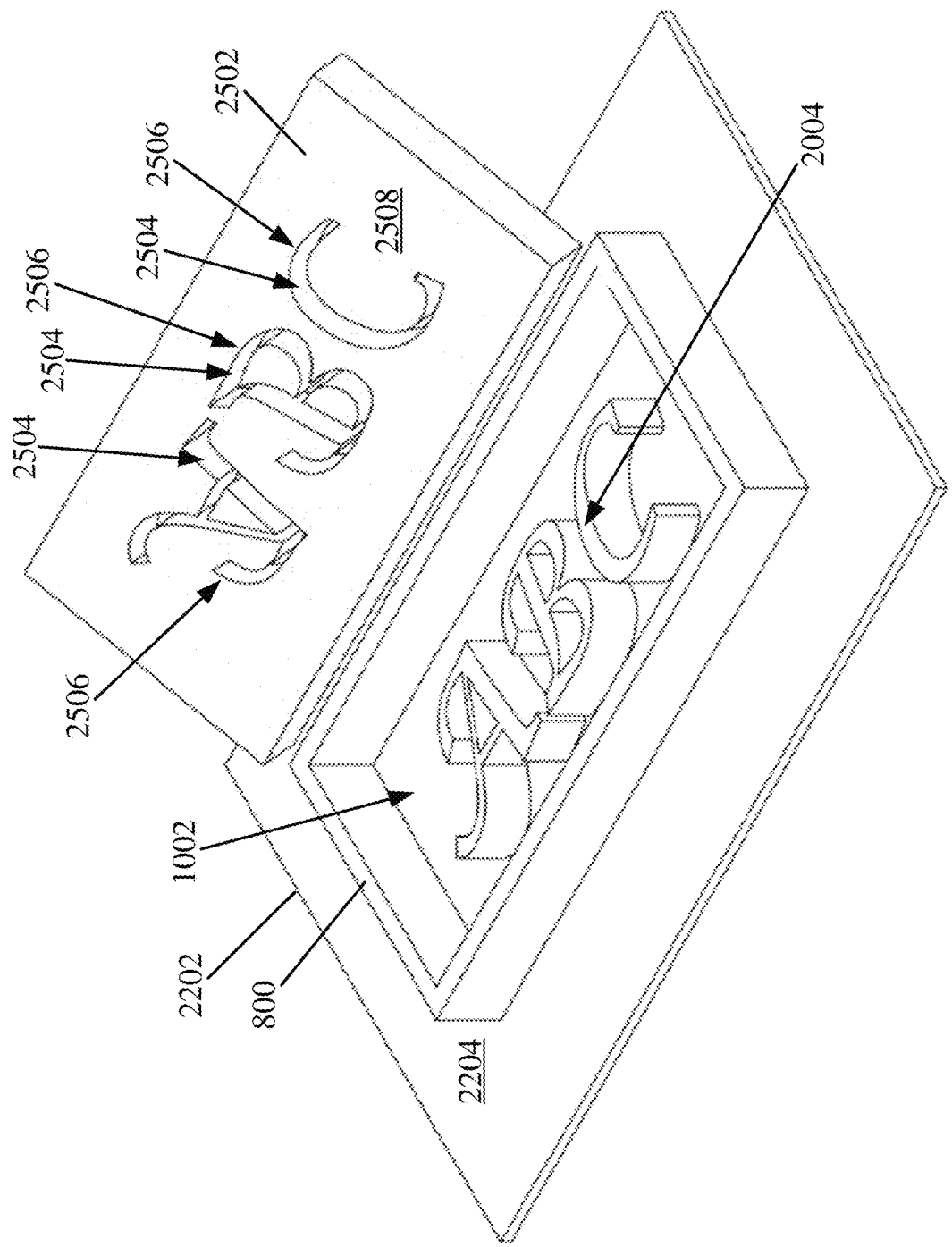
FIG. 25 illustrates removal of the resulting mold from the frame's cavity once the mold making material has sufficiently hardened.

Referring to FIGS. 24 and 25, once the mold making material 2302 has sufficiently hardened, the hardened mold 2502 may be removed out from the frame's cavity 1002. Since the mold making material 2302 hardened while covering the component template 2002, the resulting mold 2502 will have a cavity 2504 in the shape and size of the component template 2002. Moreover, the mold's cavity openings 2506 will have the same size and shape of the component template's bottom surface 2104 (see FIG. 21). In the example shown in FIG. 25, the mold's cavity openings 2506 also has a size and shape that is the mirror image of the component template's top surface 2004. The mold 2502 has a front side surface 2508 and back side surface 2510 (see FIG. 24). In some aspects, the hardened mold 2502 is removed out from the frame's cavity 1002 by first removing the frame 800 up off of the template support member 2202. The mold 2502 is then removed up off the template support member 2202 and the frame 800 is placed back on the same or different template support member 2202.

Figure 26:
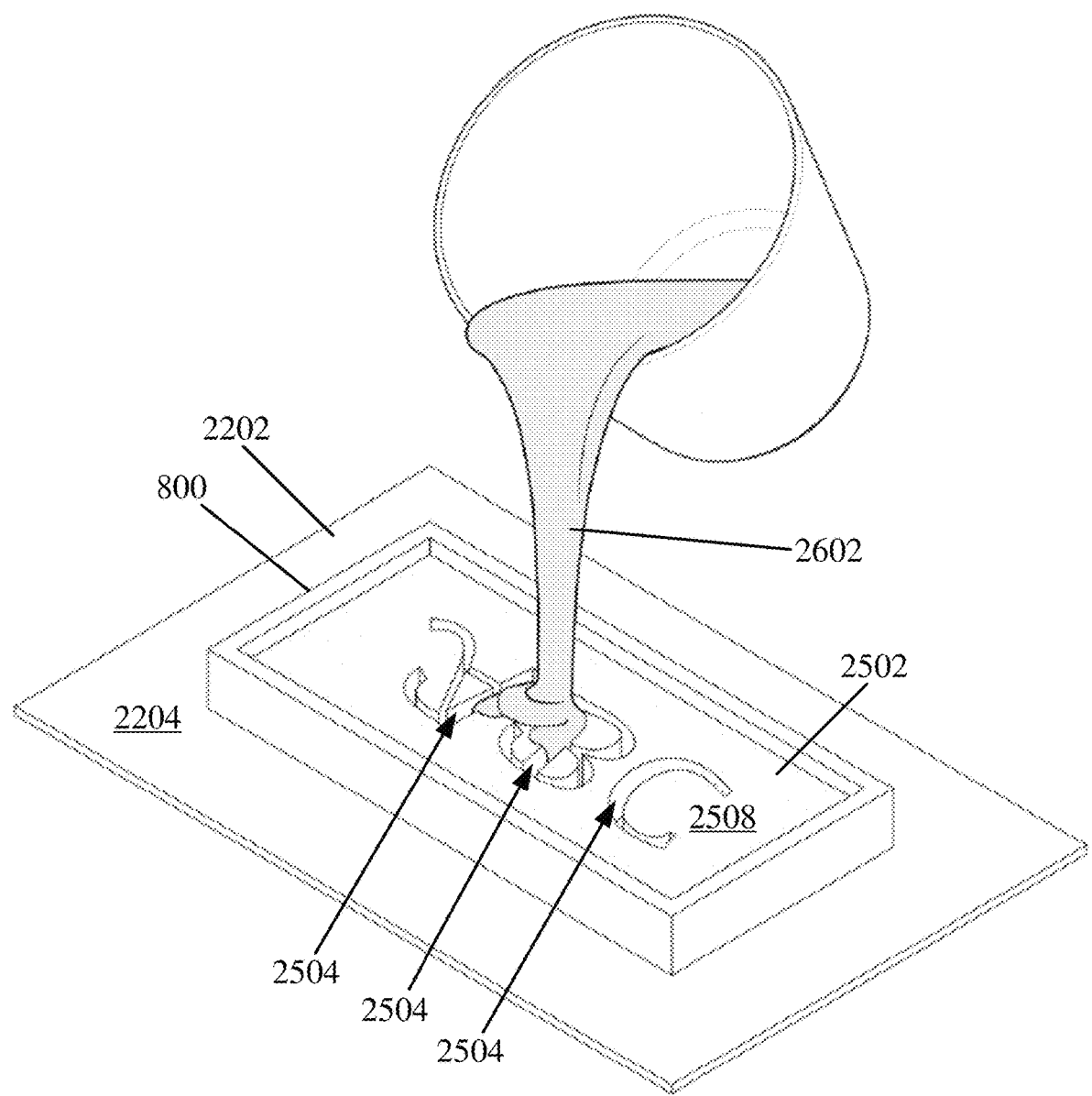
FIG. 26 illustrates that the mold may be placed back into the frame with the mold's front side surface up and a first component material is deposited into the mold's cavities.

Referring to FIG. 26, the mold 2502 may then be placed back into the frame 800 with the mold's front side surface 2508 up as shown (e.g., back side surface 2510 down against the template support member's top surface 2204). Next, first component material(s) 2602 for making the first components of the item may be deposited into the mold's material receiving cavities 2504. The first component material 2602 poured in may be either cold process material(s) or hot process material(s). In some aspects, different first component materials 2602 may be poured into different cavities 2504 in order to create first components made of different materials and having different colors and transparency/opacity.

In the example shown in FIG. 26, the first component material 2602 is pourable. However, in other aspects of the present disclosure, the first component material 2602 is not a pourable liquid. Instead, the first component material 2602 may comprise many small pieces (e.g., chips) of a solid material, such as glass, metal, plastic (e.g., acrylic), or some other solid. The frame's cavity 1002 and the mold's cavities 2504 are filled with these pieces, and then the frame 800 along with the mold 2502 containing the pieces may be subjected to high heat (e.g., in a kiln) to melt the small solid pieces. Upon melting, the resulting liquid (e.g., molten metal or molten glass) creeps into and fills the space within the mold's cavities 2504.

Figure 27:
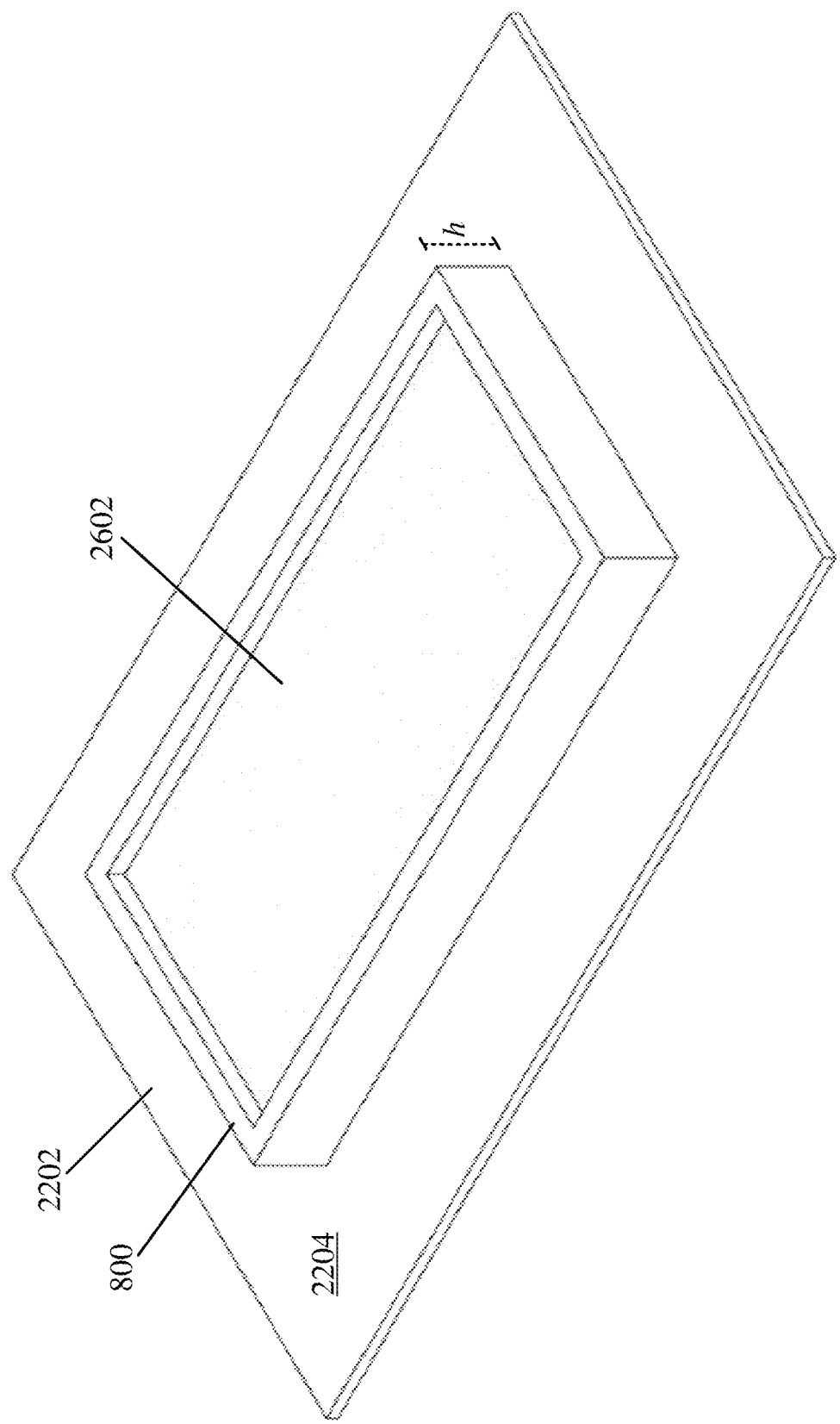
FIG. 27 illustrates that the first component material is deposited into the mold's cavities until the material covers the mold.

Referring to FIGS. 26 and 27, the first component material 2602 is poured into the mold's cavities 2504 so that the mold's cavities 2504 are completely filled. Additional first component material 2602 may also be deposited so that a portion or all of the mold's front side surface 2508 is also covered. The first component material 2602 is then allowed to cure and/or harden, which depending on the material deposited, may need, among other things, passage of time, temperature changes, pressure changes, and/or electromagnetic radiation such as exposure to ultraviolet light to cure or harden.

Figure 28:
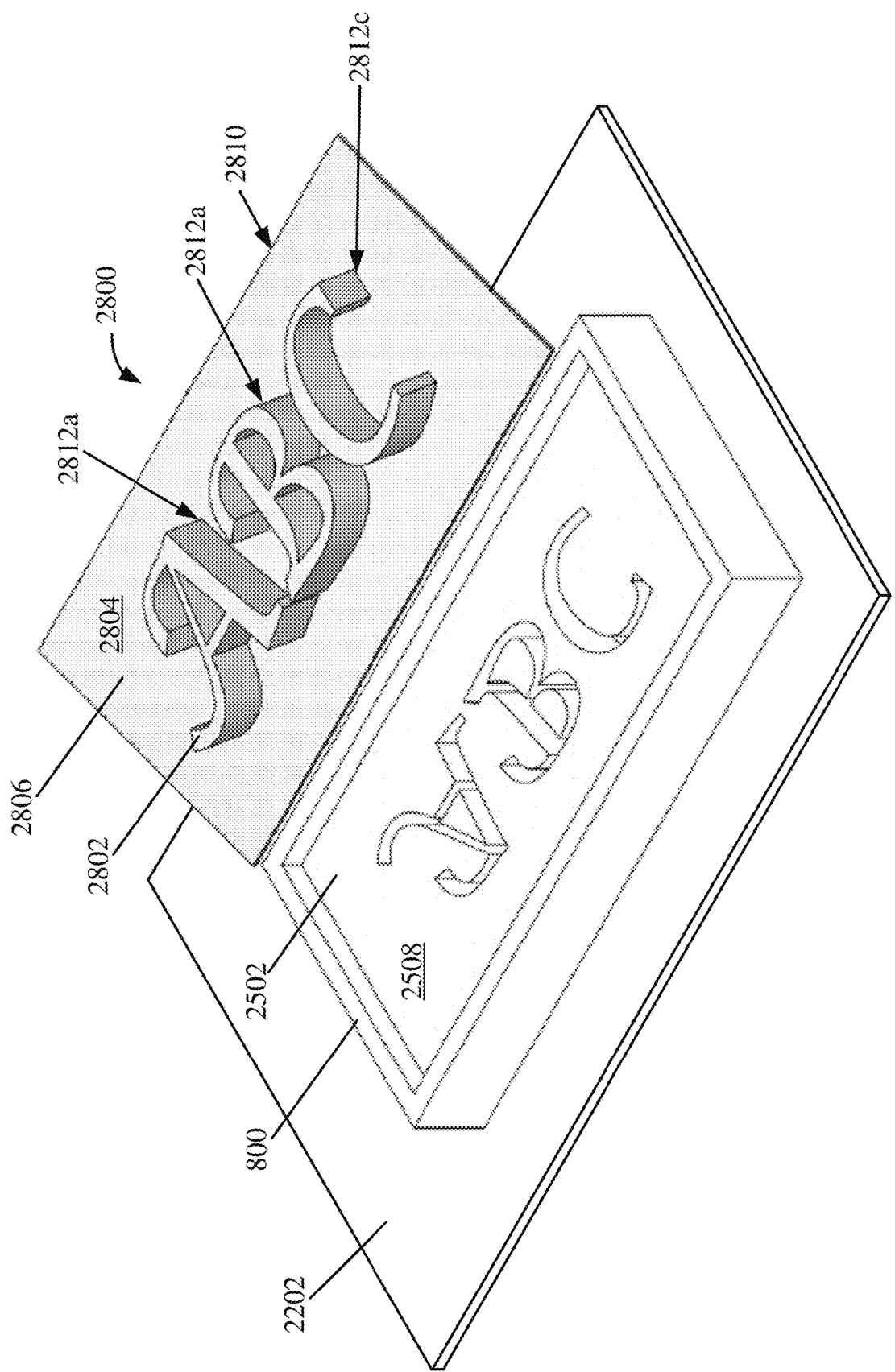
FIG. 28 illustrates that the resulting component support assembly is removed from the mold once the first component material in the mold has hardened or cured.

Referring to FIG. 28, once the first component material 2602 in the frame 800 has hardened or cured, the resulting component support assembly 2800 is removed from the mold 2502. Since the first component material 2602 poured into the frame's cavity 1002 in the previous step (see FIGS. 26 and 27) not only filled the mold's cavities 2504, but may have also filled up to a level above the mold's front side surface 2508, the component support assembly 2800 includes not only the first components 2802 but also a planar support member 2806. In this case, the planar support member 2806 is made of the same first component material 2602 as the first components 2802. Moreover, in the example shown, the planar support member 2806 has a perimeter edge 2810 that extends beyond the perimeter edges 2812a, 2812b, 2812c of the first components 2802.

The resulting first components 2802 will have the same size, shape, and dimensions of the component template 2002 but may be composed of a different material 2602 (see FIG. 26) than the component template 2002. According to one aspect, enough first component material 2602 is deposited into the frame's cavity 1002 in the step shown in FIG. 26, so that the resulting planar support member 2806 is thick enough to securely hold and support the attached first components 2802, yet may be thin enough so as to allow for easy removal of the planar support member 2806 in subsequent steps. In some aspects, the component support assembly 2800 is removed out from the mold's cavities 2504 by first removing the frame 800 up off of the template support member 2202. The mold 2502 is then removed up off the template support member 2202 and the frame 800 is placed back on the same or different template support member 2202. The component support assembly 2800 may then be removed from out of the mold 2502.

Figure 29:
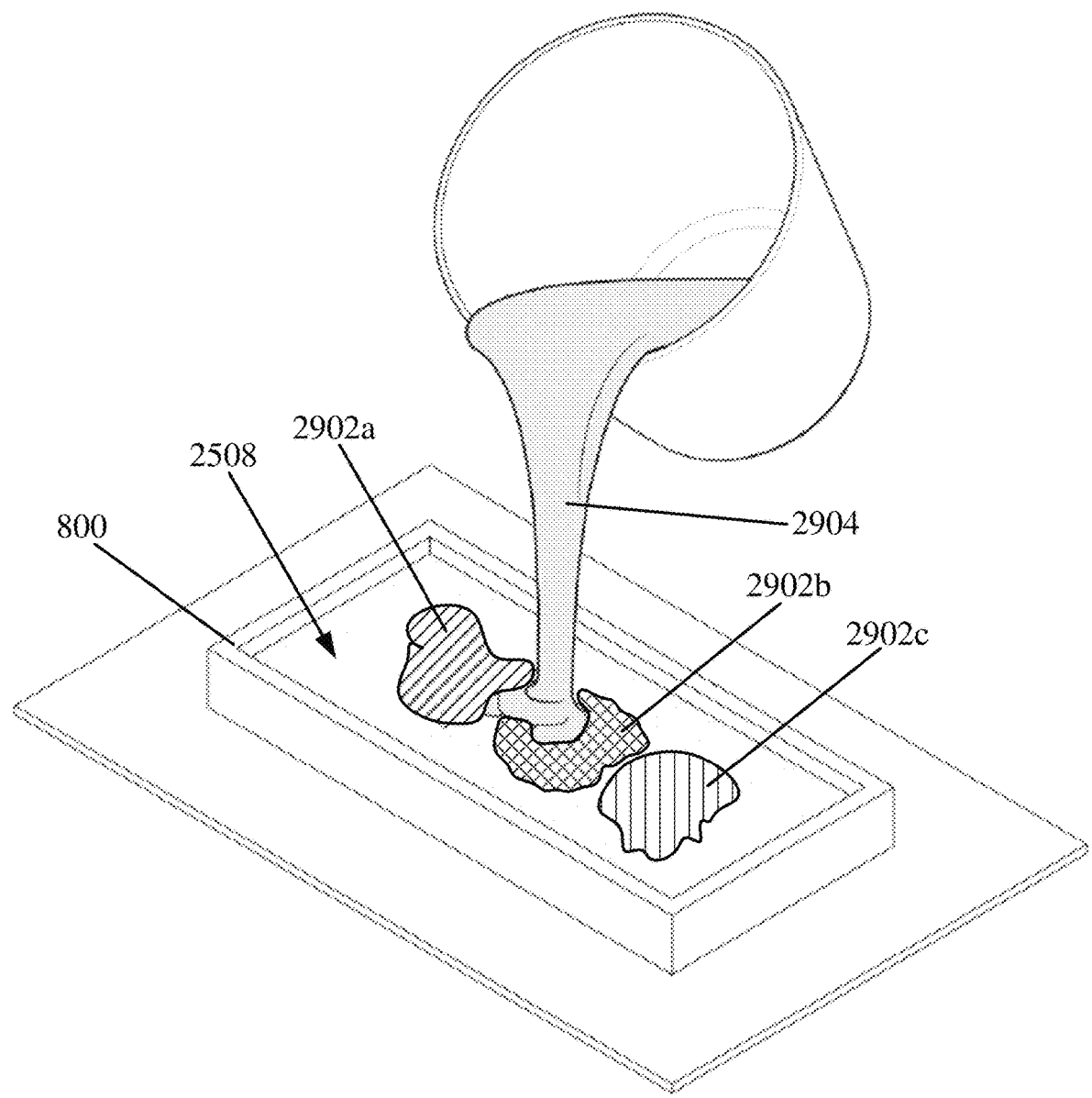
FIG. 29 illustrates that alternatively different component materials having, for example, different colors, opacity, and other varying characteristics, may be poured into the mold's various cavities.

FIG. 29 illustrates an alternative and additional step in the process in the event different component materials are poured into the mold's various cavities. In the example shown in FIG. 29, for instance, three different component materials 2902a, 2902b, 2902c have been poured into the mold's three different cavities representing the characters A, B, C such that the cavities are completely filled (some may also pour out onto the surrounding mold's front side surface 2508). The different component materials 2902a, 2902b, 2902c may have different colors, translucency, and/or be made of different materials. After all the mold's cavities have been filled with component material 2902a, 2902b, 2902c, another binding material 2904 may be poured on top of the mold's front side surface 2508 that binds to and connects the three other component materials 2902a, 2902b, 2902c. The binding material 2904 may be a different material or may simply be one of the three component materials 2902a, 2902b, 2902c used.

Figure 30:
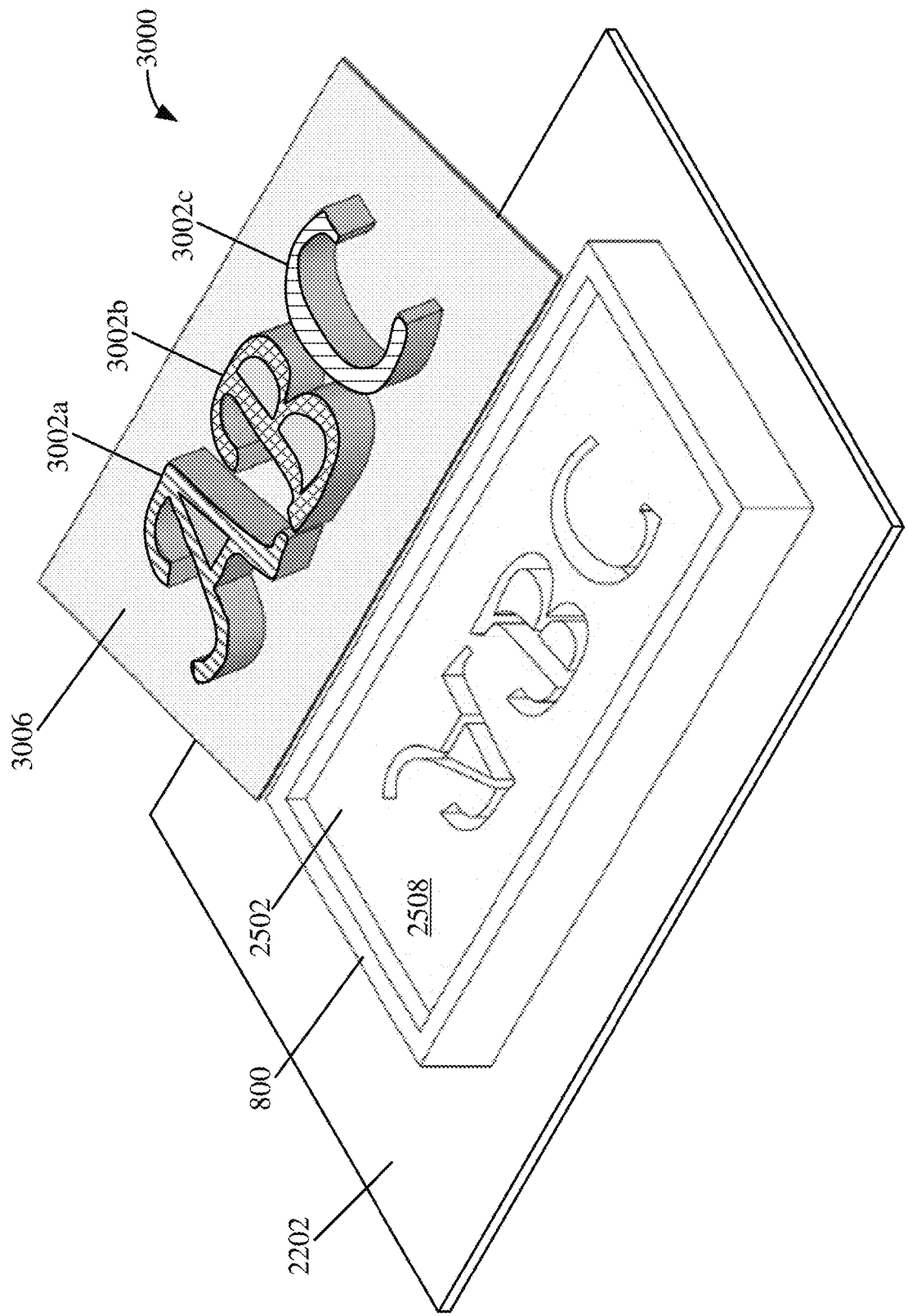
FIG. 30 illustrates that the resulting component support assembly made of different component materials may be removed from the mold once the different component materials in the mold have hardened or cured.

Referring to FIG. 30, after all the materials 2902a, 2902b, 2902c, 2904 harden, the resulting component support assembly 3000 may be removed from the mold 2502. The resulting component support assembly 3000 includes three components 3002a, 3002b, 3002c (e.g., three first components) comprised of the three different component materials 2902a, 2902b, 2902c, respectively, and a planar support member 3006 substantially comprised of the binding material 2904, which as described above may simply be one of the three component materials 2902a, 2902b, 2902c.

Figure 31:
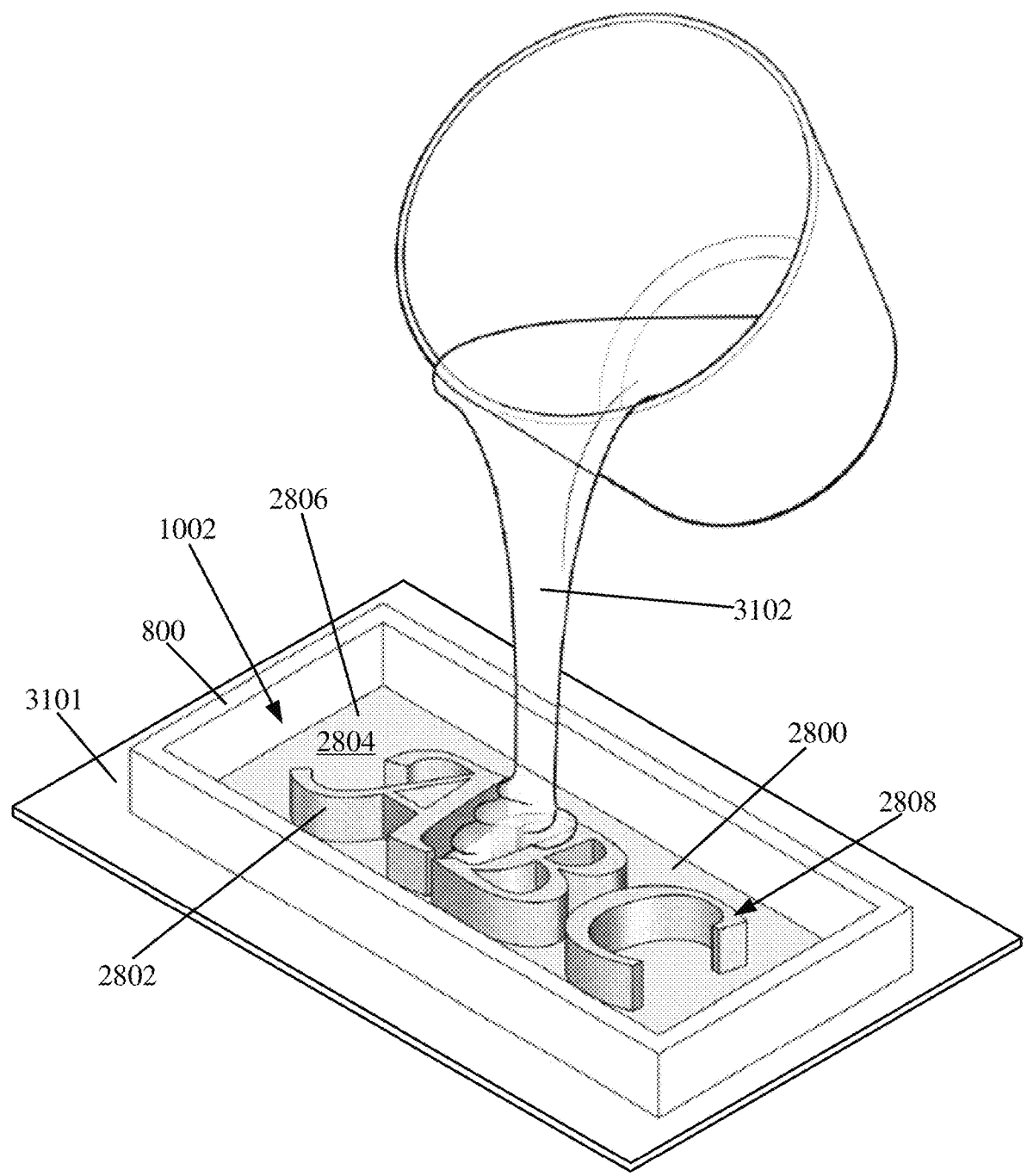
FIG. 31 illustrates that the component support assembly may be placed back into the frame's cavity and a second component material is deposited onto the component support assembly.

Referring to FIGS. 28 and 31, the mold 2502 within the frame 800 is removed and replaced with the component support assembly 2800 (component support assembly 3000 from FIG. 30 may also be used). That is, the frame 800 may be placed onto a top surface 2804 of the planar support member 2806 such that the frame 800 surrounds the first components 2802. Alternatively, the frame 800 may be placed around the planar support member 2806 (e.g., component support assembly 2800 is placed within frame 800) such that, again, the frame 800 surrounds the first components 2802 (e.g., example shown in FIG. 31). In the latter case, the entire frame 800 and component support assembly 2800 may rest on a flat support structure 3101 (e.g., table, floor, etc.).

Figure 32:
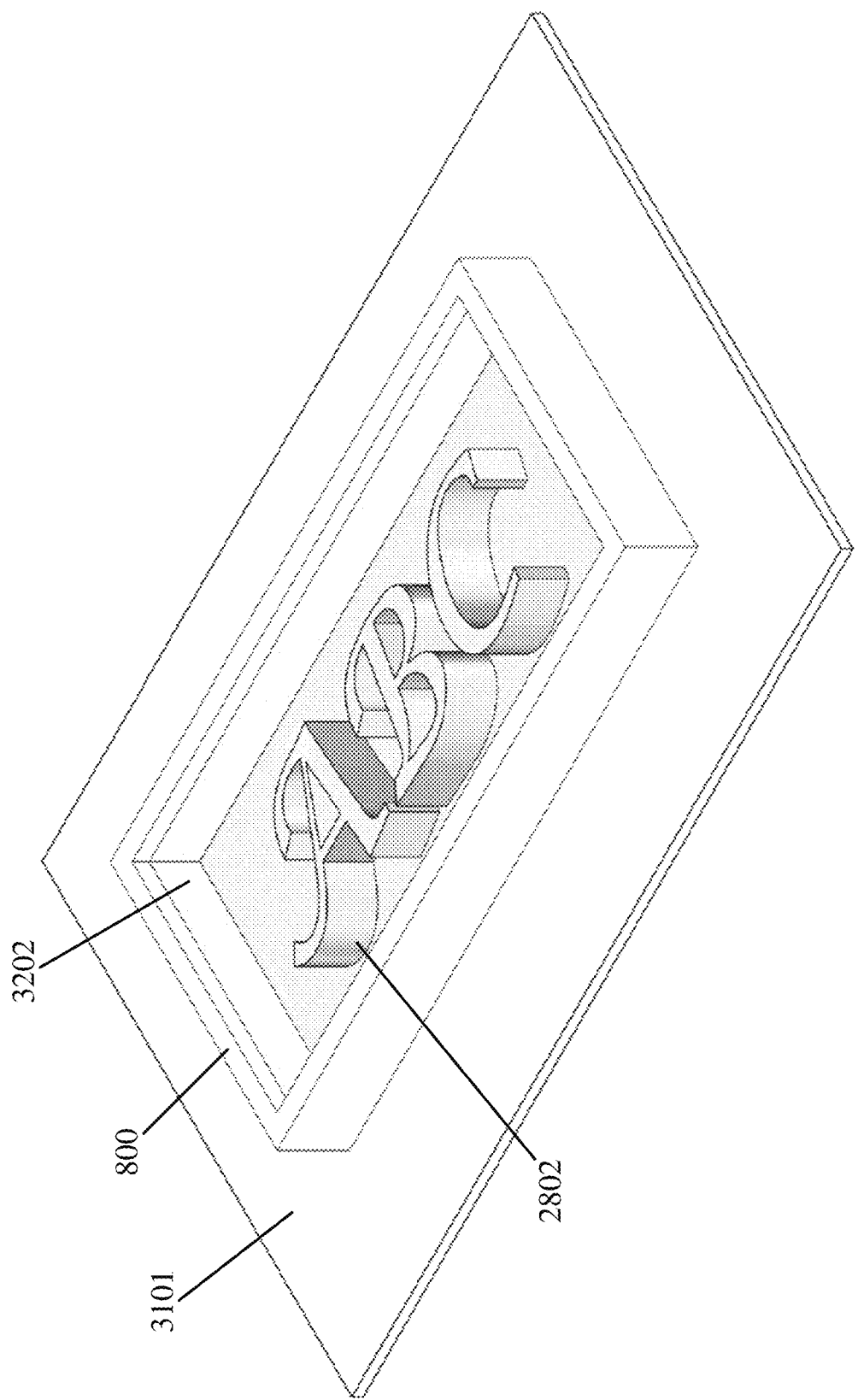
FIG. 32 illustrates that the second component material may be deposited until it covers the component support assembly, and is then allowed to harden.

Next, a second component material(s) 3102 for making the second component of the item is deposited into the frame's cavity 1002, and over the planar support member's top surface 2804 and the first components 2802. In one aspect, the second component material 3102 may be deposited to a level high enough so that it covers the top surface 2808 of the first components 2802. That is, in some aspects the second component material 3102 deposited may have a resulting height/thickness that is equal to or greater than the height of the first components' top surfaces 2808. An example of such an aspect is shown in FIG. 32 where the second component material 3102 has been deposited to completely cover the first components 2802 underneath. In other aspects, the second component material 3102 deposited may have a resulting height/thickness that is less than the height of the first components' top surfaces 2808. (e.g., see FIG. 33.)

Referring to FIG. 32, once the second component material 3102 has been deposited into the frame's cavity 1002, the second component material 3102 is allowed to harden and bind to the first components 2802 and at least a portion of the planar support member's top surface 2804 without substantially changing the first components' 2802 shapes. The second component material 3102 deposited may be a liquid material (e.g., cold or hot process material) that is poured into the frame's cavity 1002. In other cases, the second component material 3102 deposited may be solid pieces (e.g., chips) that may be heated after deposition to liquefy before being allowed to harden and bind to the component support assembly 2800.

According to one aspect, the second component material 3102 used to form the second component 3202 of the manufactured item may differ from the first component material 2602 used to form the first components 2802 in its transparency. For example, the second component material 3102 may be transparent or translucent whereas the first component material 2602 may be substantially opaque. As another example, the first component material 2602 may be transparent or translucent whereas the second component material 3102 may be substantially opaque. Regardless of whether the first component material 2602 is more transparent than the second component material 3102 or vice versa, the difference in transparency between the manufactured various components causes the end product to have an aesthetically pleasing, full-bodied 3D look and feel. Furthermore, the component materials 2602, 3102 may also differ in their color, composition, and finish.

After the second component material 3102 deposited into the frame's cavity 1002 has hardened and is bound to the component support assembly 2800, the unfinished item may be removed and finished according to the same steps described above with respect to FIGS. 13-18 to produce the finished item 100 (see FIG. 18).

Figure 33:
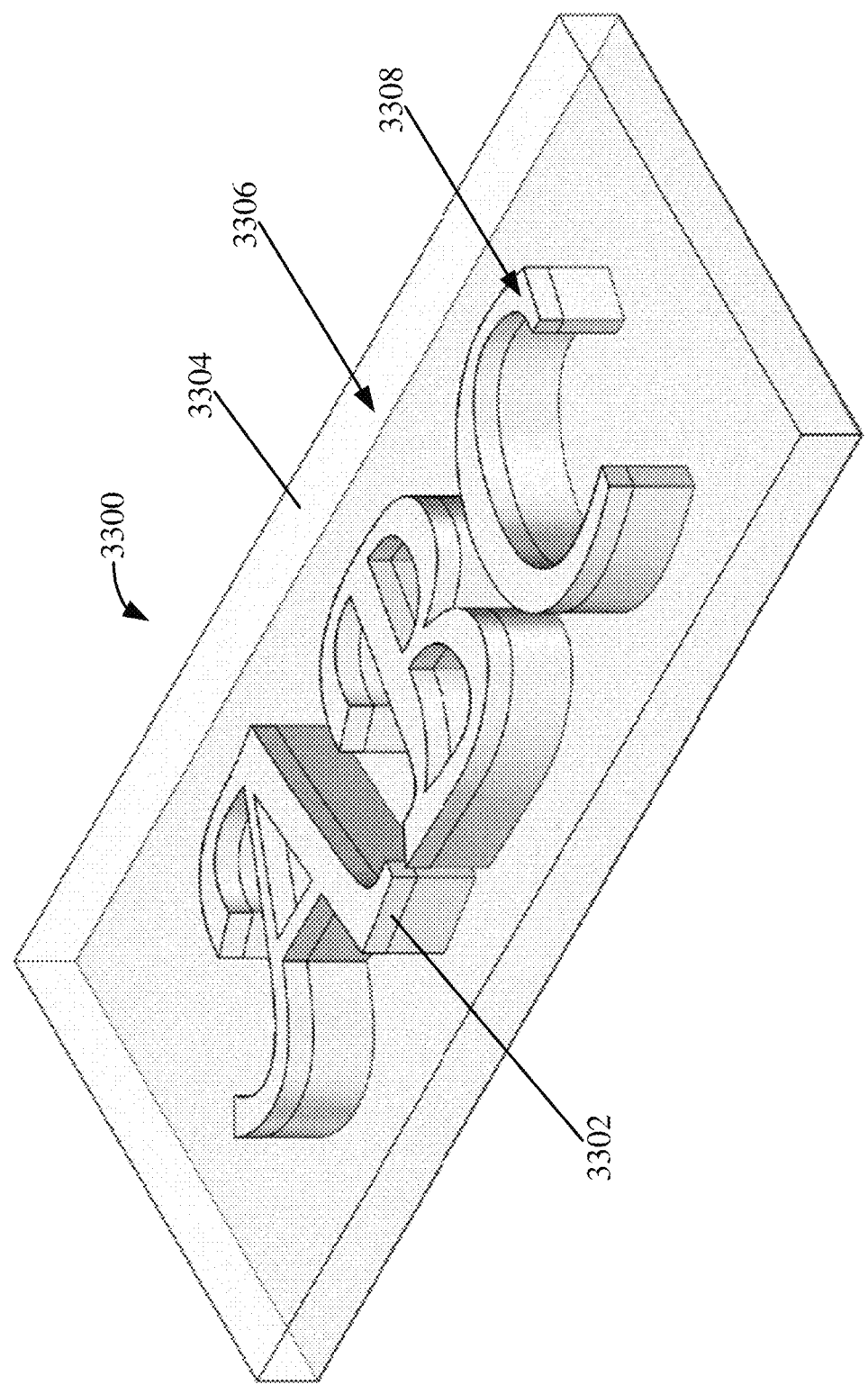
FIG. 33 illustrates that alternatively the second component material may be deposited such that it does not reach and cover the first components' top surfaces so that the hardened second component provides an embossed appearance to the first components.

FIG. 33 illustrates an optional feature of a finished item having an embossed look according to one aspect. The embossed item 3300 has a top portion of its first components 3302 exposed and extending beyond the top surface 3306 of the second component 3304. To create such an embossed item 3300, the second component material 1004, 3102 deposited (e.g., see FIGS. 10, 11, 31) is only deposited partway so that the second component's top surface 3306 has a height less than the height of the first component's top surface 3308. Consequently, the first components 3302 are not fully encased by the second component 3304 made from second component material 1004, 3102.

FIGS. 34-39 illustrate steps used in a method of manufacturing an item having various components according to one aspect. Specifically, the method shown in FIGS. 34-39 results in the formation of the same item 100 described above with respect to FIGS. 7-18 and FIGS. 19-32. However, in FIGS. 34-39 the component 1302 that surrounds the lettering 702 (see FIG. 13) is formed first whereas in FIGS. 7-18 and FIGS. 19-32 the component 1302 that surrounds the lettering 702 is formed after the lettering 702. In this fashion, it may be appreciated that the methods described herein allow the manufacturer to choose which components of the item are formed before others. This decision may be based on the complexity of the 2D design's 502 features (see FIG. 5) and practicality, cost, and convenience considerations. Note that in items having many different components (e.g., FIGS. 3 and 4), any one the components 302a-302d, 304, 402 may be the starting point of the process (e.g., constitute the "first component"), and one of them maybe the next component formed (e.g. constitute the "second component"), and so on until the last component of the item is formed and the planar support member securing all of the components is removed.

The method shown in FIGS. 34-39 is also based on the generalized method shown in FIG. 6 and described above but also incorporates use of a mold during the manufacturing process. Note that in other aspects a mold may not be necessary to practice the inventive concepts disclosed herein. For reasons of clarity and simplicity, the steps shown in FIGS. 34-39 specifically form a decorative panel that includes lettering. However, the same steps shown and described may be used to manufacture many other items containing different types of components.

Figure 34:
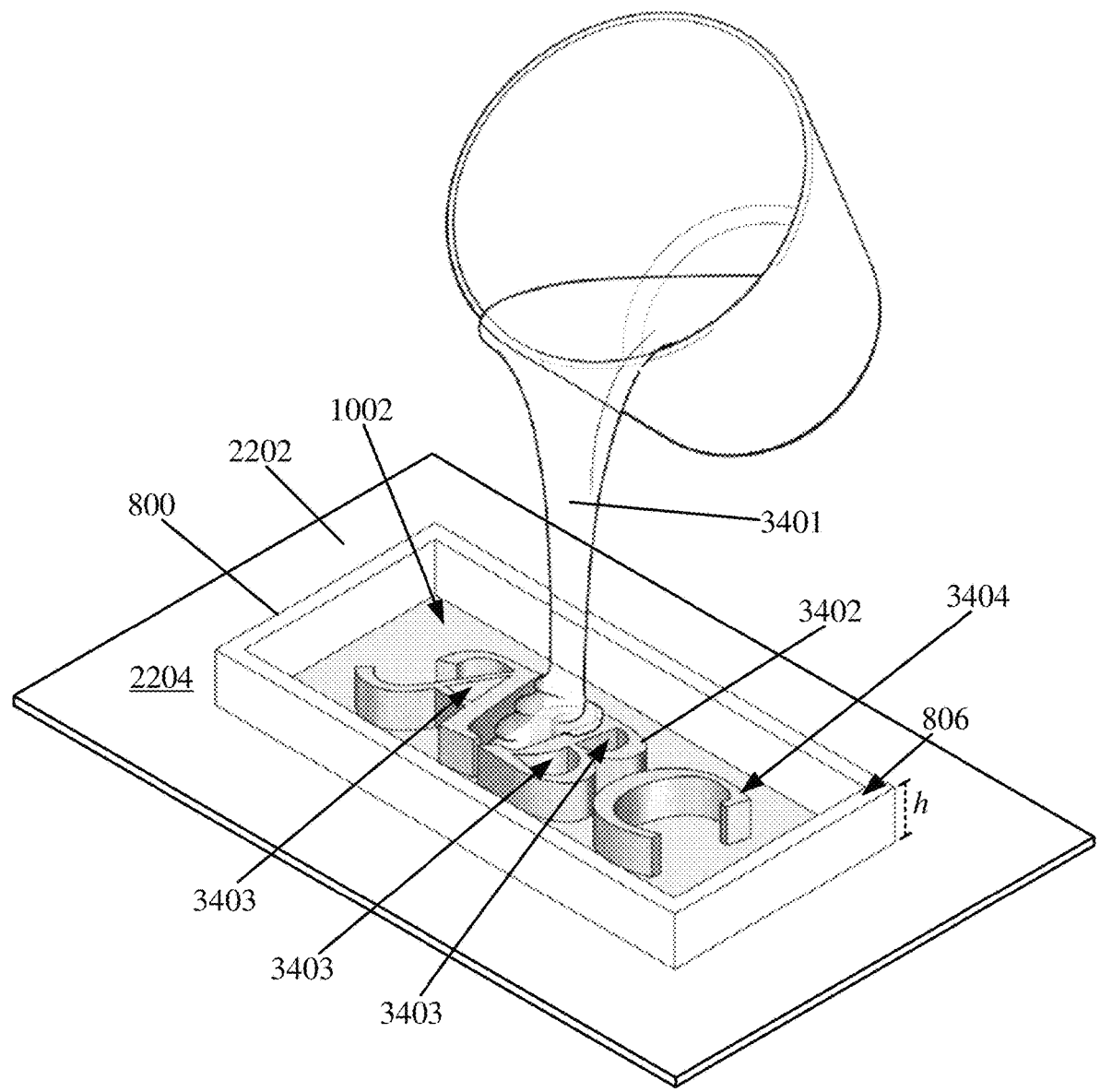
FIG. 34 illustrates a first component material being deposited into a frame's cavity.

FIG. 34 illustrates a first component material 3401 being deposited into the frame's cavity 1002 according to one aspect. Specifically, the frame 800 includes a mold 3402 that is affixed to the template support member's top surface 2204. The mold 3402, which may be made of silicone rubber, polyurethane rubber, etc., is substantially identical in size and shape to other components that will ultimately be in the finished item. One or more first component materials 3401 are then deposited on top of the mold 3402 until the first component material 3401 fills up the cavities 3403 of the mold 3402.

Figure 35:
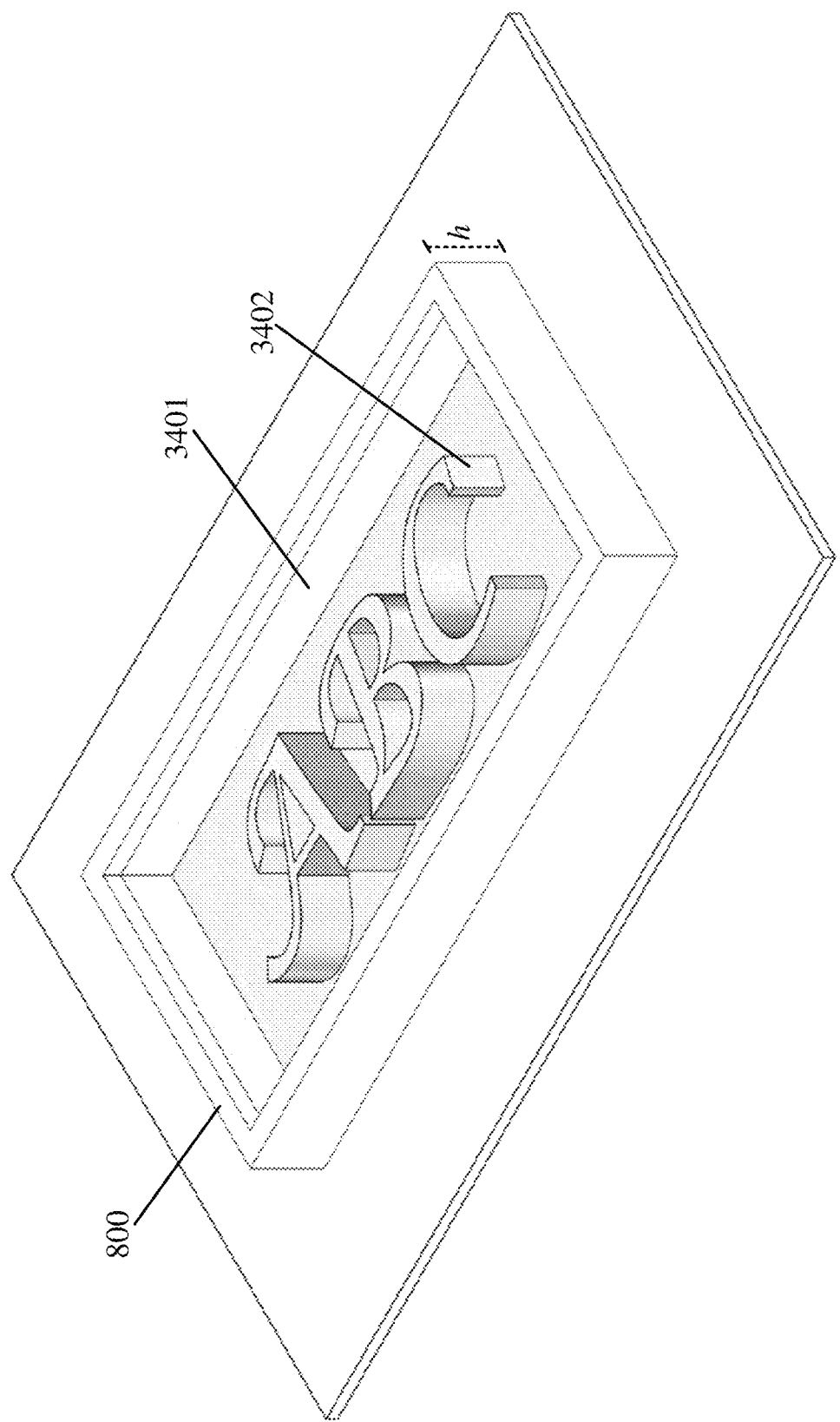
FIG. 35 illustrates that the first component material may be deposited into the frame's cavity until it covers a top surface of a mold thereby connecting all of the cavities in the mold together.

Referring to FIG. 35, according to one aspect, the first component material 3401 is deposited in until it covers the top surface 3404 of the mold 3402 thereby connecting all of the cavities 3403 in the mold 3402 together. In such a case, the upper portion/layer of the first component material 3401 interconnecting the material 3401 deposited into the cavities 3403 may be considered a planar support member. In other aspects, the first component material 3401 is deposited on top of the mold 3402 until the first component material 3401 fills up the cavities 3403 of the mold 3402. Then, a binding material (not shown in FIG. 34) may be deposited on top of the hardened first component material 3401 residing in the cavities 3403 so that the bind material interconnects the resulting first components and forms a planar support member.

Figure 36:
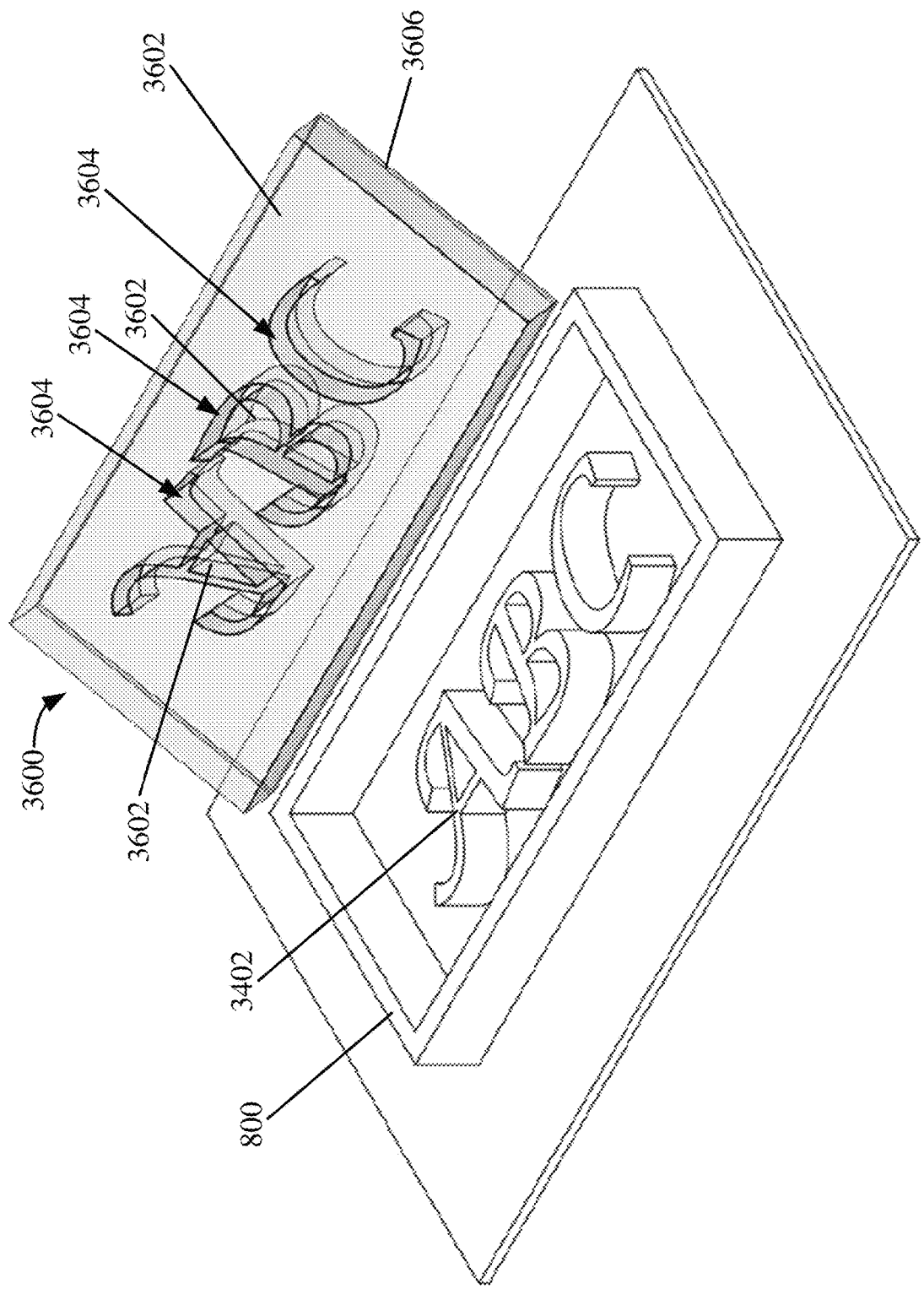
FIG. 36 illustrates that a component support assembly, having a first component and a planar support member, is formed once the first component material(s) and/or binding material(s) have substantially hardened.

Referring to FIG. 36, once the first component material(s) 3401 and/or binding material(s) have substantially hardened, a component support assembly 3600 is formed having a first component 3602 and a planar support member 3606. The first component 3602 is secured and/or bound to a top surface of the planar support member 3606. The first component 3602 includes second component material receiving cavities 3604 that are a mirror image of the mold 3402 and are configured to receive second component material in subsequent steps. According to one aspect, the planar support member 3606 shown in FIG. 36 is made using the same first component material 3401 used to form the first component 3602. In other aspects, another material such as a binding material may be used to form planar support member 3606. In either case, the planar support member 3606 is bound to the first components 3602 and interconnects them so as to keep their relative position from one another at the desired distances.

Figure 37:
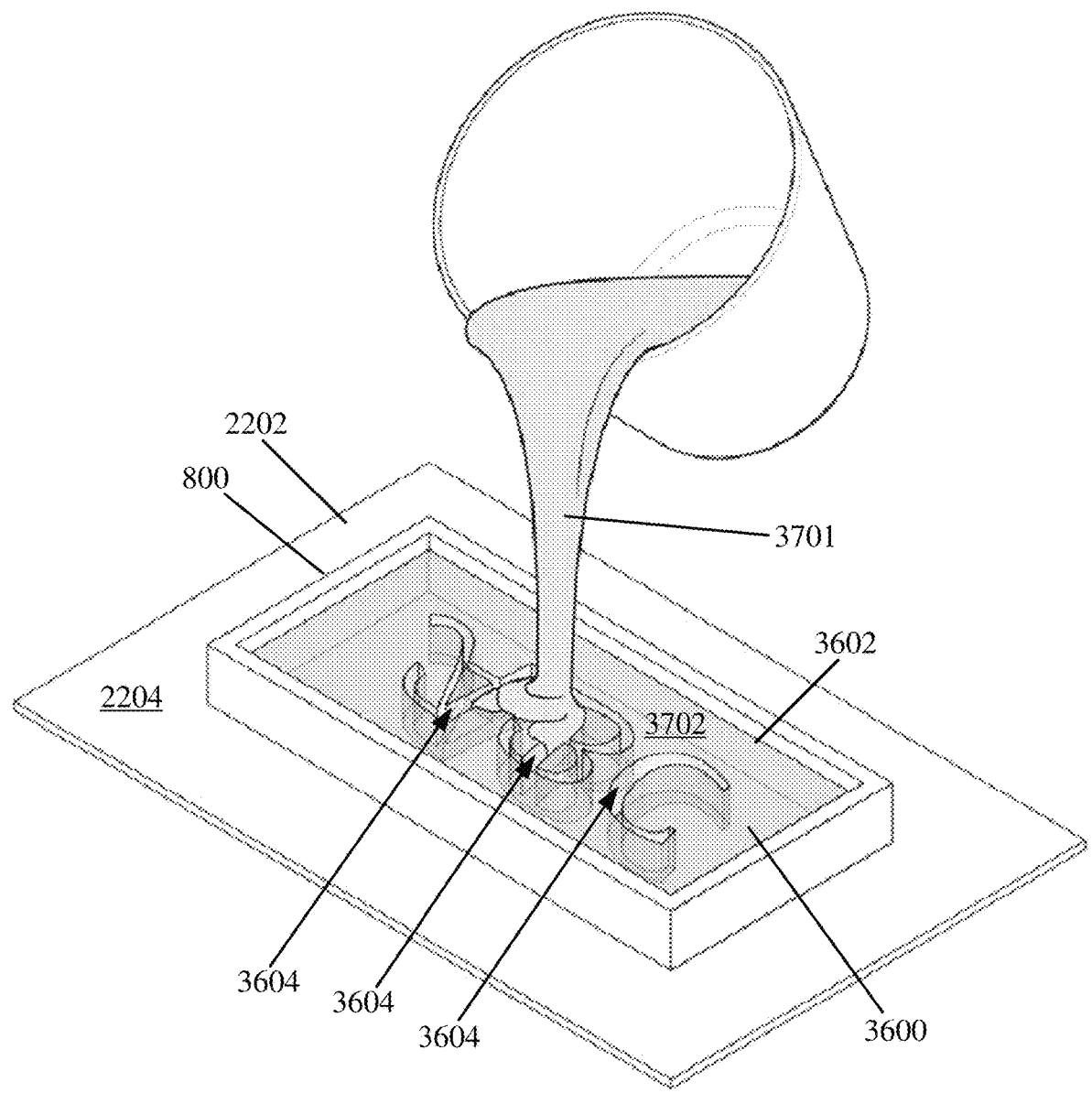
FIG. 37 illustrates that the component support assembly may be placed back into the frame cavity such its top side surface is facing up and a second component material may be deposited into the first component's cavities.
Figure 38:
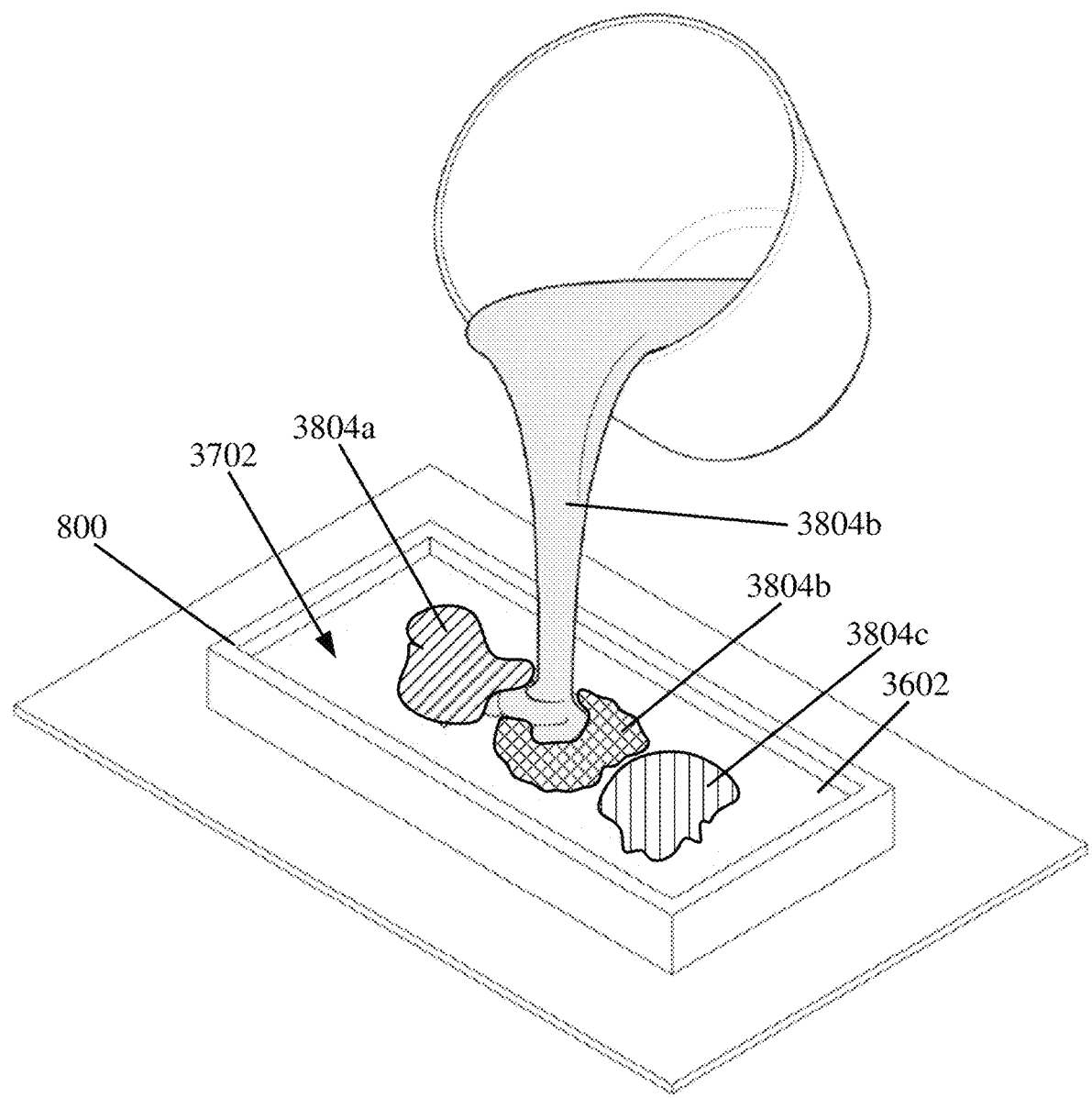
FIG. 38 illustrates that alternatively different second component materials may be deposited into the first component's various cavities.

Referring to FIG. 37, the component support assembly 3600 may then be placed back into the frame cavity 1002 such its top side surface 3702 is facing up as shown. Then, at least one second component material 3701 is deposited into the second component material receiving cavities 3604 of the first component 3602. As shown in FIG. 38, in some aspects, different cavities of the first component 3602 may be filled with different second component materials (e.g., different color, transparency, material, etc.) 3804a, 3804b, 3804c to create an item having different types of second components.

Referring to FIGS. 37 and 38, regardless of whether one type of second component material 3701 or multiple second component materials 3804a, 3804b, 3804c are poured into the cavities 3604, ultimately the second component material(s) 3701, 3804a, 3804b, 3804c poured are allowed to dry and/or cure to form the second components that are bound to the surrounding first component 3602.

Figure 39:
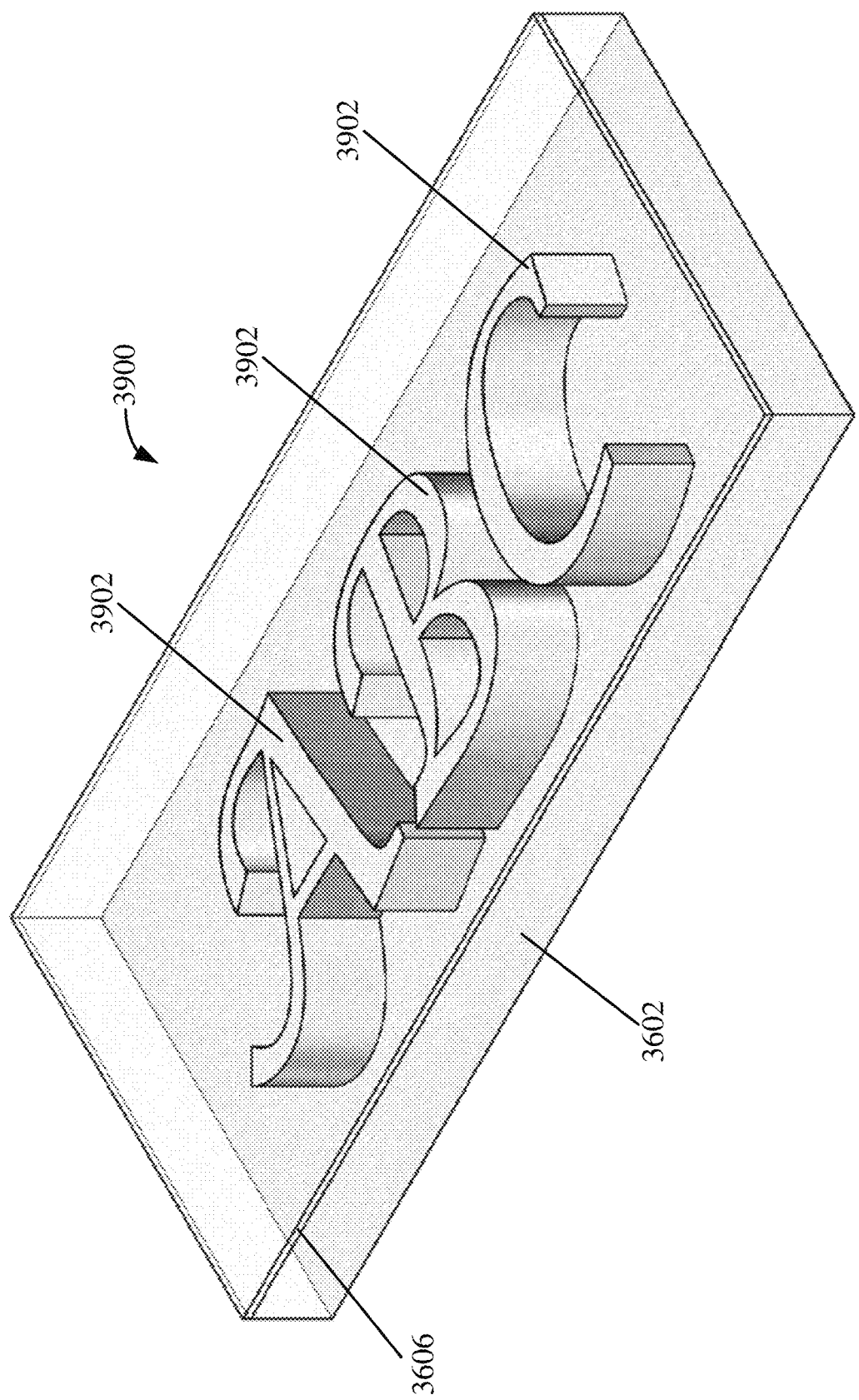
FIG. 39 illustrates a resulting unfinished item that includes second components embedded within and surrounded by a first component with the planar support member still attached.

FIG. 39 illustrates the resulting unfinished item 3900 that includes the second components 3902 embedded within and surrounded by the first component 3602. The unfinished item 3900 includes the planar support surface 3606, which is attached to the top surface of the first component 3602. The unfinished item 3900 may be finished by removing the planar support member 3606 in a similar fashion as described above according to the FIGS. 13-18 and any excess second component materials 3701, 3804a-3804c on the item's top surface 3702 may also be cut or sanded away.

FIGS. 40-50 illustrate steps used in a method of manufacturing an item having various components according to one aspect. The method shown in FIGS. 40-50 is based on the generalized method shown in FIG. 6 and described above but also incorporates use of multiple molds during the manufacturing process. Note that in other aspects multiple molds may not be necessary to practice the inventive concepts disclosed herein. For reasons of clarity and simplicity, the steps shown in FIGS. 40-50 specifically form a decorative panel that includes lettering. However, the same steps shown and described may be used to manufacture many other items containing different types of components.

Figure 40:
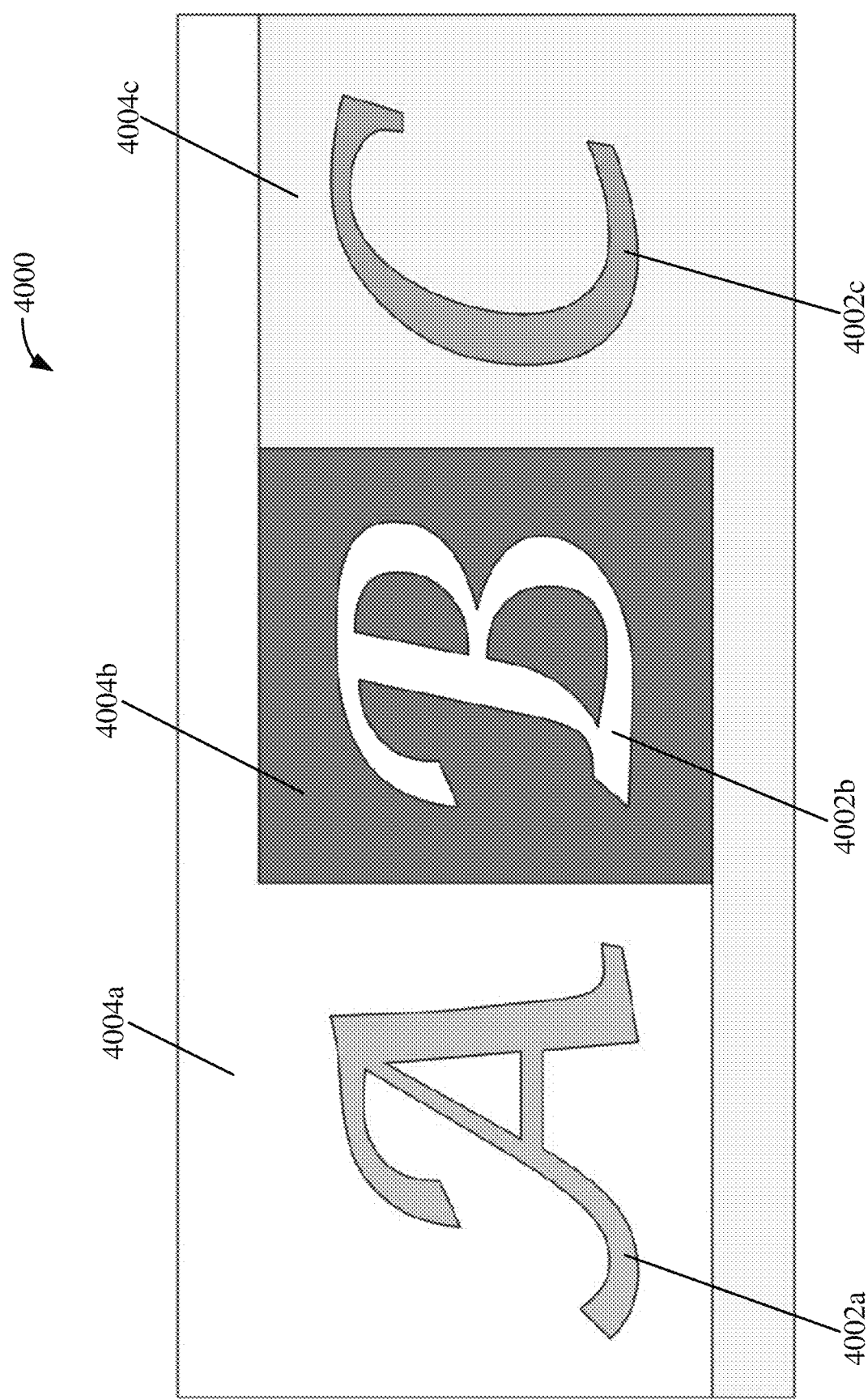
FIG. 40 illustrates an exemplary 2D image that a manufacturer may use as a pattern to manufacture a 3D item having various components.

FIG. 40 illustrates an exemplary 2D image 4000 that a manufacturer may use as a pattern to manufacture a 3D item having various components 4002a, 4002b, 4002c, 4004a, 4004b, 4004c. In the example shown, the letter A 4002a may be substantially metal and is surrounded by a substantially transparent plastic 4004a having a yellowish hue. The letter B 4002b may be composed of a substantially transparent, clear plastic and is surrounded by an opaque plastic 4004b having a dark color (e.g., navy blue). Finally, the letter C 4002c may be composed of wood and is surrounded by a substantially transparent plastic 4004c having a greenish hue.

Figure 41:
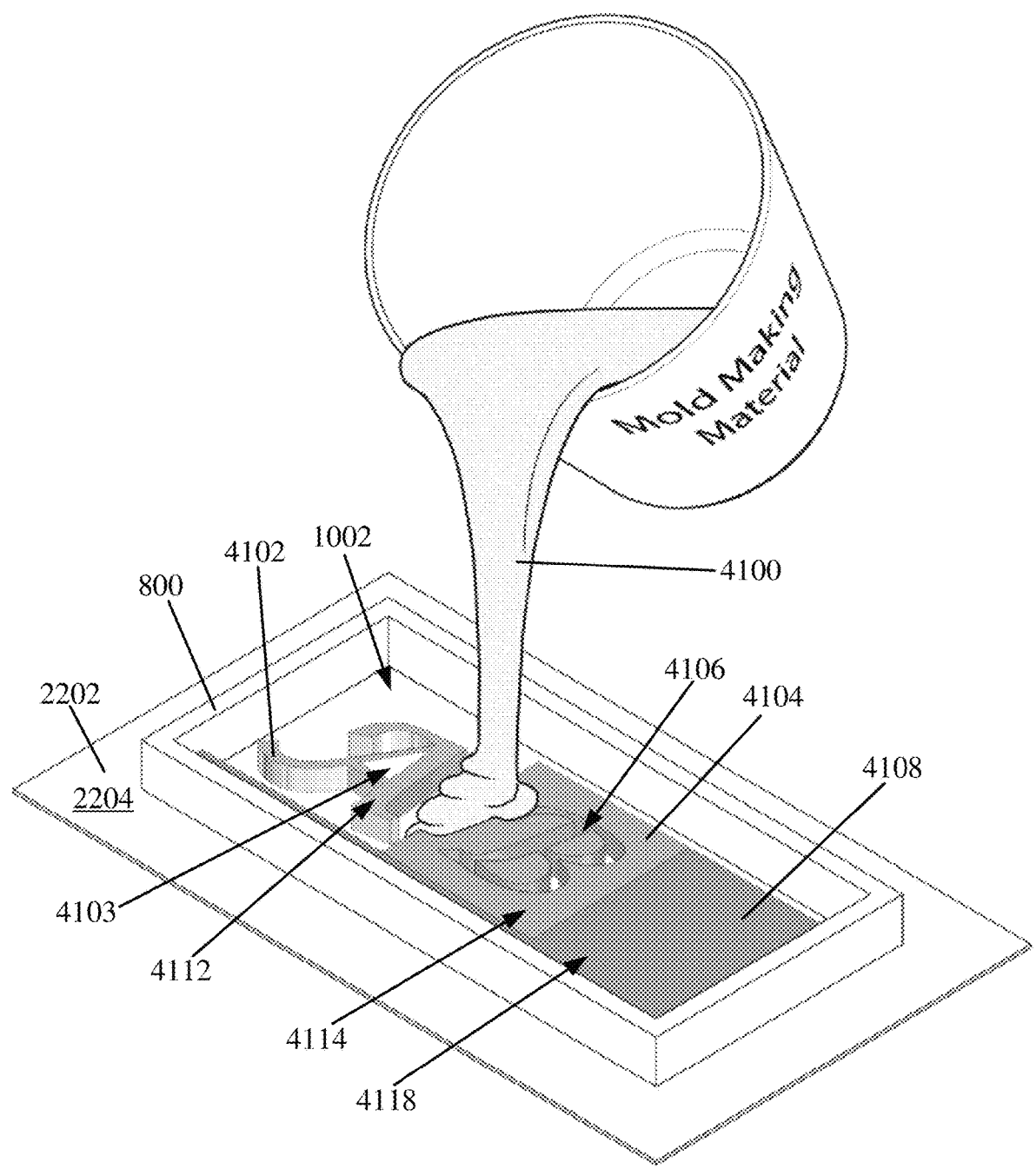
FIG. 41 illustrates a first component template associated with a first component that is temporarily secured to a top surface of a template support member within a frame cavity, and mold making material is deposited on top.

Manufacturing the finalized 3D item based on the 2D design 4000 described above may begin by obtaining one or more component templates and one or more spacers, and creating a first mold according to the steps shown and described with respect to FIG. 41. Referring to FIG. 41, a first component template 4102 associated with the first component 4002a (i.e., letter A) is temporarily secured to the top surface 2204 of the template support member 2202 within the frame cavity 1002. Similarly, a second component template 4104 associated with the second component 4002b (i.e., letter B) is also secured to the top surface 2204 being careful to place the templates 4102, 4104 the correct distance apart based on the desired final location of the first and second components 4002a, 4002b. One or more of the templates 4102, 4104 may have been carved out of a block of plastic using various cutting machines. The second template 4104 includes a cavity 4106 having a size and shape of the desired second component 4002b.

Referring to FIGS. 40 and 41, a spacer 4108 the size and shape of the sixth component 4004c is also placed onto the planar securing member's top surface 2204 next to the second template 4104. The top surface 4112 of the first template 4102 may be in the same plane as the top surface 4114 of the second template 4104. The top surface 4114 of the second template 4104 may be in the same plane as the top surface 4118 of the spacer 4108. In this fashion, the top surfaces 4112, 4114, 4118 of the templates 4102, 4104 and spacer 4108 may be substantially flush and level.

Next, mold making material 4100 may be deposited into the frame cavity 1002 covering the templates 4102, 4104 and spacer 4108. The mold making material 4100 may be deposited until the top surfaces 4112, 4114, 4118 of the templates 4102, 4104 and spacer 4108 are fully covered (similar to the example shown in FIG. 10). The mold making material 4100 also penetrates and fills up the cavity 4106 within the second template 4104, and also any other cavities 4103 of the templates 4102, 4104. The mold making material 4100 may be comprised of silicone rubber, polyurethane rubber, plastic, polymers, plaster, ceramic, silica sand, metal, or any other fluid substance that can later cure or harden to form a solid mold.

Figure 42:
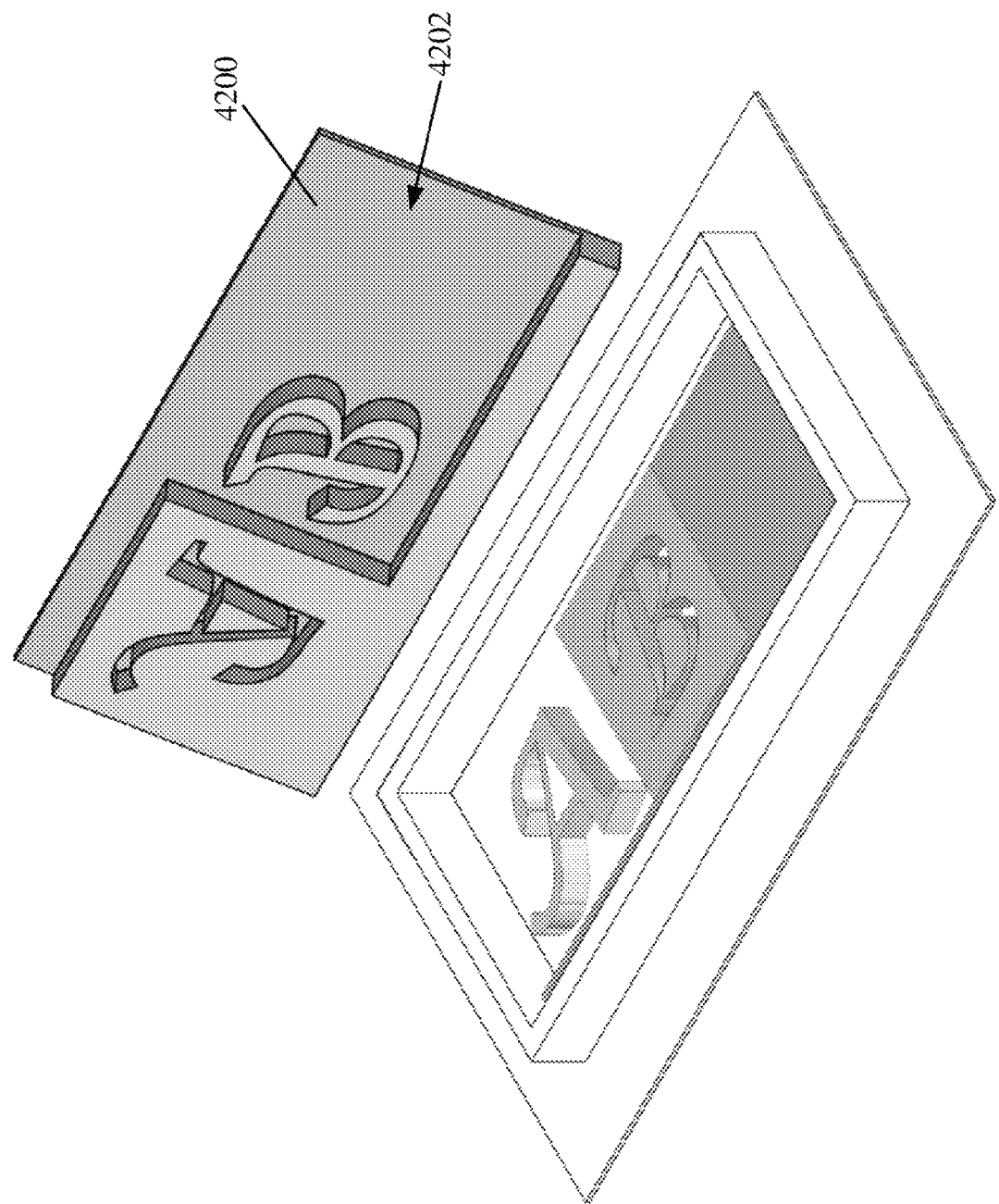
FIG. 42 illustrates that a hardened mold may be removed out from the frame's cavity once the mold making material has sufficiently hardened.
Figure 43:
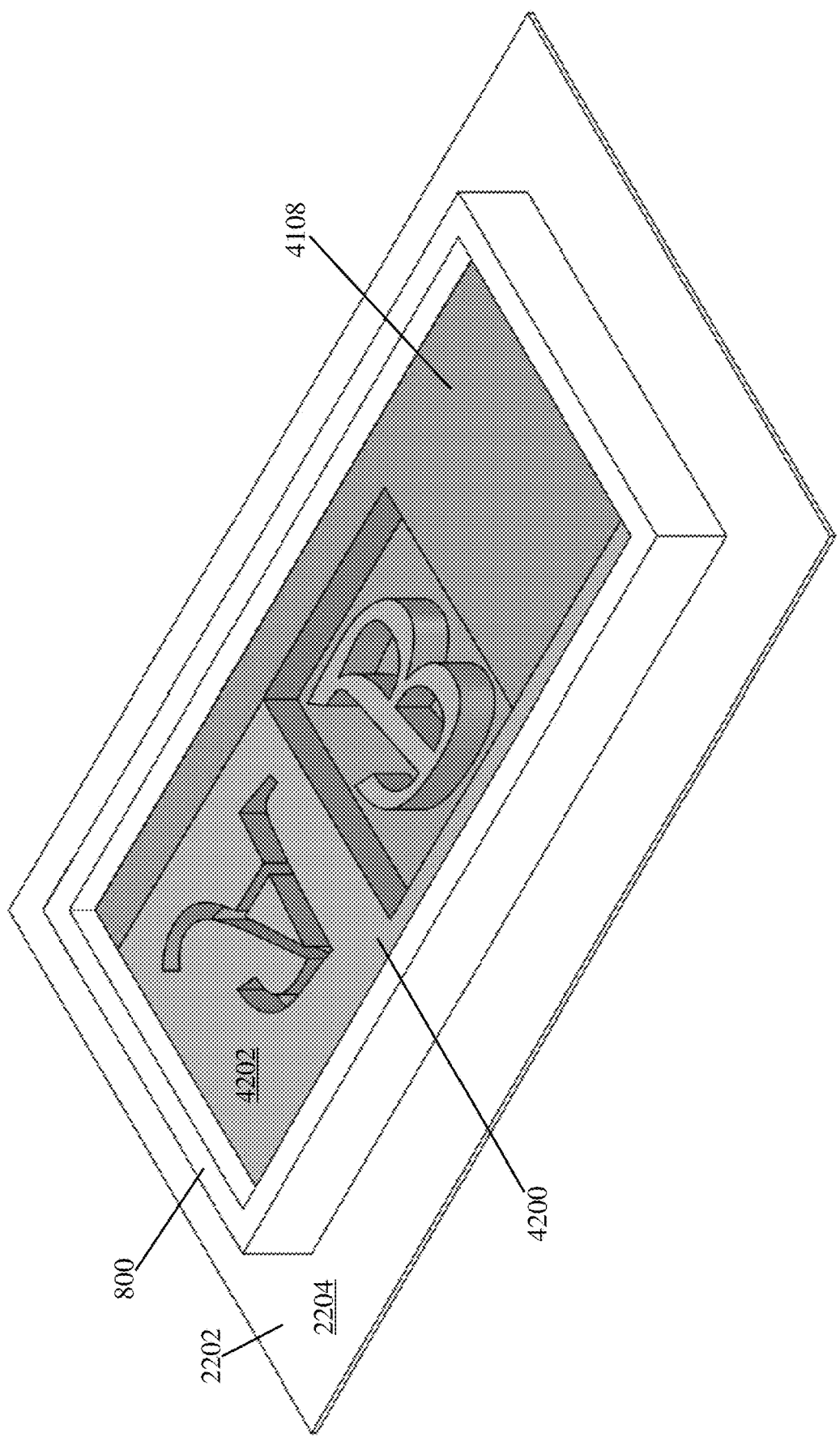
FIG. 43 illustrates that the hardened mold from FIG. 42 is placed back into the frame's cavity next to a spacer.

Referring to FIGS. 41-43, once the mold making material 4100 has sufficiently hardened, the hardened mold 4200 may be removed out from the frame's cavity 1002. Since the mold making material 4100 hardened while covering the templates 4102, 4104 and spacer 4108, the resulting mold 4200 will be a mirror image of the templates 4102, 4104 and spacer 4108. The mold 4200 has a front side surface 4202 and a back side surface (opposite the front side surface 4202). The mold 4200 is then placed into the frame cavity 1002 with its front side surface 4202 up as shown in FIG. 43. The spacer 4108 is also fit within the mold 4200 as shown and occupies the space that will eventually be the sixth component 4004c and third component 4002c.

Figure 44:
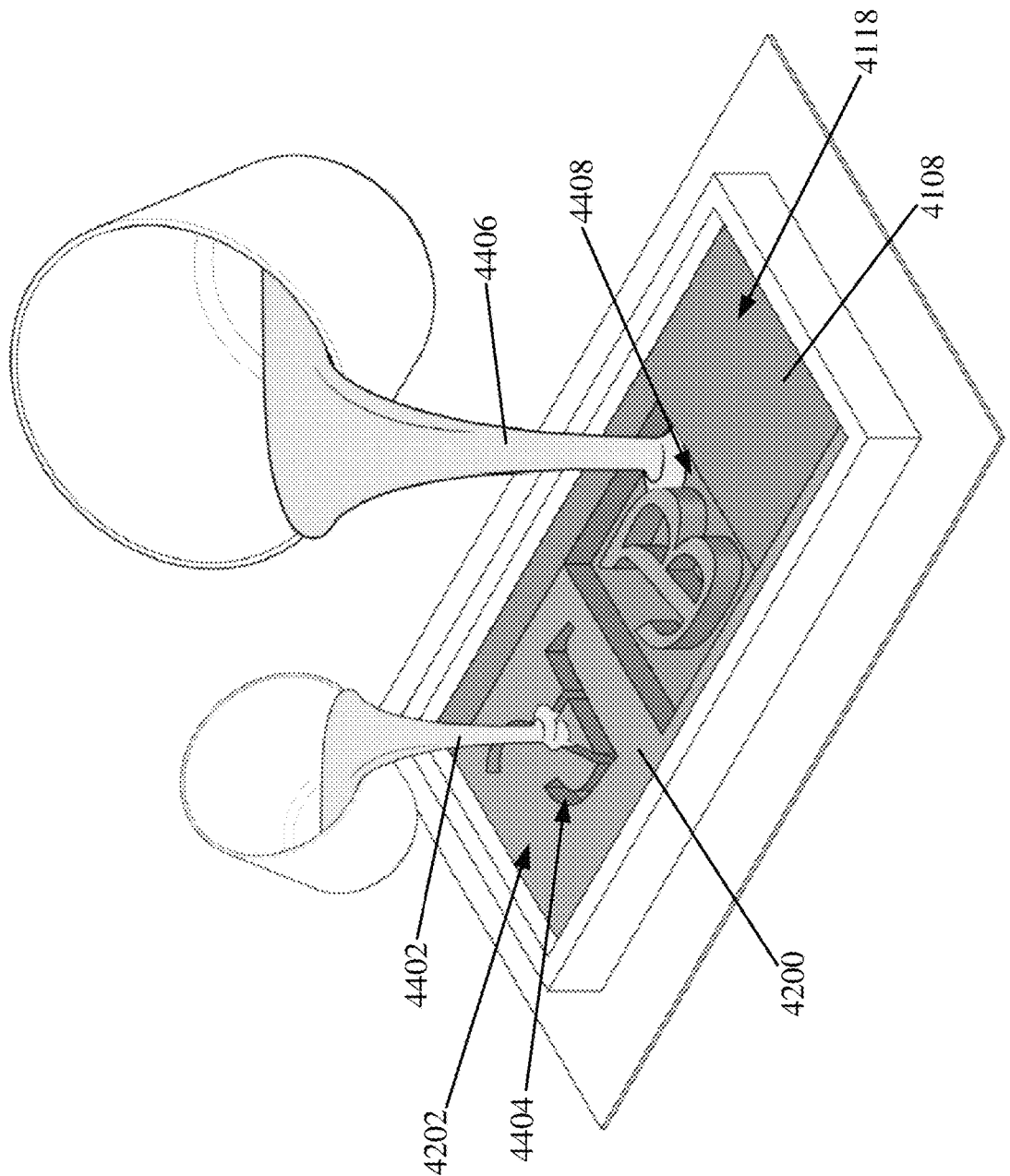
FIG. 44 illustrates that first and fifth component materials may be deposited into first and second cavities of the mold, respectively.

Referring to FIG. 44, a first component material 4402 is deposited (e.g., poured, placed) into a first cavity 4404 of the mold 4200 filling up the cavity 4404 completely. In the example shown, the first component material 4402 is molten metal (e.g., aluminum, solder, etc.) and will form the first component 4002a. In addition to the first component material 4402, a fifth component material 4406 is deposited into a second cavity 4408 of the mold 4200 filling up the cavity 4408 completely. In the example shown, the fifth component material 4406 is pourable plastic that is capable of hardening and forming the opaque, navy-blue colored fifth component. Once the cavities 4404, 4408 are full of their respective component materials 4402, 4406, a binding material (similar to the one 2904 shown in FIG. 29) may be poured over the mold's top surface 4202 and the spacer's top surface 4118 thereby binding to the first and second component materials 4402, 4406. The component materials 4402, 4406 poured into the cavities 4404, 4408 and the binding material are allowed to harden. In one aspect, no separate binding material is used but instead either the first material 4402 or the second material 4406 is used as the binding material.

Figure 45:
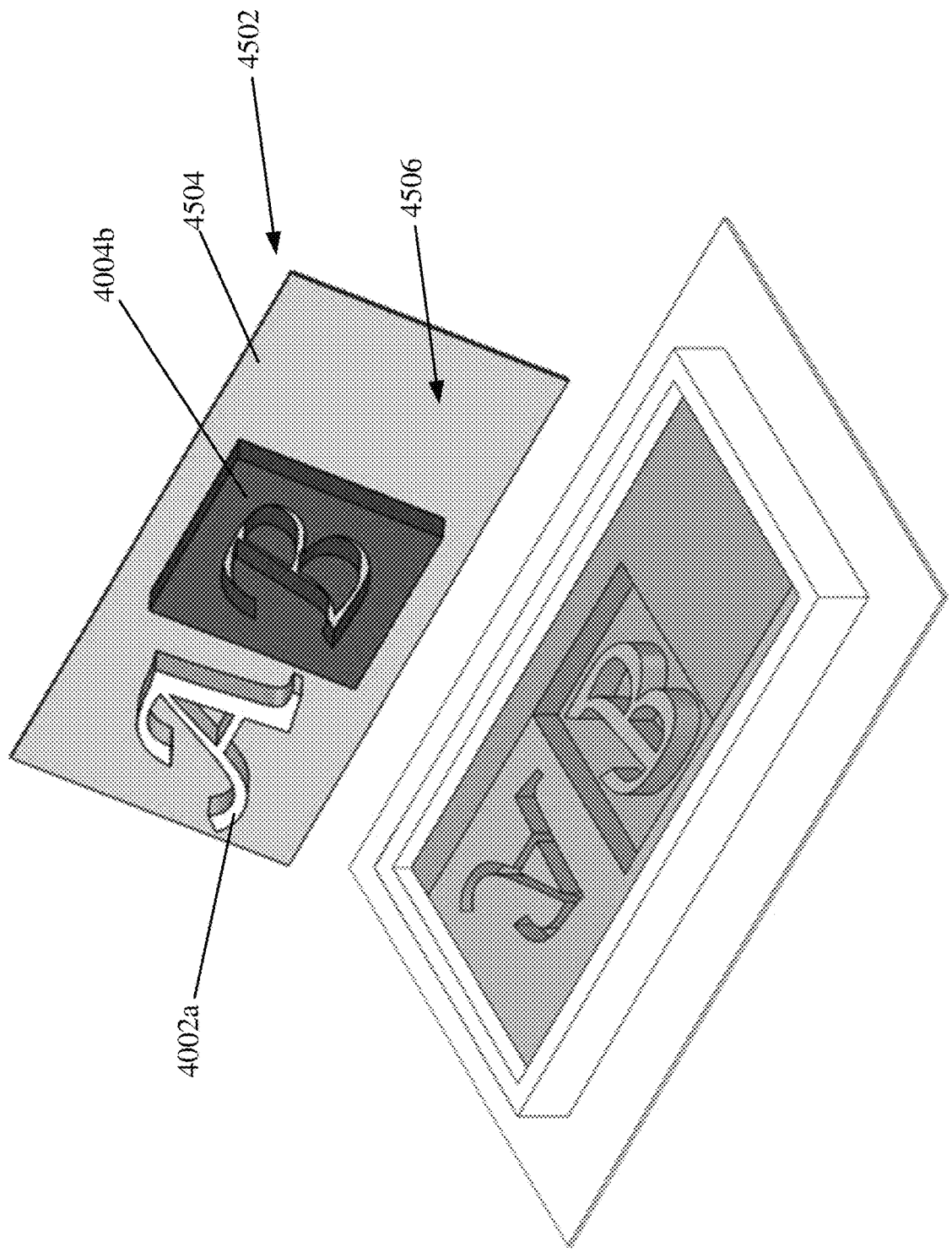
FIG. 45 illustrates that a resulting component support assembly, which includes the first component, a fifth component, and also a thin, planar support member, may be removed once the component support assembly sufficient hardens.

Referring to FIG. 45, once hardened the resulting component support assembly 4502 includes the first component 4002a, the fifth component 4004b, and also a thin, planar support member 4504 to which the first component 4002a and the fifth component 4004b are attached. The planar support member 4504 may be made of the binding material that was poured over the materials 4402, 4406 in the preceding step. The component support assembly 4502 includes a front surface 4506.

Figure 46:
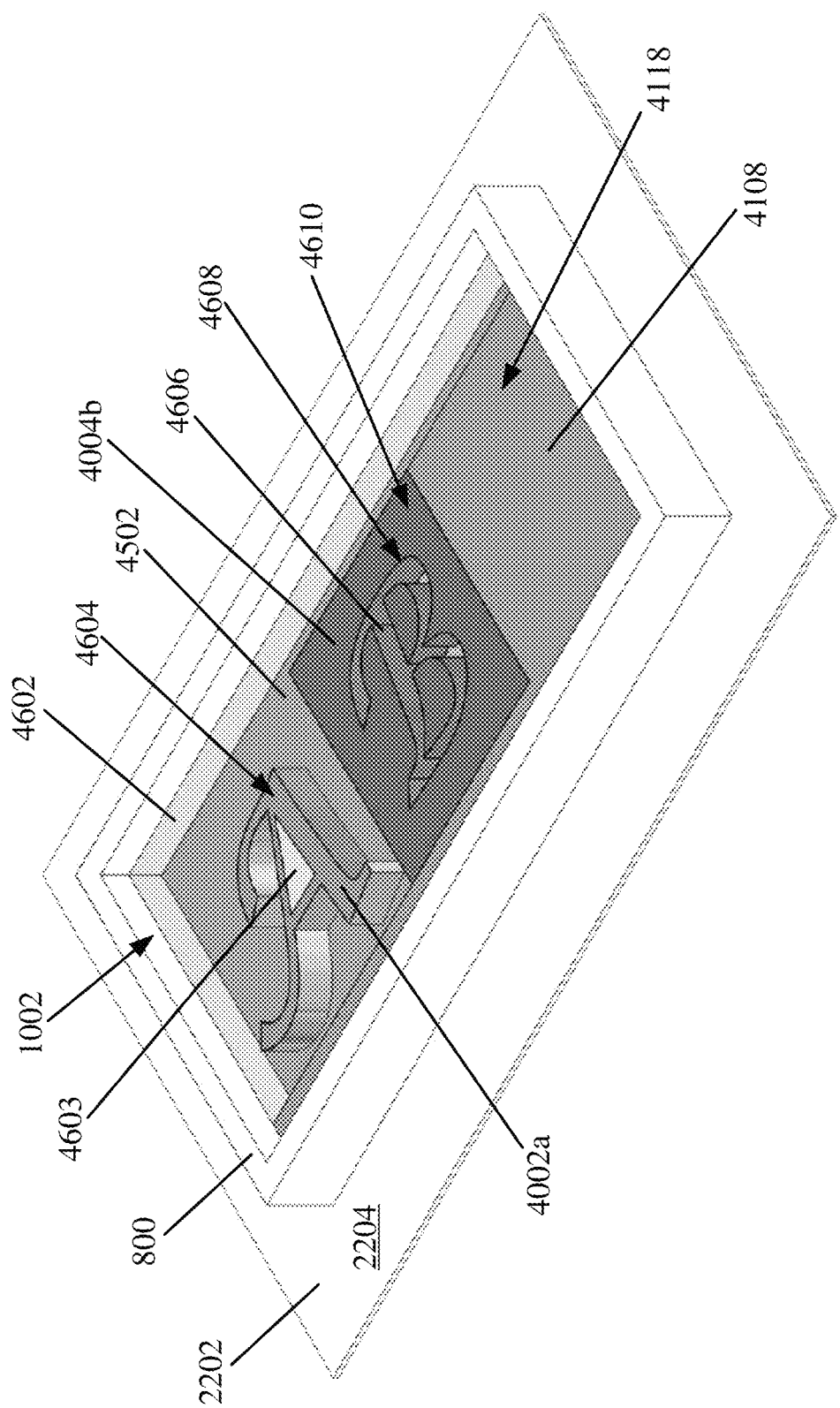
FIG. 46 illustrates that the component support assembly may be placed back into the frame cavity with its front side surface up, and second and fourth component materials may be deposited.

Referring to FIG. 46, the component support assembly 4502 is then placed back into the frame cavity 1002 with its front side surface 4506 up as shown. The spacer 4108 is also fit onto the component support assembly 4502 as shown and occupies the space that will eventually be the third component 4002c and the sixth component 4004c. A fourth component material 4602 is deposited around the first component 4002a and within any cavities 4603 of the first component 4002a. The fourth component material 4602 may be deposited until it reaches the same height as or covers the first component's top surface 4604. In the example shown, the fourth component material 4602 is a transparent plastic with a yellow hue, and will form the fourth component 4004a. A second component material 4606 is also deposited into a cavity 4608 of the fifth component 4004b filling up the cavity 4608 completely and possibly even covering a portion of the fifth component's top surface 4610. In the example shown, the second component 4606 is a pourable transparent plastic that will eventually harden to form the second component 4002b.

Figure 47:
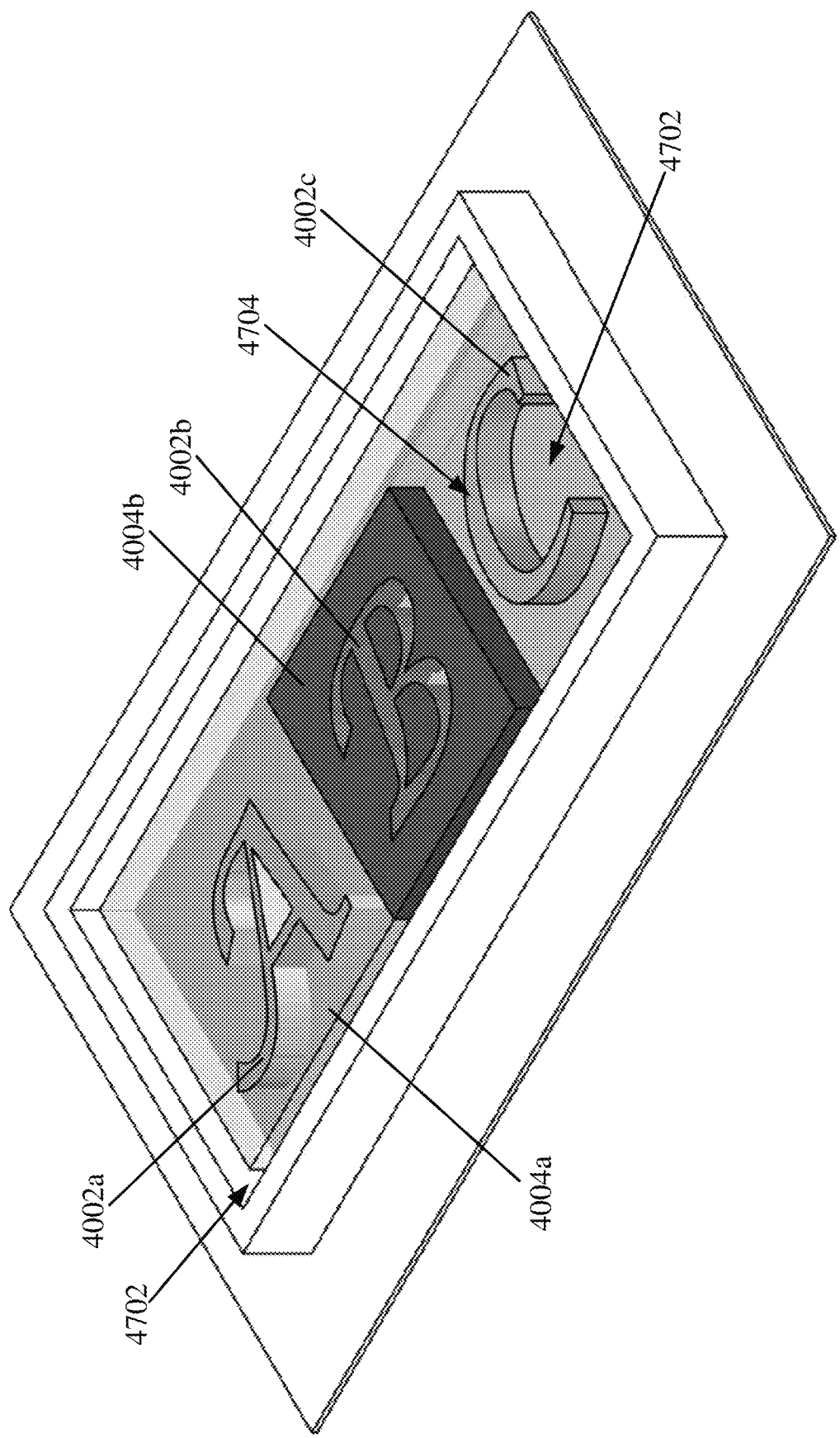
FIG. 47 illustrates that after the second and fourth component materials have sufficiently hardened to form the second component and fourth component, respectively, the spacer may be removed and the third component is secured to the planar securing member's top surface.

Referring to FIG. 47, after the second and fourth component materials 4602, 4606 have sufficiently hardened to form the second component 4002b and fourth component 4004a, respectively, the spacer 4108 may be removed and the third component 4002c is secured to the planar securing member's top surface 2204. The third component 4002c, which is composed of wood, is placed and secured the desired distance apart from the other components 4002a, 4002b based on the 2D design 4000 selected (see FIG. 40).

Figure 48:
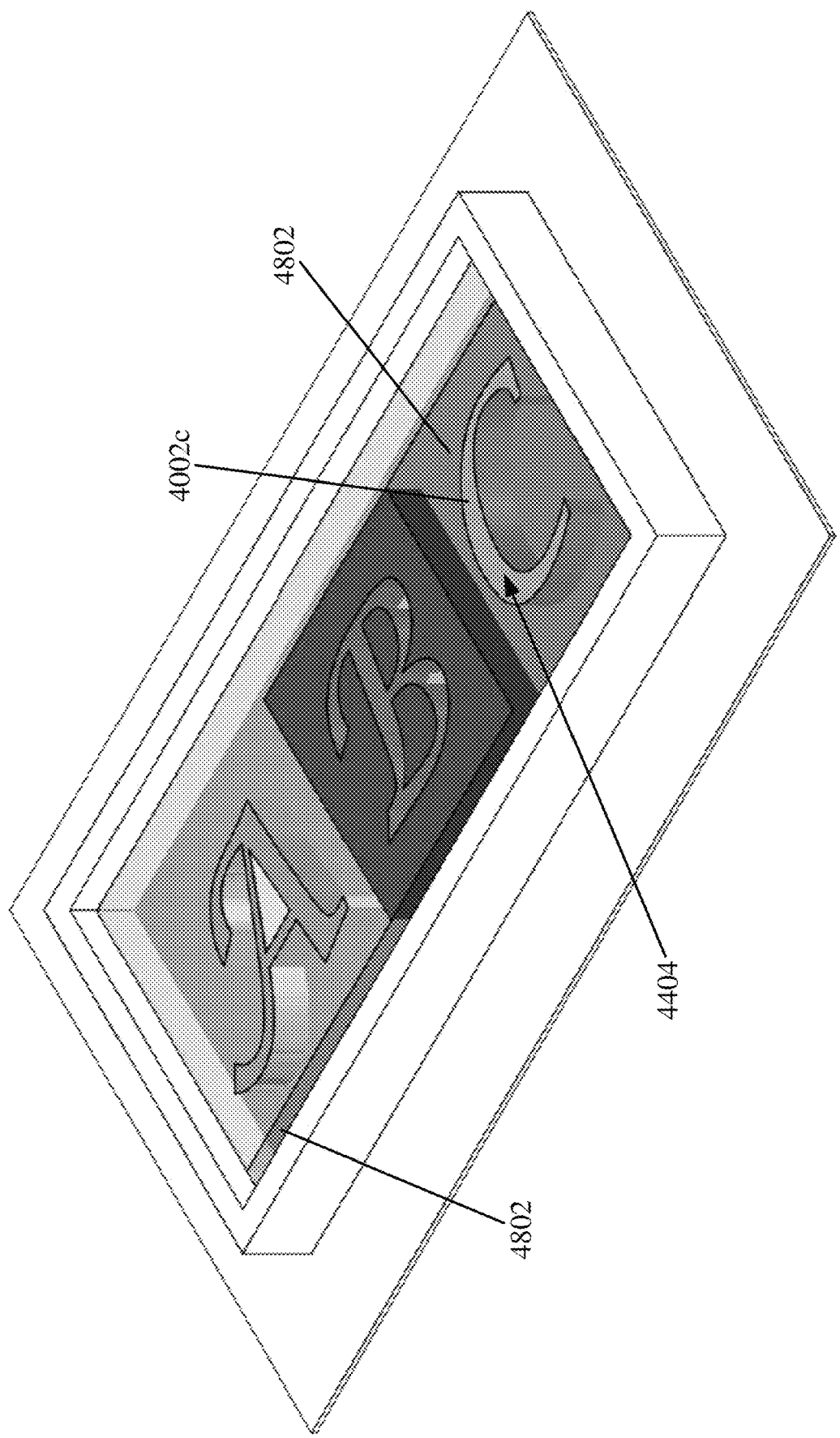
FIG. 48 illustrates a sixth component material being deposited into the space previously occupied by the spacer and around the third component.

Referring to FIGS. 47 and 48, a sixth component material 4802 is deposited into the space 4702 previously occupied by the spacer 4108 and around the third component 4002c. The space 4702 is filled with the sixth component material 4802 until it is at the same height as or covers the third component's top surface 4704. In the example shown, the sixth component material 4802 is a transparent, pourable plastic with a greenish hue that will eventually harden to form the sixth component 4004c.

Figure 49:
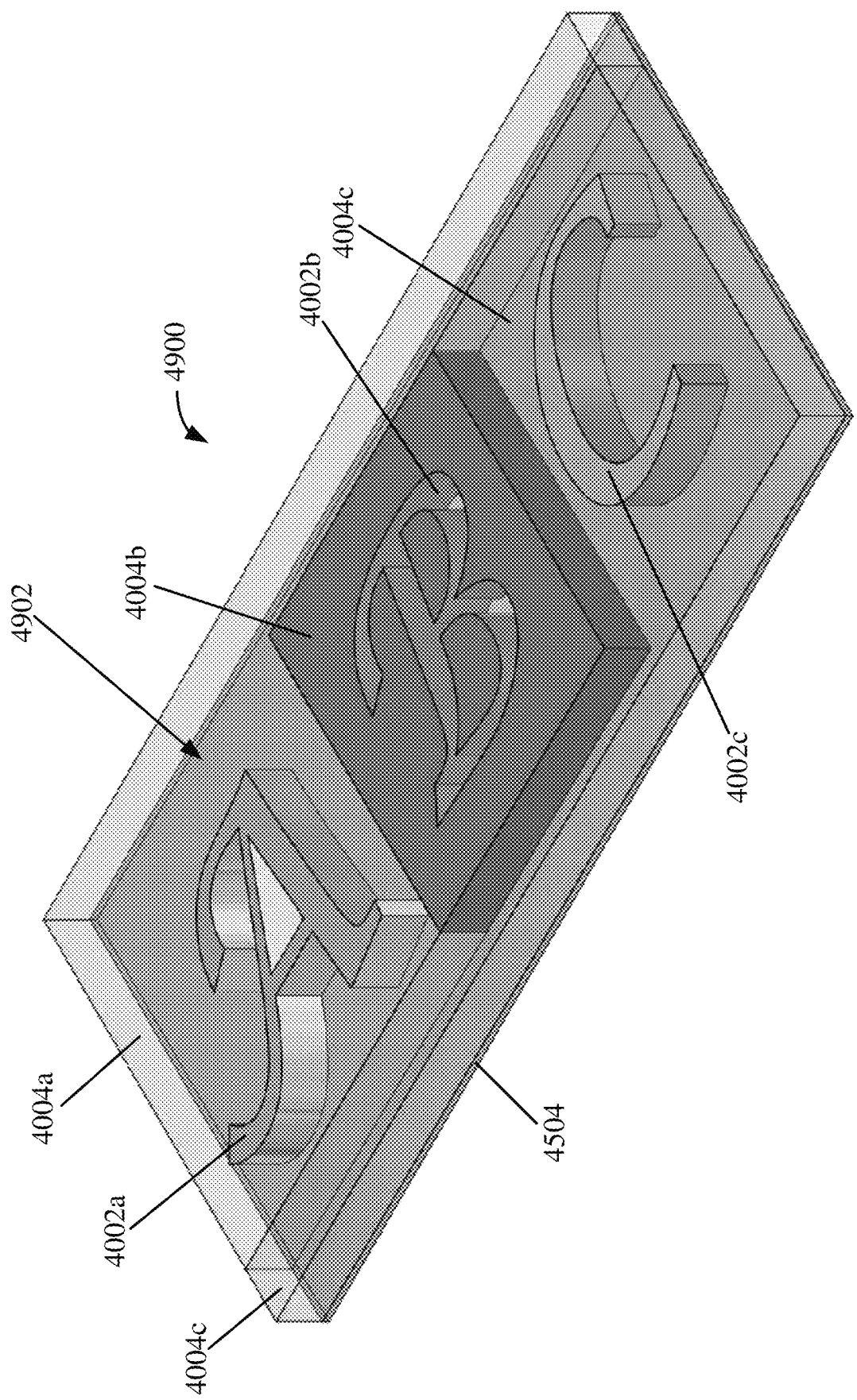
FIG. 49 illustrates that the unfinished item may be removed from the frame once the sixth component material has sufficiently hardened.
Figure 50:
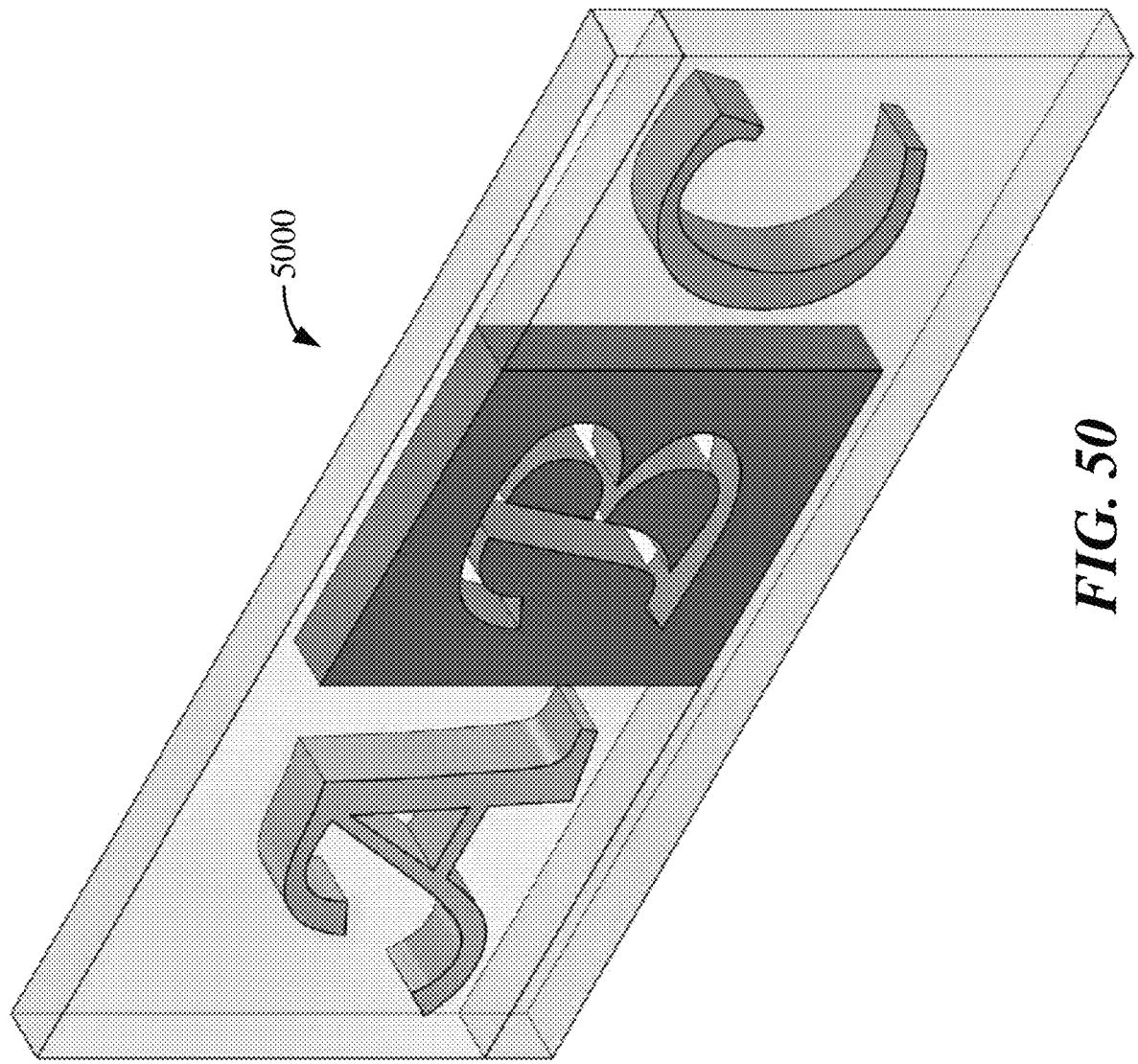
FIG. 50 illustrates the finished item with the planar support member removed.
Figure 51:
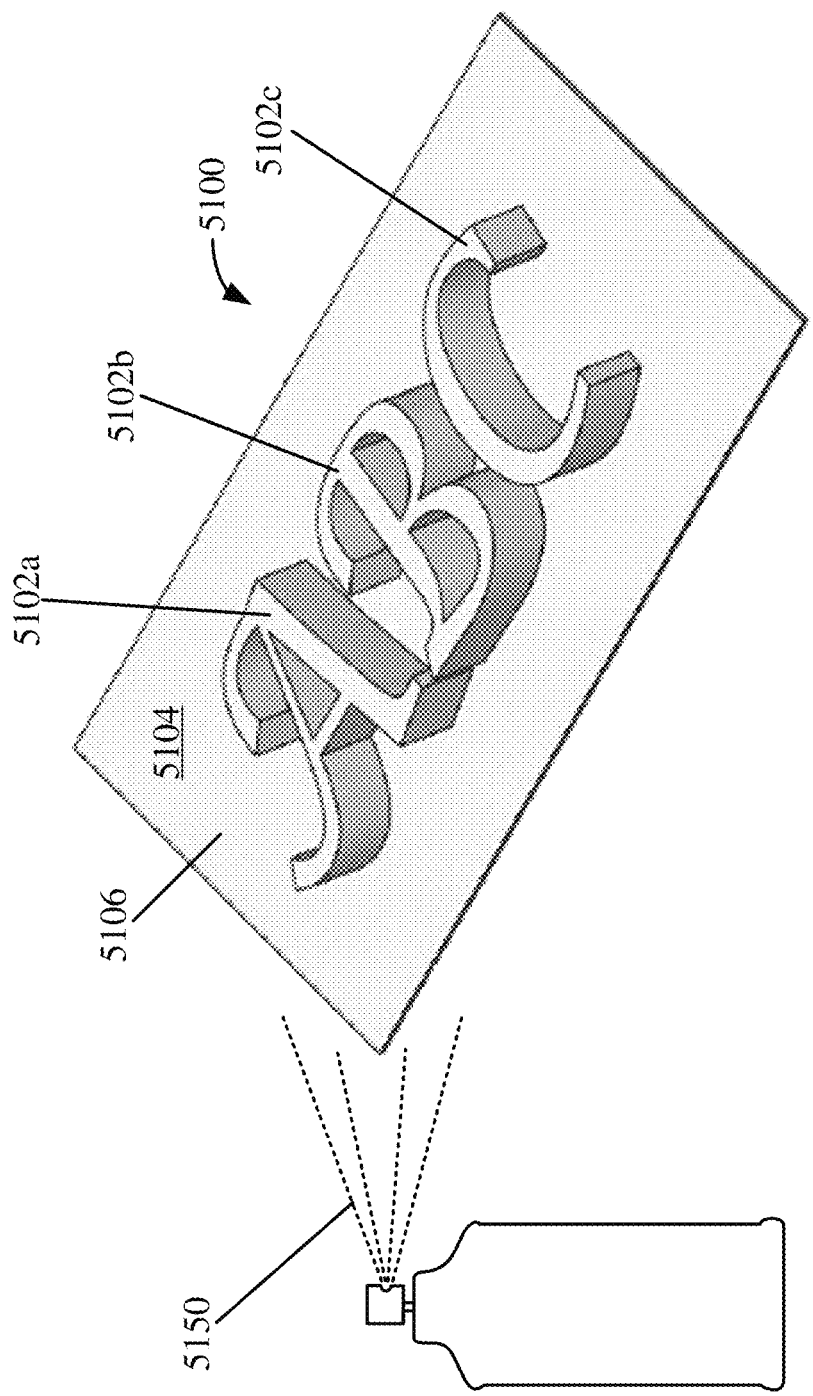
FIG. 51 illustrates that in some cases a component support assembly or at least the components thereon may be coated with one or more coating materials during the manufacturing process.

Referring to FIG. 49, once the sixth component material 4802 has sufficiently hardened, the item 4900 may be removed from the frame 700. At this point the unfinished item 4900 still has its planar support member 4504 attached to the back side of the unfinished item 4900. The planar support member 4504 and/or the item's top surface 4902 may be removed (e.g., sanded away, cut, etc.) in order to produce the fully finished item 5000 shown in FIG. 50. The item 5000 may also be finely sanded, polished, or finished using other techniques to improve the appearance of the item finished item 5000.

FIGS. 51-56 illustrate an optional process for adding aesthetically pleasing outlines to one or more components of an item. Referring to FIGS. 10, 11, 31, and 51, prior to placing a frame 800 around or onto the planar support member 706, 2806 and covering it with a second component material 1004, 3102, the component support assembly 5100 or at least the components 5102a, 5102b, 5102c thereon may be coated with one or more coating materials 5150. In one aspect, all of the components 5102a-5102c may be coated with the coating material 5150, while in other aspects, only some of the components (e.g., only the first component 5102a) are coated with the coating material 5150. In the latter case, the remaining components 5102b, 5102c may be left uncoated or are coated with different coating materials. Once the coating material(s) are applied they are allowed to dry and bind to the component support assembly 5100 and one or more components 5102a-5102c.

The coating material(s) 5150 may be composed of the same or different material as the component support assembly 5100 and components 5102a-5102c. The coating material(s) 5150 may have a different color or other physical attributes (e.g., transparency, conductivity, electroluminescence, etc.) than the component support assembly 5100 and components 5102a-5102c that it coats. For example, the coating material 5150 may be a conductive or electroluminescent material (e.g., electroluminescent paint) that emits light in response to a passing current. Such a coating may be especially useful for items created according to processes described herein that will be used as signs.

The component support assembly 5100 and components 5102a-5102c may be subjected to multiple applications of the same or different coating material(s) 5150 in order to increase the thickness of the final coat or add various layers of different coatings (e.g., different colors of coating). Some non-limiting, non-exclusive examples of coating materials include, but are not limited to, metallic coating materials (e.g., gold or gold colored, silver or silver colored, aluminum, etc.), glittery coating materials, colored coating materials, etc. In the example shown in FIG. 51, the coating is applied by a spraying mechanism (e.g., aerosol spray canister), however, the coating material(s) may be applied using any appropriate mechanism including dipping a portion or all of the component support assembly 5100 into one or more coating material baths. The coating material(s) used should be viscous enough to adhere to and bind to the desired portions of the component support assembly 5100.

After the coating material(s) has dried, the process for manufacturing the item may continue as described above (e.g., FIGS. 10-13).

Figure 52:
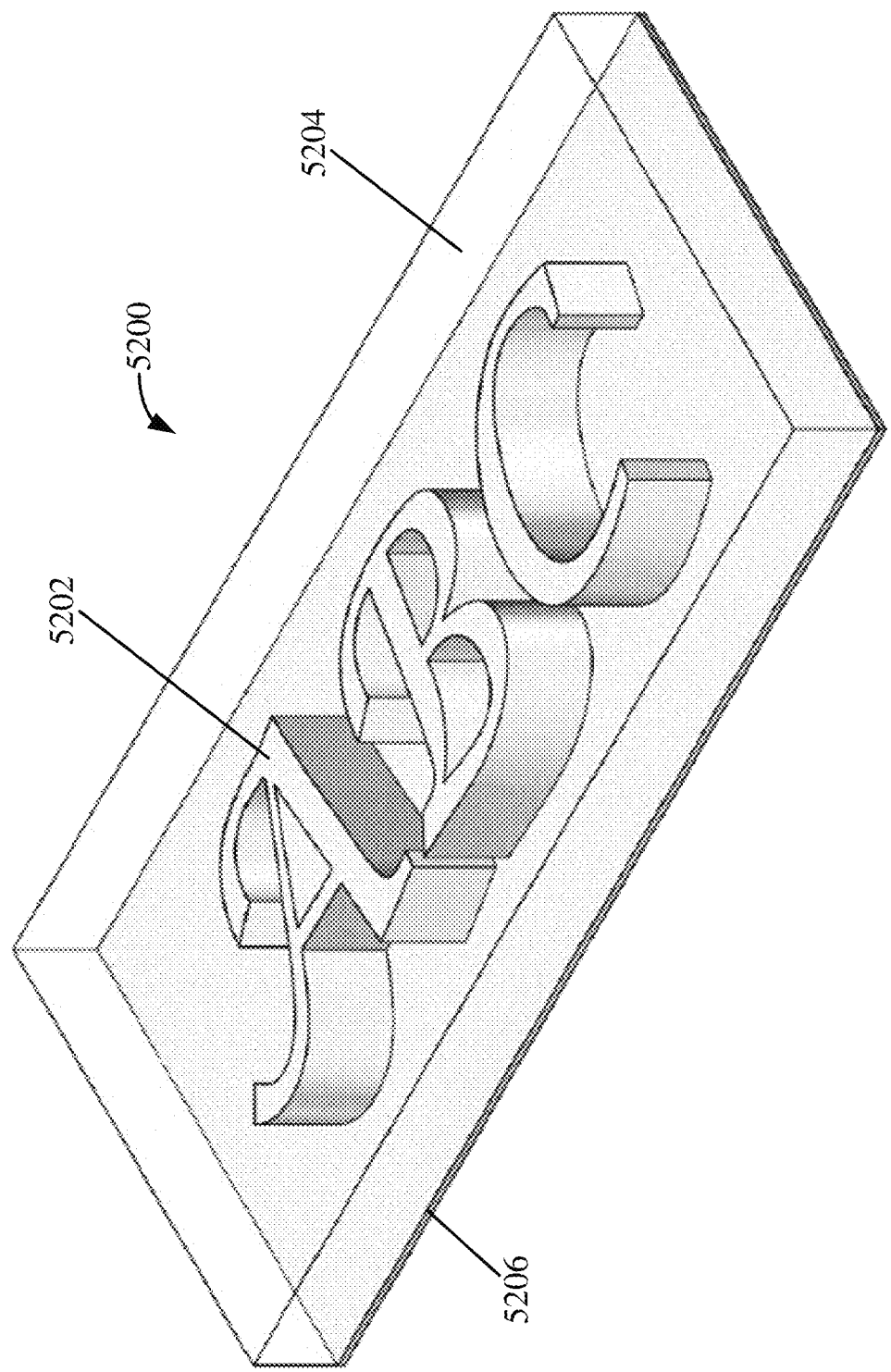
FIG. 52 illustrates a front-perspective view of an exemplary item that includes coated first components embedded within a surrounding second component.

FIG. 52 illustrates a front-perspective view of the resulting item 5200 that includes coated first components 5202 embedded within a surrounding second component 5204. The item 5200 includes the planar support member 5206 coupled to the components 5202.

Figure 53:
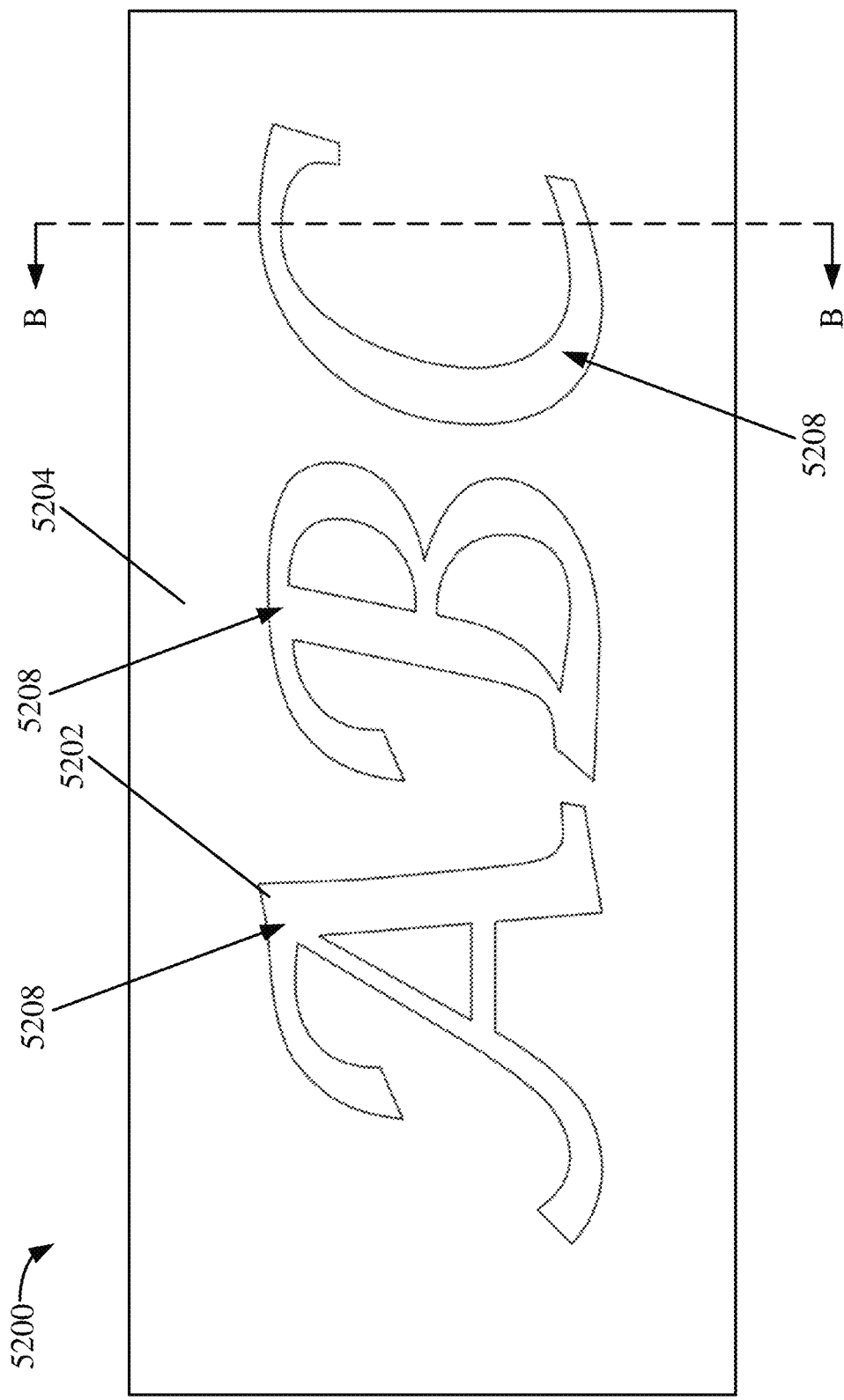
FIG. 53 illustrates a top view of the item shown in FIG. 52.

FIG. 53 illustrates a top view of the item 5200.

Figure 54:
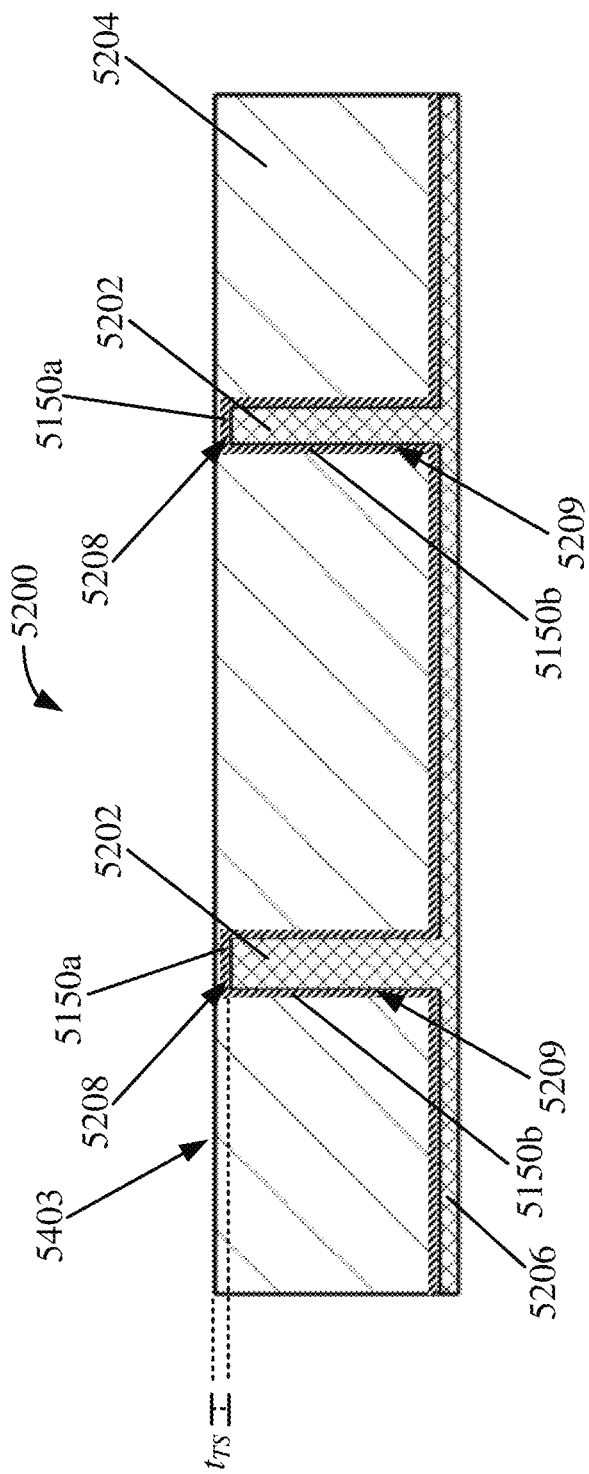
FIG. 54 illustrates a cross-sectional view of the item shown in FIG. 53 taken along the line B-B.

FIG. 54 illustrates a cross-sectional view of the item 5200 shown in FIG. 53 taken along the line B-B according to one aspect. The item 5200 shown in FIG. 54 is similar to the item 1300 shown in FIG. 15, except that the planar support member 5206 and first components 5202 of FIG. 54 include a layer of coating material. Specifically, the components' top surfaces 5208 include a coating material 5150a and the components' side surfaces 5209 also include the coating material 5150b. The item 5200 includes a top surface thickness $t_{TS}$ between the components' top surface 5208 and the second component's top surface 5403.

Figure 55:
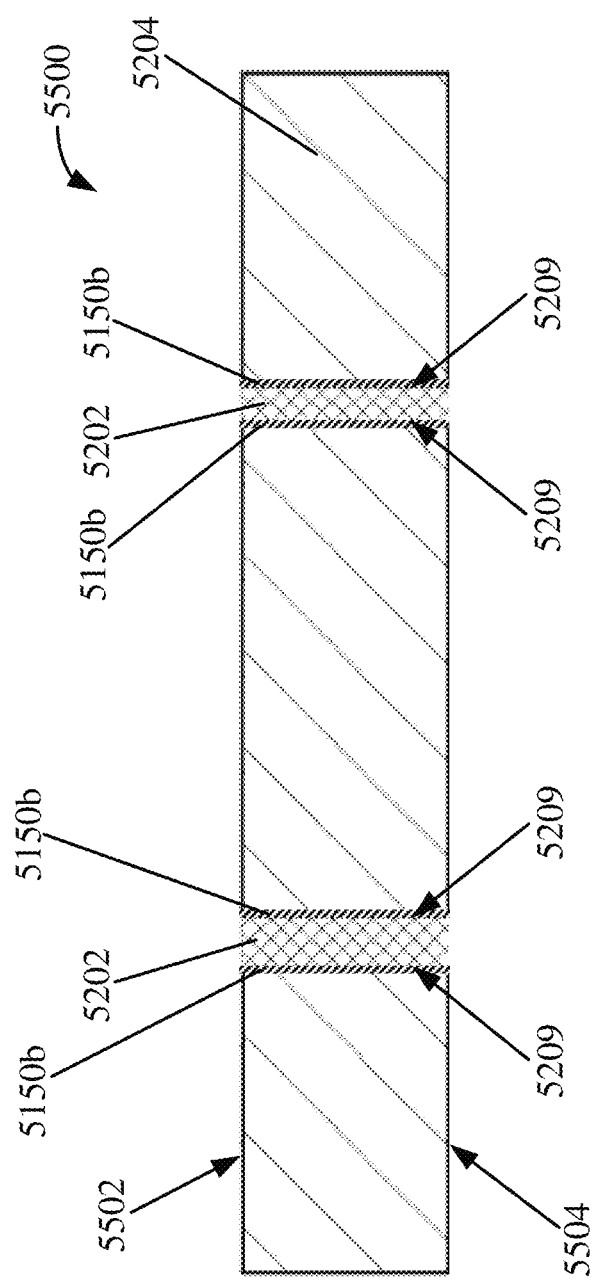
FIG. 55 illustrates a cross-sectional view of the finished item with the top surface thickness $t_{TS}$ and the planar support member removed.

FIG. 55 illustrates a cross-sectional view of the finished item 5500 with the top surface thickness $t_{TS}$ and the planar support member 5206 removed according to one aspect. The top surface thickness $t_{TS}$ and the planar support member 5206 may be removed according to processes described herein including but not limited to sanding, cutting, stripping, and/or CNC routing. Notably, removing the top surface thickness $t_{TS}$ and the planar support member 5206 exposes at the front surface 5502 and back surface 5504 of the finished item 5500 the aesthetically pleasing effect of the coating material 5150b applied to the components' side surfaces 5209. In this fashion, the first components 5202 embedded within the item's second component 5204 may have an outlined or layered look due to the one or more coatings 5150b applied to the side surfaces 5209 of the first components 5202.

Figure 56:
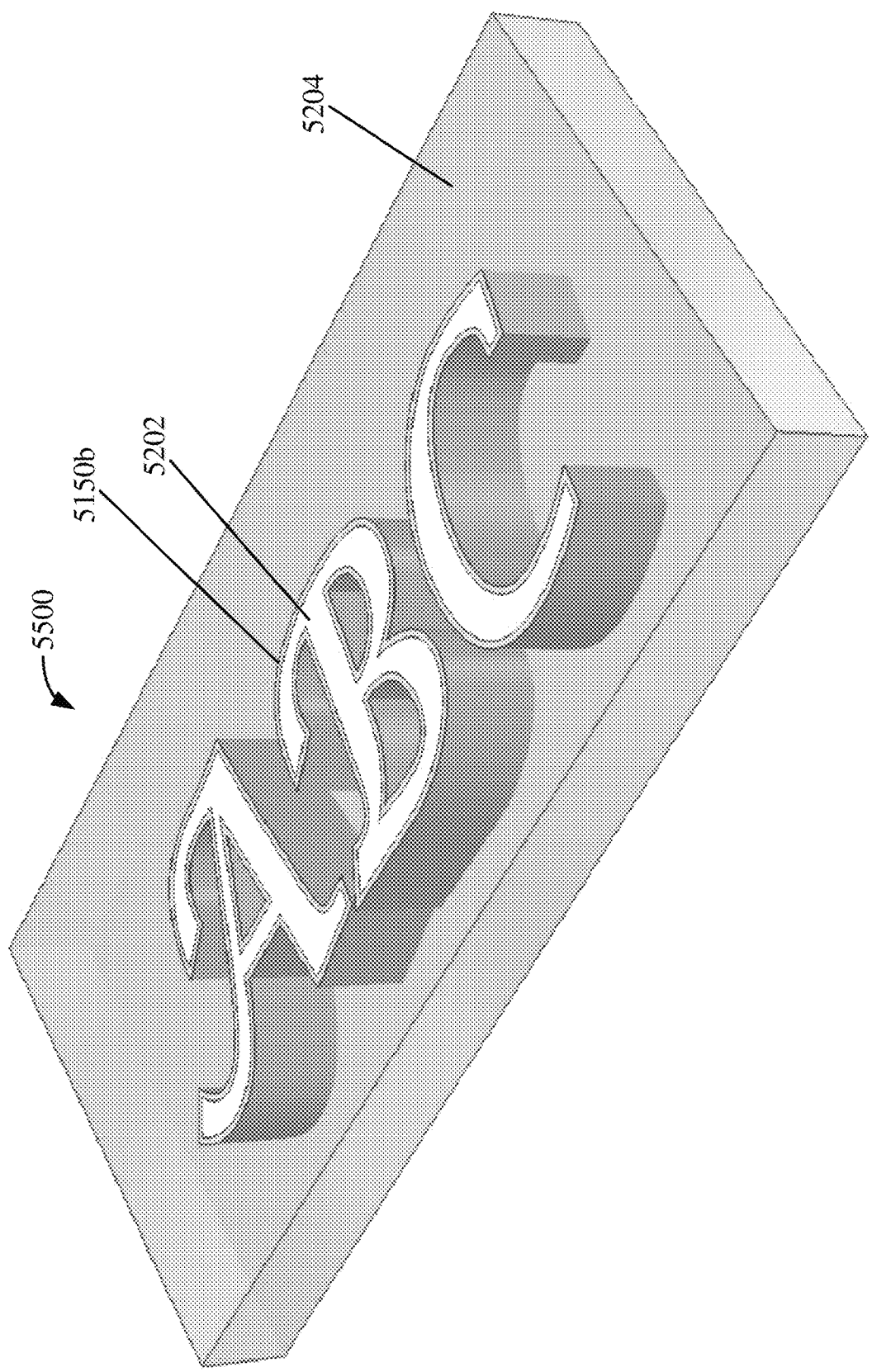
FIG. 56 illustrates a top perspective view of the finished item shown in FIG. 55 having a resulting outlined and layered appearance.

FIG. 56 illustrates a top perspective view of the finished item 5500 having an outlined, layered look according to one aspect.

FIGS. 57-61 illustrate steps used in a method of manufacturing an item having various components according to one aspect. The method shown in FIGS. 57-61 is based on the generalized method shown in FIG. 6 and described above. For reasons of clarity and simplicity, the steps shown in FIGS. 57-61 specifically form a decorative panel that includes lettering. However, the same steps shown and described may be used to manufacture many other items containing different types of components.

Figure 57:
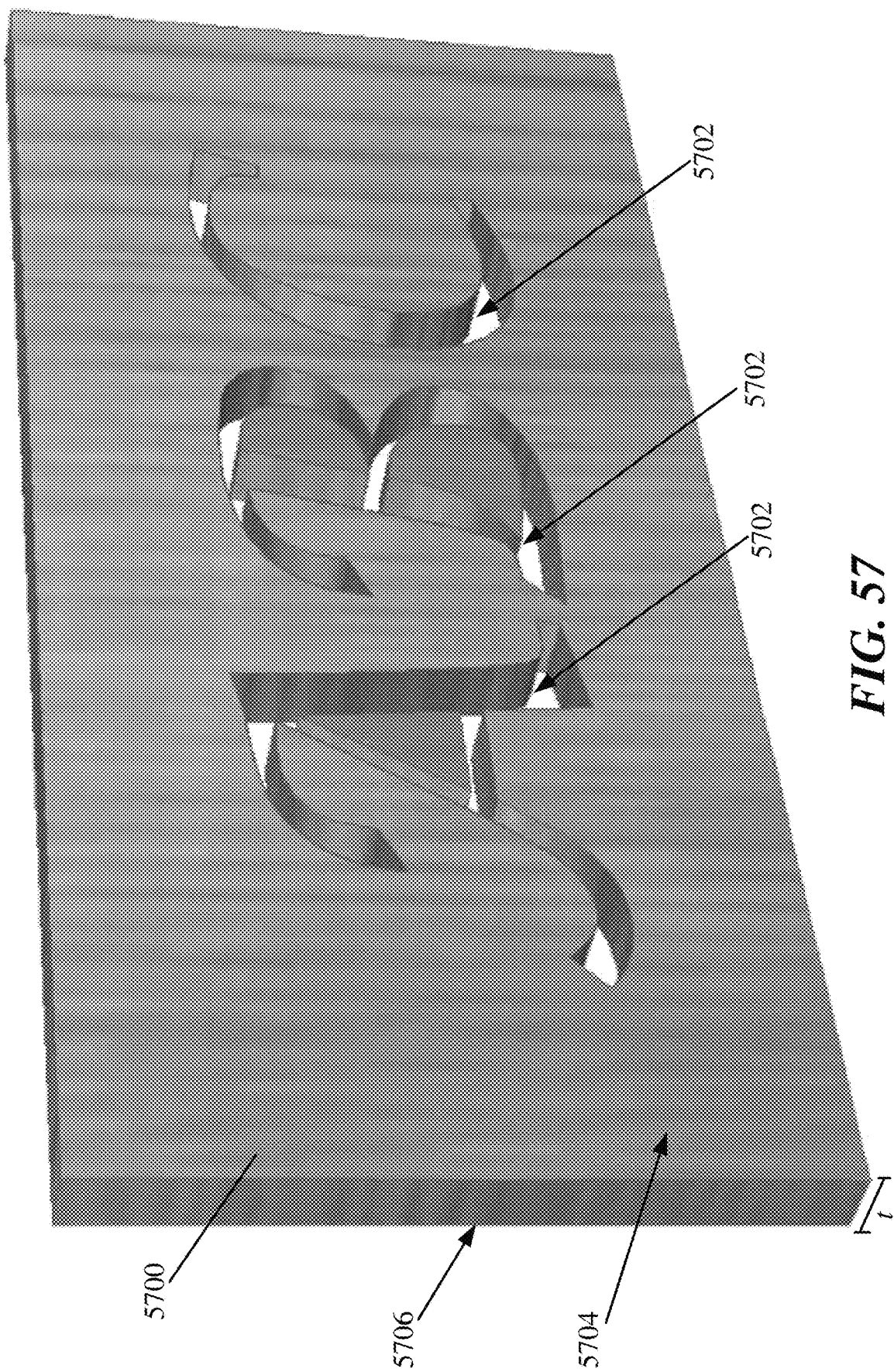
FIG. 57 illustrates a first component having a plurality of second component receiving cavities.

FIG. 57 illustrates a first component 5700. In the example shown, the first component 5700 is made of wood. However, in other aspects the first component may be composed of other materials such as, but not limited to, metal, plastic, stone, etc. The first component 5700 includes a plurality of second component material receiving cavities 5702 that run through the entire thickness t of the first component. According to one aspect, the plurality of material receiving cavities 5702 were cut (e.g., via CNC router) into a block of wood to form the first component 5700. The first component includes a front surface 5704 and back surface 5706 on the opposite side of the front surface 5704.

Figure 58:
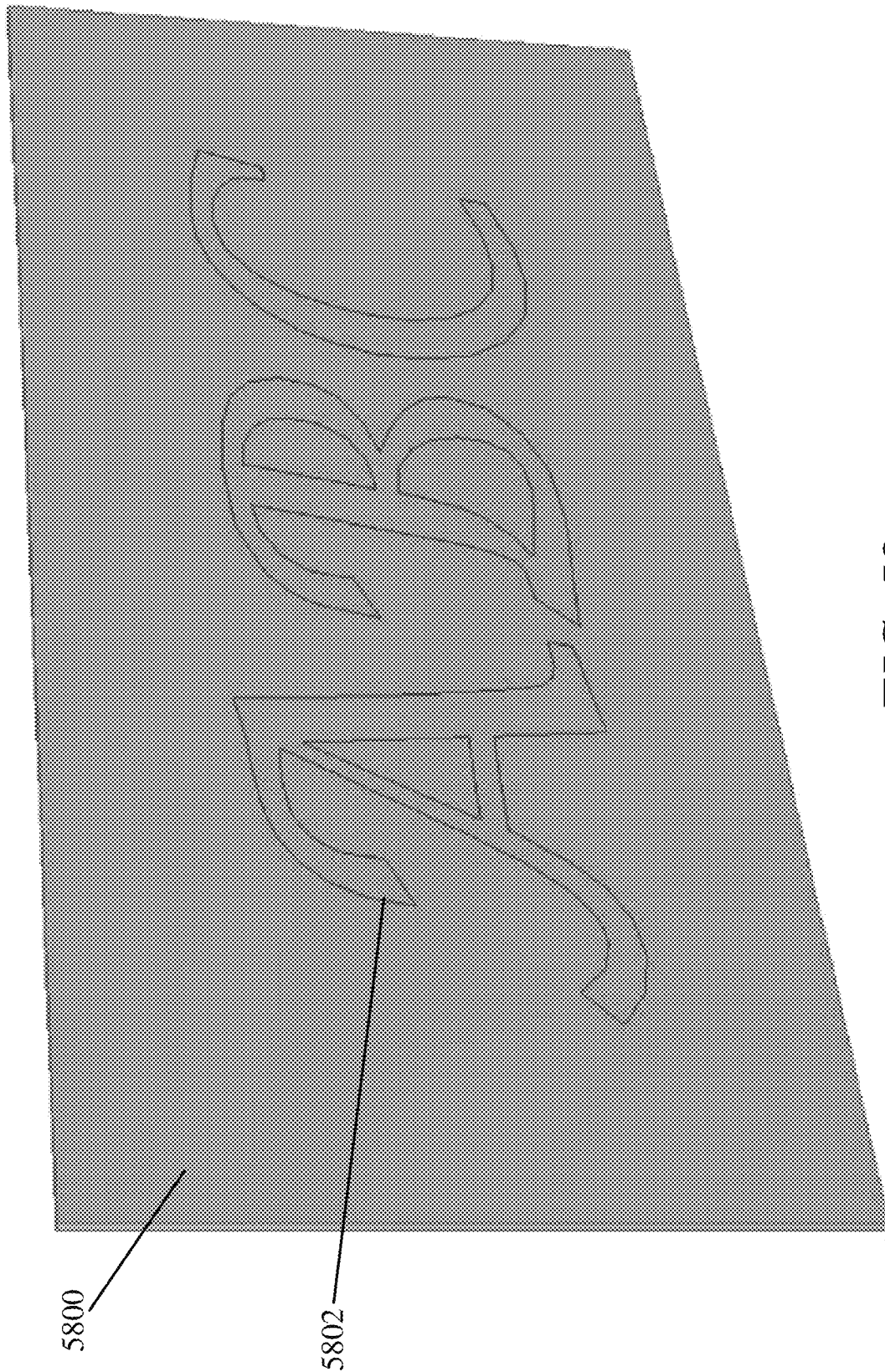
FIG. 58 illustrates a planar support member.

FIG. 58 illustrates a planar support member 5800 according to one aspect. Referring to the example shown in FIGS. 57 and 58, the planar support member 5800 has roughly the same width and length of the first component 5700. The planar support member 5800 may include markings 5802 that trace the outline of the material receiving cavities 5702 of the first component 5700.

Figure 59:
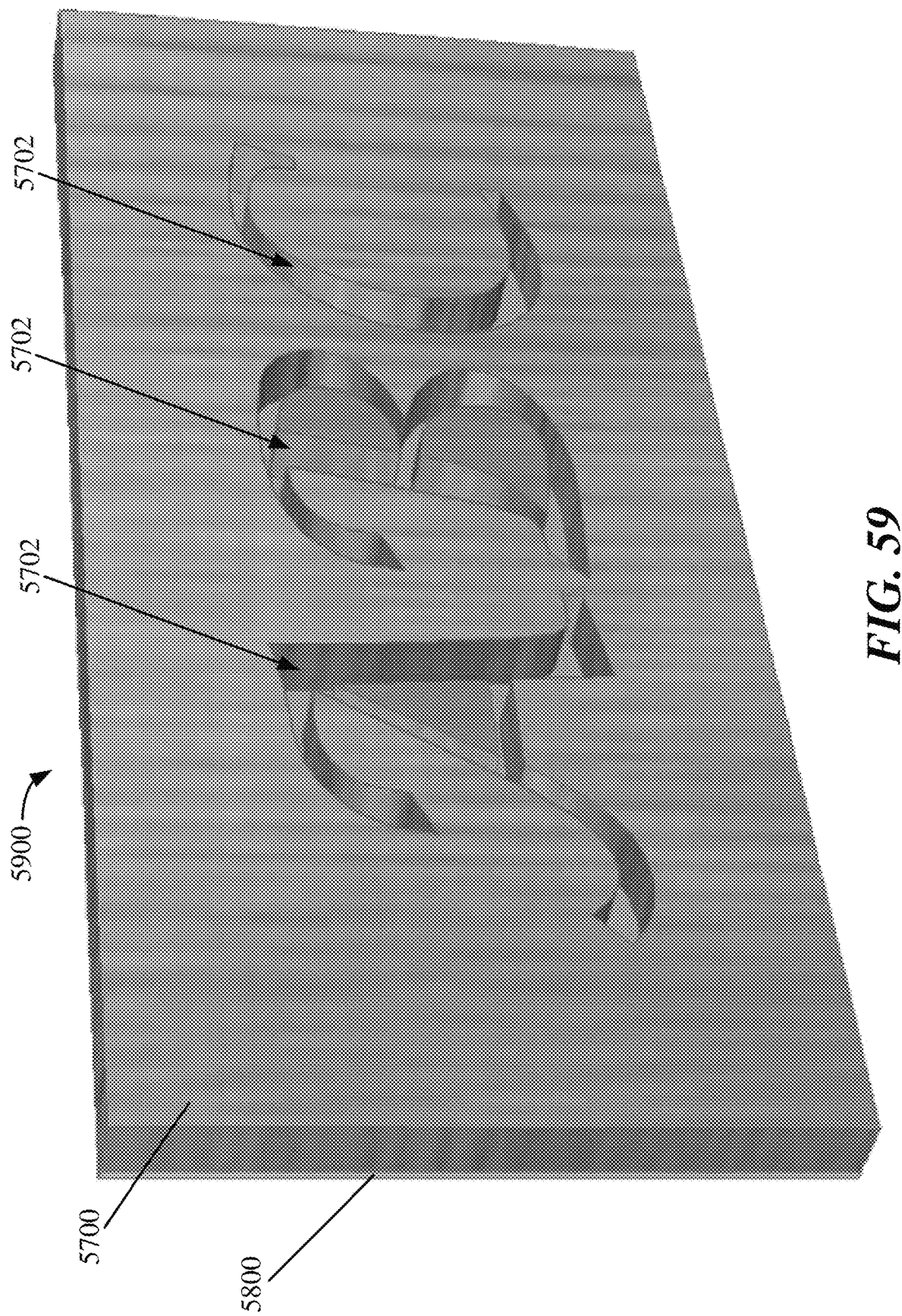
FIG. 59 illustrates the planar support member secured to a back surface of a first component, which together form a component support assembly.

Referring to FIG. 57 and FIG. 59, the planar support member 5800 secures to the back surface 5706 of the first component 5700, which together form a component support assembly 5900 according to one aspect of the disclosure. The planar support member 5800 may be secured to the first component 5700 with various types of adhesives and/or fasteners. According to one aspect, the planar support member 5800 may be part of the first component 5700 itself, such as a bottom surface layer of the first component 5700. In such a case, the material receiving cavities 5702 may be engraved or cut out of a single block of material constituting the first component 5700 and planar support member 5800.

Figure 60:
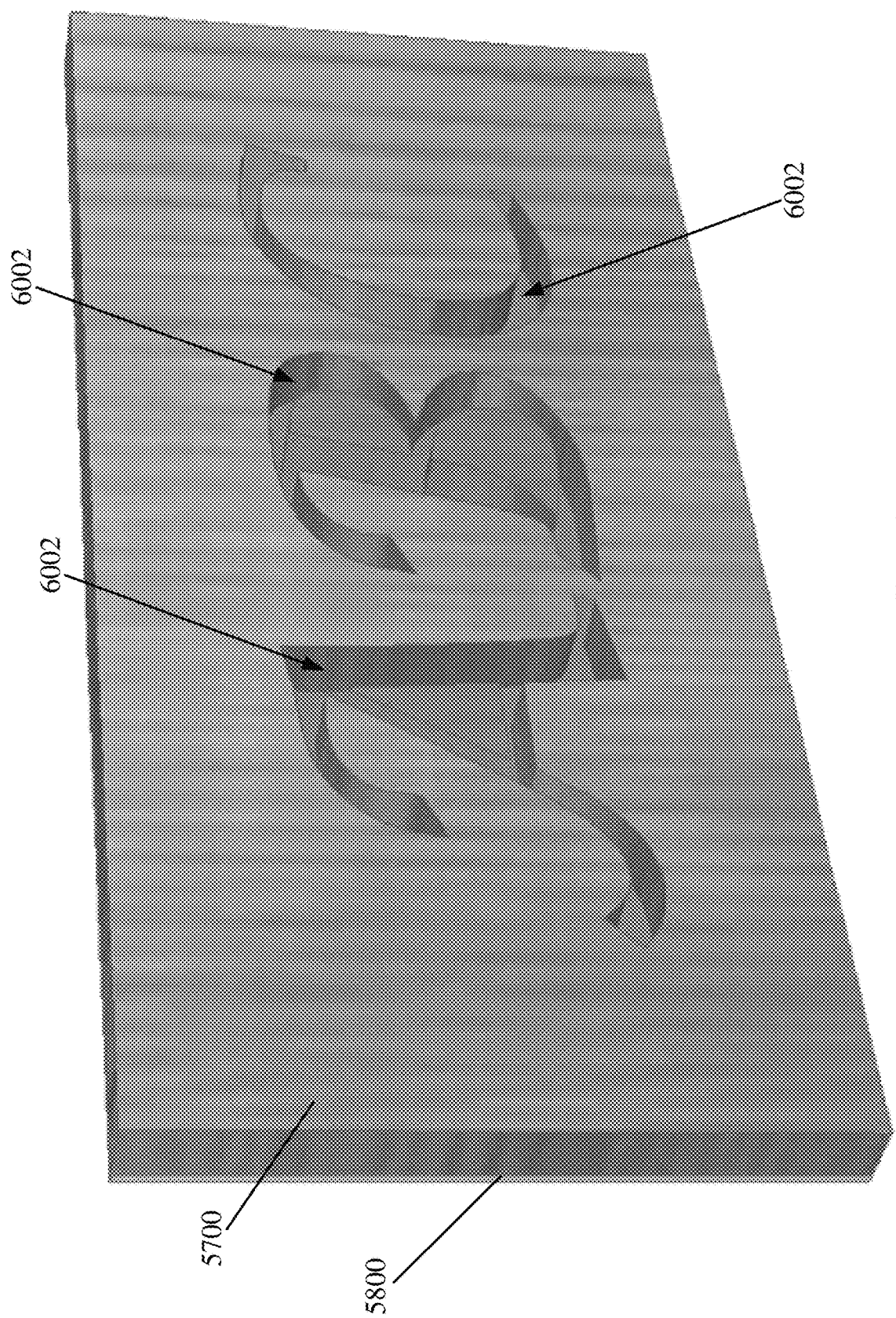
FIG. 60 illustrates that a second component material may be deposited into the second component receiving cavities.

Referring to FIGS. 57 and 60, after the planar support member 5800 has been secured to the back surface 5706 of the first component 5700, a second component material 6002 may be deposited into the cavities 5702 of the first component 5700. The second component material 6002 deposited may fill up the entire cavities 5702 and even spill over a bit onto the front surface 5704 of the first component 5700. In the example shown, the second component material 6002 is a pourable, transparent plastic having a green color. The second component material 6002 is then allowed to harden thereby forming the second component 6102 (see FIG. 61) which is bound to or embedded within the first component 5700.

Figure 61:
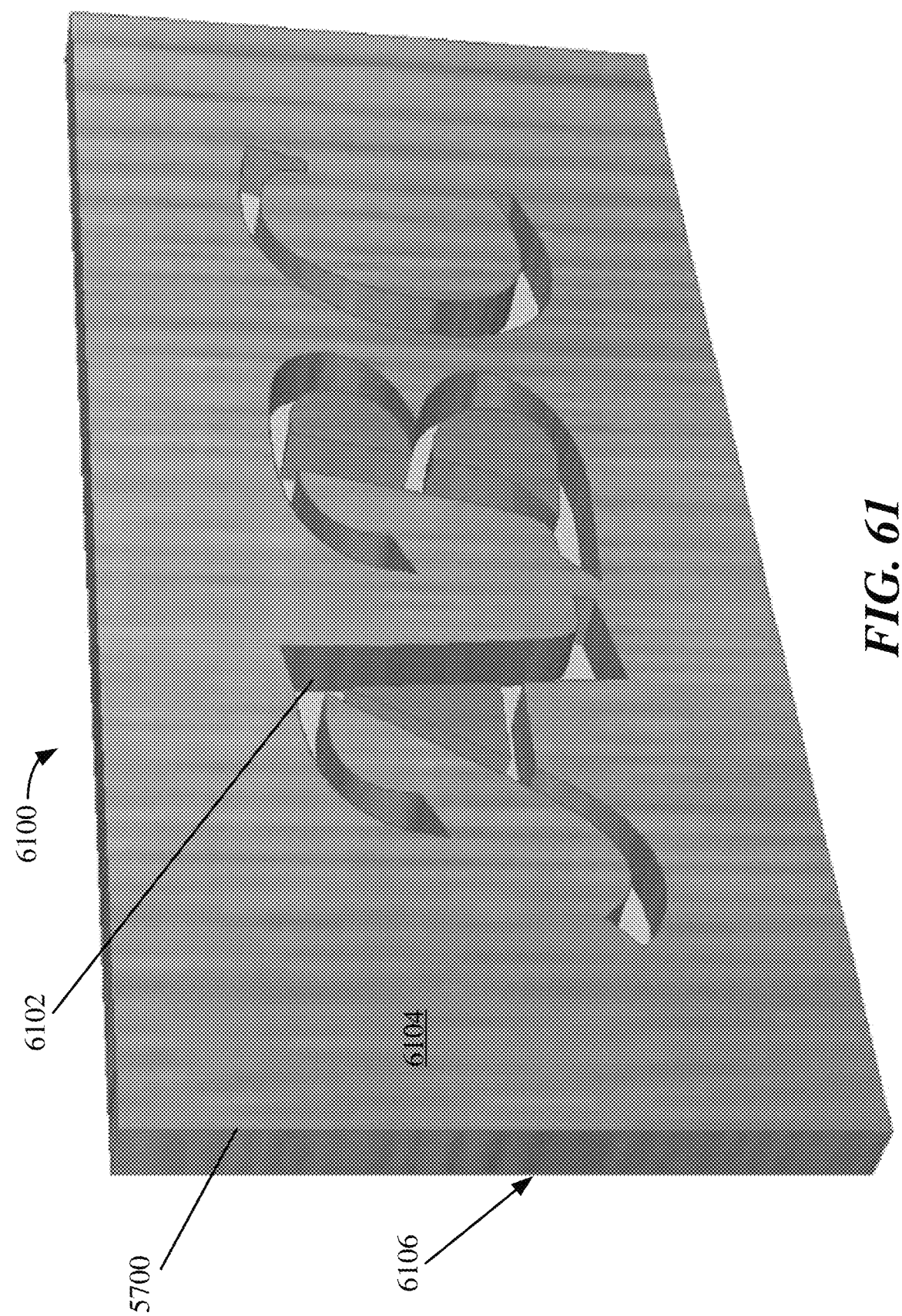
FIG. 61 illustrates that the planar support member is removed to finish the item.

Referring to FIG. 61, to finish the item 6100 the planar support member 5800 is removed (e.g., cut away) and any excess second component material 6002 that may have hardened on the front surface 6104 of the item 6100 may also be cut away and the surfaces of the item 6100 polished. Since the planar support member 5800 has been removed off of the finished item 6100, the second component 6102 is visible at both the front 6104 and back 6106 surfaces of the item 6100.

Thus, the method for manufacturing an item based on the steps shown in FIGS. 57-61 may include: obtaining a component support assembly that includes at least a first component on a top surface of a planar support member, the first component having side surfaces that define a perimeter of the item, the first component including at least one second component material receiving cavity within an interior portion of the first component; depositing a second component material into the second component material receiving cavity and onto the planar support member's top surface exposed at the second component material receiving cavity; allowing the second component material to harden to form a second component that is secured to the first component and at least a portion of the top surface of the planar support member; and removing the planar support member from the first component and the second component to expose a bottom surface of the item that includes the first component and the second component.

The exemplary items 100, 300, 400, 3300, 5000, 5500, 6100 shown may be manufactured in various designs, sizes, styles, and materials so that it may be used as a plaque, sign, trophy, window, door, table top, tiles, flooring, decorative art, etc. Consequently, the resulting manufactured items may be decorative art objects that have both utilitarian functions and aesthetic value. If the items 100, 300, 400, 3300, 5000, 5500, 6100 are made relatively thin, the resulting items 100, 300, 400, 3300, 5000, 5500, 6100 may be heated and bent/shaped into a plate, bowl, or other dinnerware by depressing a central portion of the items 100, 300, 400, 3300, 5000, 5500, 6100 relative to their perimeter edges. In some cases, this may be performed using vacuums. In other cases, this may be performed by pressing the items 100, 300, 400, 3300, 5000, 5500, 6100 between a positive and negative mold. Although the items 100, 300, 400, 3300, 5000, 5500, 6100 shown in the figures are rectangular or round, there is no limitation as to the shape of the finished item or of the frame(s) used to make the finished item. Thus, they may be any geometric shape, organic shape, or a combination of the two.

As discussed above, the process described resulting in the manufacture of a decorative panel with embedded block lettering is merely exemplary. The same process may be used to manufacture different items having different components. For example, the process described above may be used to manufacture bars of soap. In such a case, according to some non-limiting, non-exclusive examples, the mold making material 2302 (FIG. 23) may be silicone rubber, and the component materials used may be any meltable soap compounds (e.g., solid at room temperature but pourable when heated) of varying translucency/opacity, color, and/or texture.

As another example, the process described above may be used to manufacture food such as chocolate, candy, or gummies. In such a case, according to some non-limiting, non-exclusive examples, the mold making material 2302 may be silicone rubber, and the component materials may contain melted chocolate, high fructose corn syrup, caramel, sugared syrup, agave nectar, maple syrup, honey, pectin, and other materials that either alone or when combined with other ingredients result in foods that are substantially solid at room temperature.

As another example, the process described above may be used to manufacture glass items such as glass panels. In such a case, according to some non-limiting, non-exclusive examples, the component template may be made of wax and the mold making material may be silica sand, plaster, or ceramic. After the mold making material has covered the wax component template and hardened, the mold may be heated enough so that the wax component template within the mold melts and pours out. The mold is then ready and molten glass may be poured into its cavities as the first material. After the molten glass has cooled and hardened, the component support assembly may be removed from the mold by simply breaking apart the plaster, ceramic, or silica sand mold, which in such a case is only used one time. The glass component support assembly may then continue to be used in the process described above to create a glass item (e.g., glass panel) comprised of different types of glass having different colors, transparency, tint, etc.

Generally, the mold making material may result in a mold that can withstand the temperatures of the first material that will be deposited into and on top of the mold without causing the mold to burn, warp, or become damaged. The mold making materials used can also result in molds having different elasticity. For example, mold making material that results in a silicone rubber mold may be relatively elastic, while material that results in a plaster or ceramic mold may have very little to no elasticity. The mold making materials used may also result in molds that are durable and can be reused many times (e.g., silicone rubber) whereas other molds (e.g., plaster or silica sand to make glass items) may only be used once.

Many different types of mold making material, component material, and binding material may be used without departing from the scope and spirit of this novel processes described herein. Use of any particular type of mold making material, component material, and binding material depends on the particular application and item being manufactured.

According to one aspect, the planar support members described herein may have a thickness that ranges between 0.1% and 50% of the thickness of the overall component support assembly to which they belong.

One or more of the components, steps, features, and/or functions illustrated in FIGS. 1, 2, 3, 4, 5, 6, 7, 8, 9, 10, 11, 12, 13, 14, 15, 16, 17, 18, 19A, 19B, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, and/or 61 may be rearranged and/or combined into a single component, step, feature or function or embodied in several components, steps, or functions. Additional elements, components, steps, and/or functions may also be added without departing from the invention.

The various features of the invention described herein can be implemented in different applications without departing from the invention. It should be noted that the foregoing embodiments of the disclosure are merely examples and are not to be construed as limiting the invention. The description of the embodiments of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of manufacturing a decorative item, the method comprising:
    obtaining a component support assembly that includes at least a first component on a top surface of a planar support member, wherein the first component comprises a plurality of spaced-apart members, each of the members having side surfaces, a planar top surface, a planar bottom surface, and a thickness between the top surface and the bottom surface, wherein the members all have the same thickness;
    placing a frame relative to the top surface of the planar support member such that the frame surrounds the first component, the frame having a plurality of side members defining an open interior of the frame, wherein when placed relative to the top surface of the planar support member, the plurality of side members and a portion of the planar support member define a frame cavity;
    depositing a liquid second component material into the frame cavity and onto the component support assembly, such that the second component material is in contact with an inner surface of each of the plurality of side members of the frame, the side surfaces of the first component members so as to surround each member of the first component, and the top surface of the planar support member;
    allowing the second component material to harden to form a second component that is secured to the first component and at least a portion of the top surface of the planar support member, wherein the first component, the second component, and the planar support member together form an unfinished item;
    removing the frame from the unfinished item; and
    removing the planar support member from the first component and the second component to reveal a bottom surface of the item, the bottom surface of the item having exposed surfaces of the first component and the second component, wherein the upper surfaces of the first component and the second component are also exposed surfaces, and wherein the first component and the hardened second component have a different color or translucency.

2. The method of claim 1, wherein obtaining the component support assembly includes:
    producing the first component in a three dimensional (3D) form based on a two dimensional (2D) pattern; and
    securing a bottom surface of the first component to the top surface of the planar support member.

3. The method of claim 2, wherein producing the first component, in 3D form based on the 2D pattern includes:
    carving and/or cutting a block of material so that the first component includes planar top and bottom surfaces and further includes a cross section that remains substantially constant throughout a thickness of the first component.

4. The method of claim 1, wherein removing the planar support member includes:
    at least one of cutting, sanding, sawing, and/or etching the planar support member away from the first component and/or the second component.

5. The method of claim 1, further comprising:
    prior to depositing the second component material onto the component support assembly, applying a coating material to surfaces of the first, component; and
    removing a top surface layer of the unfinished item to remove a portion of the coating material that coats a top surface of the first component to reveal side surfaces of the first component having the coating material.

6. The method of claim 1, further comprising:
    prior to depositing the second component material onto the component support assembly, applying a resistive material to the top surface of the planar support member, the resistive material configured to resist adhesion to the second component material.

7. The method of claim 1, wherein obtaining the component support assembly includes:
    obtaining a component template;
    making a mold using the component template; and
    using the mold to produce the component support assembly including the first component on the top surface of the planar support member.

8. The method of claim 7, wherein making the mold using the component template includes:
    placing the component template within the frame cavity;
    depositing a mold making material into the frame cavity and over the component template;
    allowing the mold making material to harden; and
    removing the mold resulting from the hardened mold making material, the mold having one or more cavities substantially shaped like the component template.

9. The method of claim 7, wherein using the mold to produce the component support assembly including the first component on the top surface of the planar support member includes:
    placing the mold into the frame cavity;
    depositing a first component material into the frame cavity and into one or more cavities on a front side surface of the mold that are substantially shaped like the component template, the first component material overflowing out from the one or more cavities of the mold to cover at least a portion of the front side surface of the mold;
    allowing the first component material to harden to form the component support assembly, wherein the first component, material hardened within the one or more cavities forms the first component and the first component material hardened on the front side surface of the mold forms the planar support member; and
    extracting the component support assembly from the mold.

10. The method of claim 7, wherein using the mold to produce the component support assembly including the first component on the top surface of the planar support member includes:

placing the mold into the frame cavity;

depositing a first, component material into the frame cavity and into one or more cavities on a front side surface of the mold that are substantially shaped like the component template;

allowing the first component material to harden to form the first component;

depositing a binding material onto the first component and at least a portion of the front side surface of the mold;

allowing the binding material to harden to form the planar support member, the first component secured to the planar support member to form the component support assembly; and extracting the component support assembly from the mold.

11. The method of claim 1, wherein the second component material is a pourable liquid, and depositing the second component material onto the component support assembly includes pouring the second component material onto the component support assembly.

12. The method of claim 1, wherein the second component material deposited does not exceed a height of a top surface of the first component so that the top surface of the first component has an embossed appearance after the second component material hardens to form the second component.

13. The method of claim 1, further comprising:

removing the top surface of the second component to expose the top surface of the first component.

14. The method of claim 1, wherein the first component and the planar support member are made of the same material.

15. The method of claim 14, wherein a perimeter edge of the planar support member extends beyond one or more perimeter edges of the first component.

16. The method of claim 1, wherein the first component and the planar support member are made of different materials.

17. A method of manufacturing a decorative item, the method comprising:

obtaining a component support assembly that comprises a planar support member and a plurality of three-dimensional components, the three-dimensional components each having a planar top surface, a planar bottom surface, and one or more side surfaces, wherein the side surfaces of the three-dimensional components are substantially orthogonal to the top surface and bottom surface of each of the three-dimensional components, and wherein the bottom surface of each of the plurality of three-dimensional components is on a top surface of the planar support member;

placing a frame relative to the top surface of the planar support member such that the frame surrounds the plurality of three-dimensional components, the frame having a plurality of side members defining an open interior of the frame, wherein when placed relative to the top surface of the planar support member, the plurality of side members and a portion of the planar support member define a frame cavity;

depositing a liquid second component material into the frame cavity and onto the component support assembly, such that the second component material is in contact with an inner surface of each of the plurality of side members of the frame so as to surround each of the plurality of side members and the top surface of the planar support member;

allowing the second component material to harden to form a second component that is secured to the plurality of three-dimensional components and to at least a portion of the top surface of the planar support member, wherein the plurality of three-dimensional components, the second component, and the planar support member together form an unfinished item;

removing the frame from the unfinished item; and removing the planar support member from the plurality of three-dimensional components and the second component to reveal a bottom surface of the item, the bottom surface of the item having exposed surfaces of the plurality of three-dimensional components and the second component, wherein the upper surfaces of the first component and the second component of the item are also exposed surfaces, and wherein the three-dimensional components and the hardened second component have a different color or translucency.

\* \* \* \* \*